(12) United States Patent
Etwaru et al.

(10) Patent No.: US 11,475,610 B1
(45) Date of Patent: Oct. 18, 2022

(54) CONTROLLING INTERACTIVITY OF DIGITAL CONTENT OVERLAID ONTO DISPLAYED DATA VIA GRAPHICS PROCESSING CIRCUITRY USING A FRAME BUFFER

(71) Applicant: Mobeus Industries, Inc., Sparta, NJ (US)

(72) Inventors: Dharmendra Etwaru, Sparta, NJ (US); Michael R. Sutcliff, Inlet Beach, FL (US); Aram Andriasyan, Yerevan (AM)

(73) Assignee: Mobeus Industries, Inc., Sparta, NJ (US)

( * ) Notice: Subject to any disclaimer, the term of this patent is extended or adjusted under 35 U.S.C. 154(b) by 0 days.

(21) Appl. No.: 17/675,950

(22) Filed: Feb. 18, 2022

Related U.S. Application Data

(60) Provisional application No. 63/222,757, filed on Jul. 16, 2021, provisional application No. 63/182,391, filed on Apr. 30, 2021.

(51) Int. Cl.
*G06T 11/00* (2006.01)
*G06T 1/60* (2006.01)
(Continued)

(52) U.S. Cl.
CPC .......... *G06T 11/00* (2013.01); *G06F 3/04883* (2013.01); *G06T 1/60* (2013.01); *G06T 7/74* (2017.01); *G06T 2200/24* (2013.01)

(58) Field of Classification Search
CPC ... G06T 11/00; G06T 1/60; G06T 7/74; G06T 2200/24; G06F 3/04883
See application file for complete search history.

(56) References Cited

U.S. PATENT DOCUMENTS 7,013,428 B1   3/2006   Kamen
8,813,154 B1   8/2014   Sivertsen
(Continued)

OTHER PUBLICATIONS

International Search Report and Written Opinion of the International Searching Authority dated Jun. 1, 2022, in PCT/US22-20244, filed Mar. 14, 2022, 12 pages.
(Continued)

*Primary Examiner* — Jacinta M Crawford
*Assistant Examiner* — Donna J. Ricks
(74) *Attorney, Agent, or Firm* — Oblon, McClelland, Maier & Neustadt, L.L.P.

(57) ABSTRACT

An apparatus, method, and computer readable medium that access a frame buffer of a graphics processing unit (GPU), analyze, in the frame buffer, a frame representing displayed data, based on the analyzed frame, identify a reference patch that includes an instruction to retrieve content, generate an overlay including an augmentation layer which includes the content, superimpose the overlay onto the displayed data such that the content is viewable while a portion of the base layer is obscured, detect a user input, determine a location of the user input in the augmentation layer, associate the location in the augmentation layer with a target location in the base layer, and associate, within memory, the target location with an operation such that the user input in the augmentation layer activates an input in the base layer.

18 Claims, 36 Drawing Sheets

(51) Int. Cl.
*G06F 3/04883* (2022.01)
*G06T 7/73* (2017.01)

(56) References Cited

U.S. PATENT DOCUMENTS

| | | | |
|---|---|---|---|
| 9,325,809 B1 | 4/2016 | Barros et al. | |
| 9,792,895 B2 | 10/2017 | Khintsitskiy | |
| 10,236,006 B1 | 3/2019 | Gurijala et al. | |
| 10,742,634 B1 | 8/2020 | Shahbazi et al. | |
| 11,064,149 B1 | 7/2021 | Paun | |
| 2002/0056136 A1 | 5/2002 | Wistendahl et al. | |
| 2003/0234790 A1 | 12/2003 | Hochmuth | |
| 2004/0130552 A1 | 7/2004 | Duluk, Jr. et al. | |
| 2005/0219241 A1 | 10/2005 | Chun | |
| 2007/0009179 A1 | 1/2007 | Easwar | |
| 2008/0137848 A1 | 6/2008 | Kocher et al. | |
| 2008/0140714 A1 | 6/2008 | Rhoads et al. | |
| 2009/0245516 A1 | 10/2009 | Ravikiran | |
| 2010/0153848 A1 | 6/2010 | Saha | |
| 2012/0032977 A1 | 2/2012 | Kim et al. | |
| 2012/0088543 A1 | 4/2012 | Lindner et al. | |
| 2012/0095958 A1 | 4/2012 | Pereira et al. | |
| 2012/0114249 A1 | 5/2012 | Conwell | |
| 2012/0207208 A1 | 8/2012 | Wyatt | |
| 2012/0272279 A1 | 10/2012 | Lim | |
| 2013/0044129 A1 | 2/2013 | Latta et al. | |
| 2013/0047180 A1 | 2/2013 | Moon et al. | |
| 2013/0183952 A1 | 7/2013 | Davis et al. | |
| 2013/0294648 A1 | 11/2013 | Rhoads et al. | |
| 2014/0172429 A1 | 6/2014 | Butcher et al. | |
| 2014/0304316 A1 | 10/2014 | Thulasiraman et al. | |
| 2015/0039993 A1 | 2/2015 | Ishimaru | |
| 2015/0097850 A1 | 4/2015 | Craik et al. | |
| 2015/0113557 A1 | 4/2015 | Kim | |
| 2015/0163345 A1 | 6/2015 | Cornaby | |
| 2015/0195288 A1 | 7/2015 | Hoyos et al. | |
| 2015/0287220 A1 | 10/2015 | Jain et al. | |
| 2015/0034141 A1 | 11/2015 | Schrempp | |
| 2015/0319510 A1 | 11/2015 | Ould, VIII | |
| 2015/0358525 A1 | 12/2015 | Lord | |
| 2016/0109954 A1* | 4/2016 | Harris | H04L 63/0861 345/156 |
| 2016/0328871 A1 | 11/2016 | Chen | |
| 2017/0026621 A1 | 1/2017 | Vellanki et al. | |
| 2017/0052654 A1 | 2/2017 | Cervelli et al. | |
| 2017/0185251 A1 | 6/2017 | Jain | |
| 2017/0195753 A1 | 7/2017 | Dakss | |
| 2017/0255614 A1 | 9/2017 | Vukosavljevic et al. | |
| 2017/0304725 A1 | 10/2017 | Perlman et al. | |
| 2017/0344552 A1 | 11/2017 | Golbandi | |
| 2018/0004204 A1* | 1/2018 | Rider | B60K 35/00 |
| 2018/0096502 A1 | 4/2018 | Kansara | |
| 2018/0122114 A1 | 5/2018 | Luan et al. | |
| 2018/0143950 A1 | 5/2018 | Al-Arnaouti et al. | |
| 2018/0150696 A1 | 5/2018 | Li | |
| 2018/0189922 A1 | 7/2018 | Chinnadurai et al. | |
| 2018/0219814 A1 | 8/2018 | Maarek | |
| 2018/0307846 A1 | 10/2018 | Hertling et al. | |
| 2018/0308257 A1* | 10/2018 | Boyce | G06T 1/60 |
| 2018/0343481 A1 | 11/2018 | Loheide et al. | |
| 2019/0065152 A1 | 2/2019 | Jaroch | |
| 2019/0206113 A1 | 7/2019 | Kipp et al. | |
| 2019/0207885 A1 | 7/2019 | Kozhemiak et al. | |
| 2019/0236816 A1 | 8/2019 | Wang et al. | |
| 2019/0259124 A1 | 8/2019 | Barnett | |
| 2019/0295208 A1 | 9/2019 | Hoatry | |
| 2019/0317763 A1 | 10/2019 | Sakamoto et al. | |
| 2019/0332883 A1* | 10/2019 | Ivanovic | G06V 10/25 |
| 2020/0110482 A1 | 4/2020 | Vu et al. | |
| 2020/0184658 A1 | 6/2020 | Cui | |
| 2020/0245021 A1 | 7/2020 | Kitazato | |
| 2020/0257920 A1 | 8/2020 | Kumar et al. | |
| 2020/0273251 A1 | 8/2020 | Palos et al. | |
| 2020/0389293 A1 | 12/2020 | Lambert et al. | |
| 2020/0396521 A1 | 12/2020 | Weiner et al. | |
| 2021/0004650 A1 | 1/2021 | Frank | |
| 2021/0200501 A1 | 7/2021 | Stankoulov | |
| 2021/0344991 A1 | 11/2021 | Todd | |
| 2022/0019780 A1 | 1/2022 | Ozserin et al. | |
| 2022/0067415 A1* | 3/2022 | Kerofsky | G06Q 30/0241 |
| 2022/0101593 A1* | 3/2022 | Rockel | G06F 3/04842 |
| 2022/0114584 A1 | 4/2022 | Conley et al. | |
| 2022/0138994 A1 | 5/2022 | Viswanathan et al. | |

OTHER PUBLICATIONS

International Search Report and Written Opinion of the International Searching Authority dated Jun. 9, 2022, in PCT/US22/20226, filed Mar. 14, 2022, 12 pages.

International Search Report and Written Opinion of the International Searching Authority dated Jun. 9, 2022, in PCT/US22/20234, filed Mar. 14, 2022, 8 pages.

International Search Report and Written Opinion of the International Searching Authority dated Jun. 9, 2022, in PCT/US22/20184, filed Mar. 14, 2022, 8 pages.

International Search Report and Written Opinion of the International Searching Authority dated Jun. 3, 2022, in PCT/US2022/020254, filed Mar. 14, 2022, 13 pages.

International Search Report and Written Opinion of the International Searching Authority dated Jun. 7, 2022, filed Mar. 31, 2022, 8 pages.

International Search Report and Written Opinion of the International Searching Authority dated Jul. 20, 2022, in PCT/US22/20263, filed Mar. 14, 2022, 9 pages.

International Search Report and Written Opinion dated Aug. 1, 2022 in PCT/US22/20267, 17 pages.

International Search Report and Written Opinion dated Aug. 3, 2022 in PCT/US22/20215, 17 pages.

International Search Report and Written Opinion dated Jul. 7, 2022 in PCT/US22/20258, 17 pages.

* cited by examiner

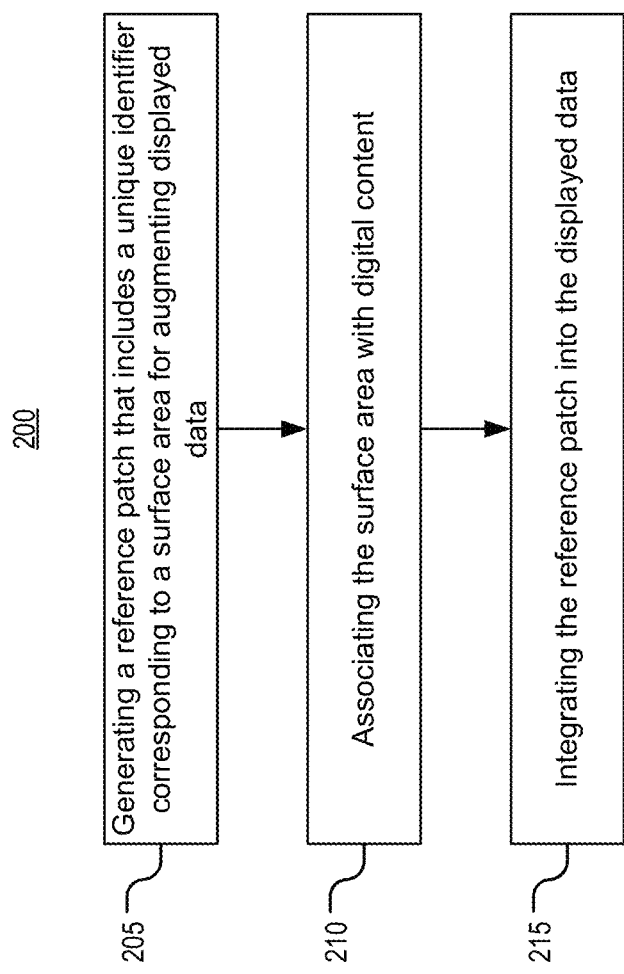

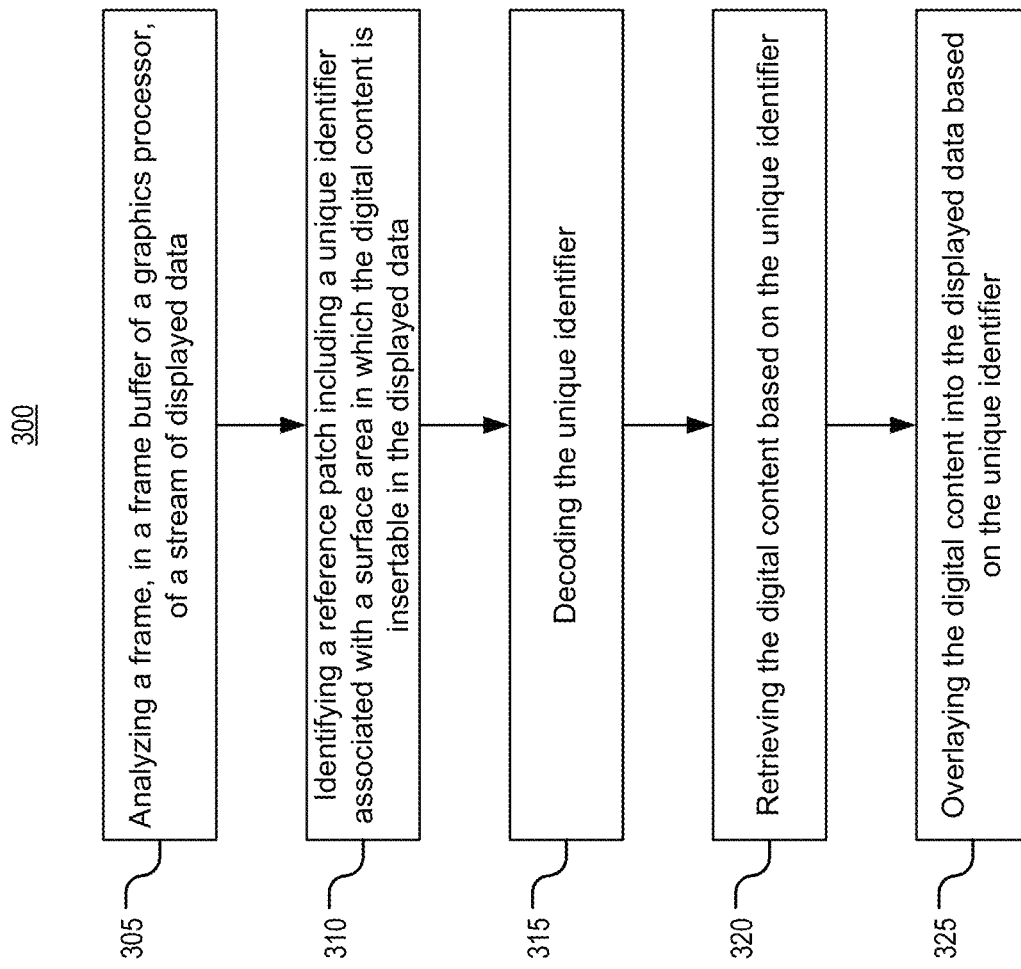

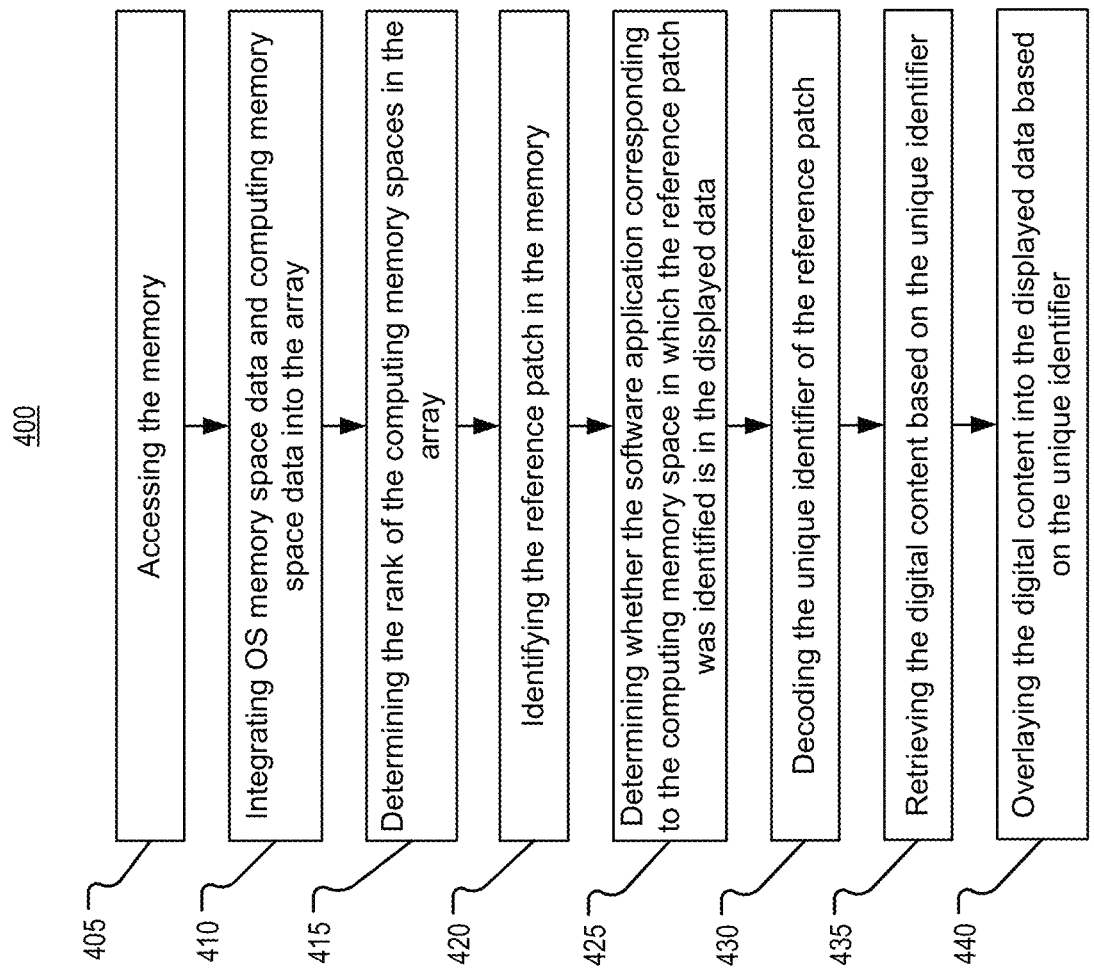

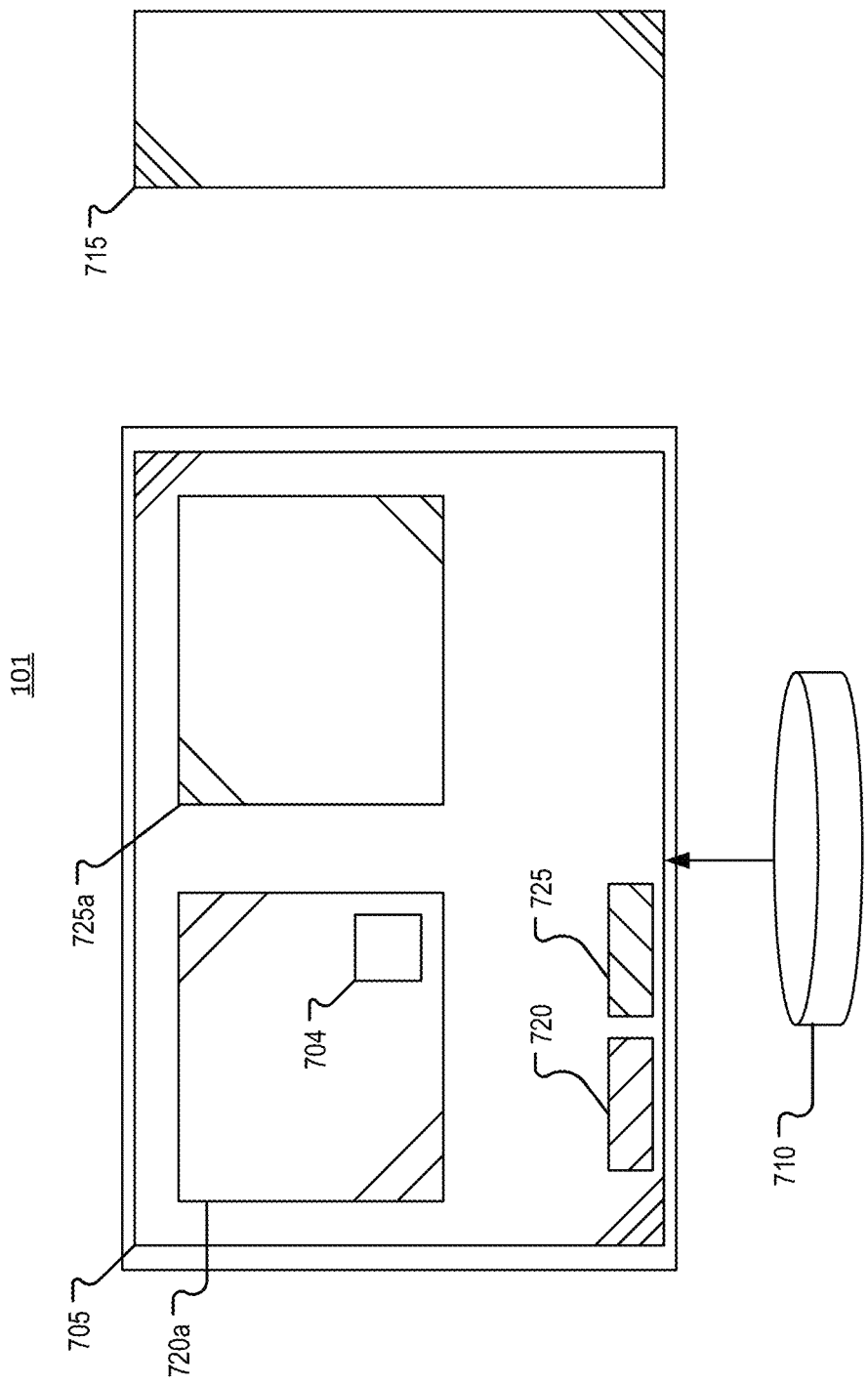

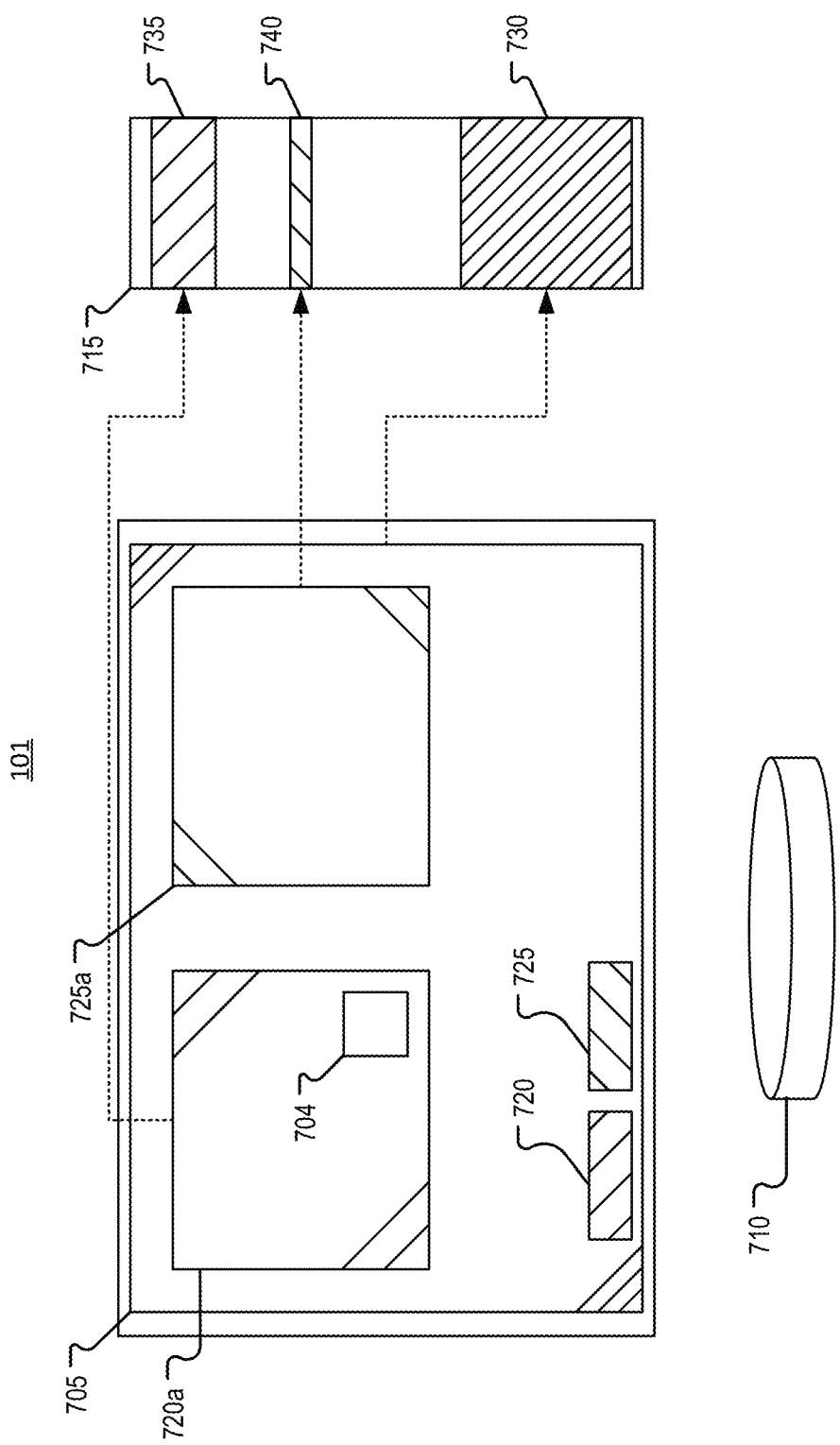

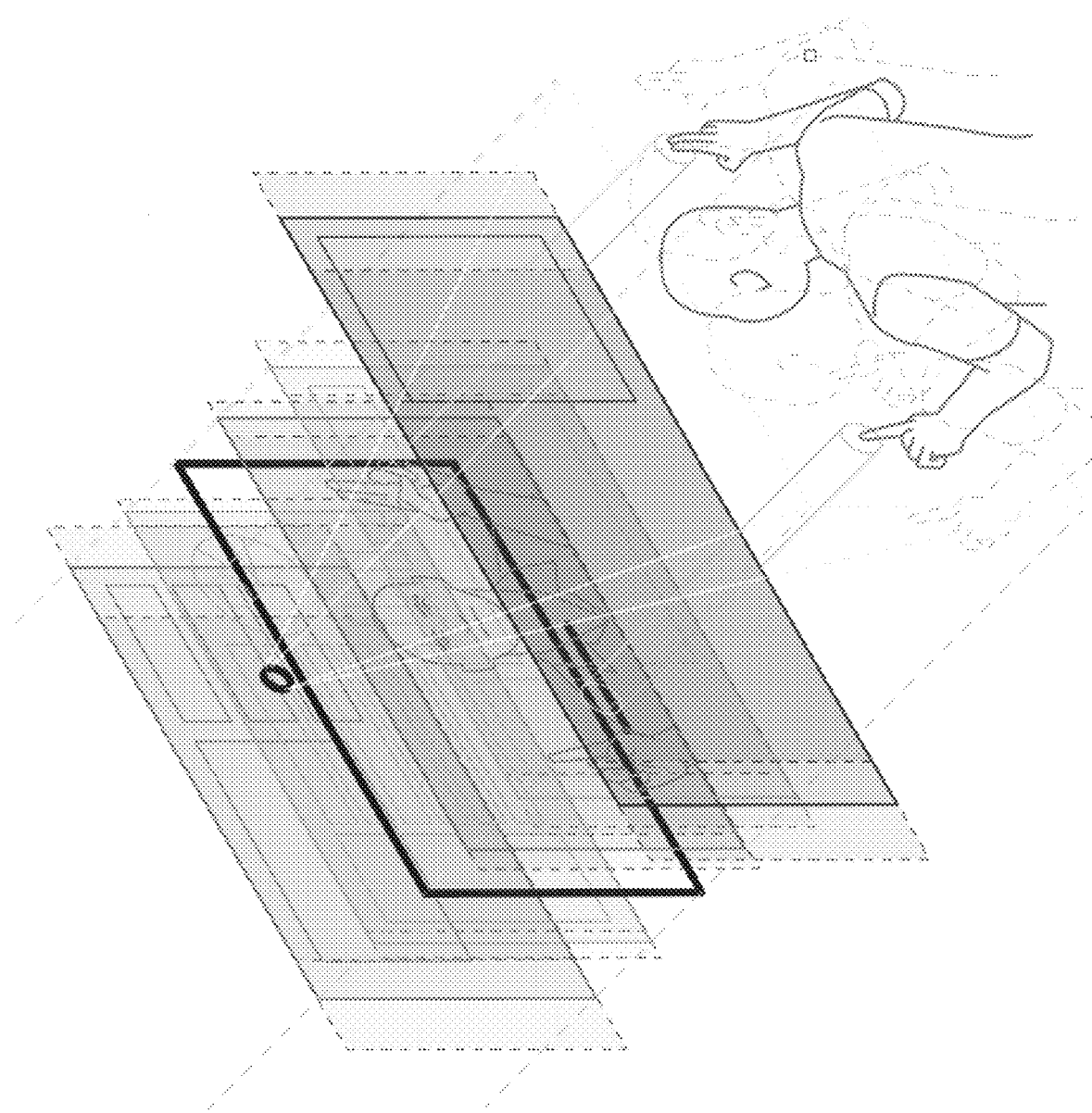

CONTROLLING INTERACTIVITY OF DIGITAL CONTENT OVERLAID ONTO DISPLAYED DATA VIA GRAPHICS PROCESSING CIRCUITRY USING A FRAME BUFFER

CROSS REFERENCE TO RELATED APPLICATIONS

The present application claims priority to U.S. Provisional Application No. 63/222,757, filed Jul. 16, 2021, and U.S. Provisional Application No. 63/182,391, filed Apr. 30, 2021, the entire content of each of which is incorporated by reference herein in its entirety for all purposes.

BACKGROUND

Field of the Disclosure

The present disclosure relates to a method, device, and computer-readable medium of controlling interactivity of digital content overlaid onto displayed data via graphics processing circuitry using a frame buffer.

Description of the Related Art

Digital content has traditionally been presented within the bounds of a two-dimensional geometric screen. The visual experience of such digital content is thus lacking in dynamism that allows for the layering of functionality within a given display frame.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present disclosure.

SUMMARY

The present disclosure relates to an apparatus, comprising processing circuitry, including a graphics processing unit (GPU), configured to access a frame buffer of the GPU, analyze, in the frame buffer of the GPU, a frame representing a section of a stream of displayed data that is being displayed by a display device, based on the analyzed frame, identify a reference patch that includes an instruction to retrieve content, generate an overlay comprising an augmentation layer, the augmentation layer including the content, superimpose the overlay onto the displayed data to create a composite comprising the augmentation layer and a base layer, such that the content is viewable while a portion of the base layer is obscured from view, detect a user input, determine a location of the user input in the augmentation layer, associate the location of the user input in the augmentation layer with a target location in the base layer, associate, within memory, the target location with an operation corresponding to the augmentation layer and the base layer such that the user input in the augmentation layer activates an input in the base layer.

The present disclosure relates to a method comprising accessing a frame buffer of a graphics processing unit (GPU), analyzing, in the frame buffer of the GPU, a frame representing a section of a stream of displayed data that is being displayed by a display device, based on the analyzed frame, identifying a reference patch that includes an instruction to retrieve content, generating an overlay comprising an augmentation layer, the augmentation layer including the content, superimposing the overlay onto the displayed data to create a composite comprising the augmentation layer and a base layer, such that the content is viewable while a portion of the base layer is obscured from view, detecting a user input, determining a location of the user input in the augmentation layer, associating the location of the user input in the augmentation layer with a target location in the base layer, and associating, within memory, the target location with an operation corresponding to the augmentation layer and the base layer such that the user input in the augmentation layer activates an input in the base layer.

The present disclosure relates to a non-transitory computer-readable storage medium storing computer-readable instructions that, when executed by a computer, cause the computer to perform a method comprising accessing a frame buffer of a graphics processing unit (GPU), analyzing, in the frame buffer of the GPU, a frame representing a section of a stream of displayed data that is being displayed by a display device, based on the analyzed frame, identifying a reference patch that includes an instruction to retrieve content, generating an overlay comprising an augmentation layer, the augmentation layer including the content, superimposing the overlay onto the displayed data to create a composite comprising the augmentation layer and a base layer, such that the content is viewable while a portion of the base layer is obscured from view, detecting a user input, determining a location of the user input in the augmentation layer, associating the location of the user input in the augmentation layer with a target location in the base layer, and associating, within memory, the target location with an operation corresponding to the augmentation layer and the base layer such that the user input in the augmentation layer activates an input in the base layer.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 2A is a flow chart for a method of generating a reference patch and embedding the reference patch into displayed data, according to an exemplary embodiment of the present disclosure.

FIG. 3A is a flow chart for a method of inspecting the reference patch, according to an exemplary embodiment of the present disclosure.

FIG. 4A is a flow chart for a method of identifying the reference patch included in the displayed data and overlaying the digital content into displayed data, according to an exemplary embodiment of the present disclosure.

FIG. 7A is a schematic of a software application running on the first device, according to an embodiment of the present disclosure.

FIG. 7B is a schematic of the memory allocation in the main memory, according to an embodiment of the present disclosure.

FIG. 15 is an example of Transparent Computing.

DETAILED DESCRIPTION

Figure 1:
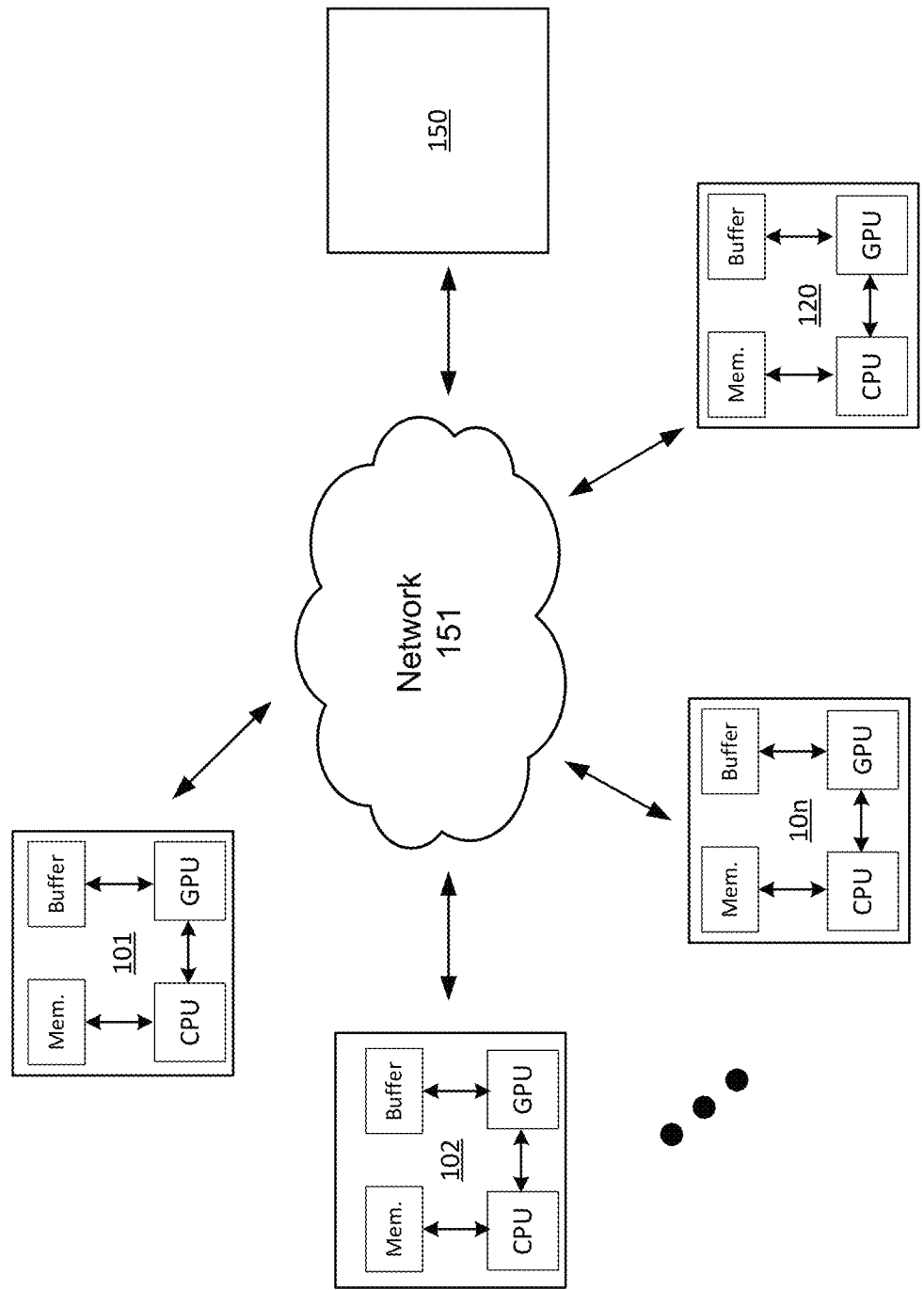
FIG. 1 is a schematic view of user devices communicatively connected to a server, according to an exemplary embodiment of the present disclosure.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The present disclosure provides methods and devices/systems for generating multi-layered visual experiences that are informative and interactive which can have controllable user-content interactivity. This interactivity can be with any layer of the multi-layered visual experience.

The contents of the present application may be advantageous for or useful in transparent computing. The term "transparent computing" refers to an experience of using an electronic device equipped with a display in which certain properties of pixels, such as opacity, in the display may be adjusted to improve viewability and/or recognizability of objects which are or appear to be interposed between a user and a background, while the background is viewable to the user. This type of computing experience may include the presentation of a plurality of objects or content distributed among multiple display layers. These display layers may be simultaneously displayed on the same display device. Transparent computing may also include the ability of a user to interact with a 3-dimensional environment constructed from the display layers. This interaction may occur in one layer or more than one layer simultaneously.

According to an embodiment, the present disclosure relates to augmentation of a digital user experience. The augmentation may include an overlaying of digital objects onto a viewable display area of a display of an electronic device. The electronic device may be a mobile device such as a smartphone, tablet, and the like, a desktop computer, or any other electronic device that displays information. The digital objects may include text, images, videos, and other graphical elements, among others. The digital objects may be interactive. The digital objects may be associated with third-party software vendors.

In order to realize the augmentation of a digital user experience, a reference patch, that is a region of interest acting as an anchor, can be used. In one embodiment, the reference patch or other visually detectable element may serve to indicate a position at which digital content is to be placed onto a display. In some embodiments and as described herein, the reference patch may include encoded information that may be used to retrieve digital content and place that digital content into a desired location or locations in displayed data. The reference patch can be embedded within displayed data (such as, but not limited to, an image, a video, a document, a webpage, or any other application that may be displayed by an electronic device). The reference patch can include unique identifying data, a marker, or encoding corresponding to predetermined digital content. The reference patch can indicate to the electronic device the particular content that is to be displayed, the position at which the content is to be placed, and the size with which the content is to be displayed. Accordingly, when a portion of the displayed data including the reference patch is visible in a current frame of displayed data, the corresponding augmentation can be overlaid on the current frame of the displayed data wherein the augmentation includes secondary digital content (i.e., content that is secondary to (or comes after) the primary displayed data), herein referred to as "digital content," and/or digital objects. For example, an augmentation can include additional images to be displayed with the current frame of displayed data for a seamless visual experience.

The above-described augmentations are particularly relevant to environments where the underlying content is static. Static content may include textual documents or slide decks. Often, the static content is stored locally in the electronic device. Due to its nature, the static content is not capable of being dynamically adjusted according to complex user interactions, in real-time, during a user experience. Such a digital user experience is cumbersome and inefficient. Thus, a heightened, augmented user experience is desired to provide increased convenience, engagement, and agility. The augmentations described herein reduce cumbrousness by providing a visual representation/aid of retrieved external digital content, and provide improved engagement of the user, agility of navigation through the displayed data, and overall performance of the user device.

This superimposing can be achieved through the generation and displaying of an overlay comprising one or more augmentation layers, the augmentation layers each comprising one or more digital objects and including the content.

The presence of such augmentation layers, however, can cause portions of the displayed data which correspond to interactive elements (e.g. buttons, text input boxes, prompts, scroll bars, and the like) to be, either inadvertently or intentionally, unresponsive to user interaction. While this can be desirable for certain situations, it can be undesirable in other situations. It would be advantageous to have the ability to control user interactivity (i.e. how the user interacts with a particular layer or user operation on a particular layer) with certain elements, regardless of in which layer those elements are displayed.

For example, if a full-screen Microsoft PowerPoint (i.e. first layer) is being displayed on a device's window, that device cannot display a movie (i.e. second layer) without covering up at least a portion of the Microsoft PowerPoint. Furthermore, only the upper-most layer (i.e. the digital content of the layer being displayed in the window) is configured to receive inputs, such as keyboard and mouse inputs from a user of the device. For layers beneath the upper-most layer, pixels cannot be clicked on unless that layer is brought up to the upper-most layer (i.e. displayed "on top"). If the upper-most layer, such as the movie, is transparent or semi-transparent, interactive elements present in the lower layers, such as the PowerPoint presentation, can be visible to a user, but not interactive without first causing the movie to no longer be displayed. Such a switch to a different layer or different content can cause a user to miss critical information or a time-sensitive input.

In comparison, the present disclosure is related to managing, manipulating, and merging multiple viewing areas or containers of a display into a single composite. In other words, multiple layers can be superimposed and displayed simultaneously within the same viewing area of a display/screen. In an embodiment, this is accomplished by adjusting a transparency of pixels in one or more layers to achieve a transparent or semi-transparent effect. That way, any number of simultaneous content sources can be displayed in the same viewing area such that the blended input media can optically appear to exist either in front of or behind other content. In this way, content which would normally be obscured and therefore not viewable by a user in the absence of the multiple layer of the composite can be viewable by the user. This composite can be achieved through the generation and displaying of an overlay comprising one or more augmentation layers, the augmentation layers each including content.

Furthermore, for each layer, user interactivity (for example, click-ability and touch-ability—i.e., a user operation (clicking, touching, pressing, etc. on a layer) can be managed and orchestrated. Click-ability refers to whether a trigger, such as a click, causes a particular action to be performed; when click-ability is on, a trigger can cause an action to be performed, whereas when click-ability is off, a trigger does not cause an action to be performed. Touch-ability is similar to click-ability, where the trigger is a gesture from a user of the device. The user interactivity can be managed and orchestrated at the pixel level, at an object level, a content level, a layer level, or any combination of these. The end result is a multi-layered content stack/experience, where any layer in the stack/experience can be adjusted for attributes such as transparency and user interactivity. In other words, multiple layers can be displayed in a viewing area simultaneously, and any layer or portion thereof can have user interactivity turned on and/or off. For instance, a device can display a full-screen Microsoft PowerPoint and a full-screen movie at the same time in the same area, while still allowing the user to control either the movie or the Microsoft PowerPoint presentation. This control can happen even without changing a layer order, an active layer, or causing any of the content to be rendered non-visible to the user.

In another example, a user may be a client of a bank having a teleconference or other meeting with an employee of the bank. Such a teleconference or meeting can involve the display of critical or sensitive information or can require the continuous monitoring of certain display elements, e.g. for security. For these reasons, or for other reasons such as those related to ease of use, prevention of mistakes, or some other reason related to user experience, it can be advantageous to display information (content) in the composite comprising augmentation layers described above. In this example, it can be advantageous or crucial that the user be able to interact with certain elements while maintaining visibility of other content. For example, the user may need to view information presented by the bank employee such as a graph, chart, spreadsheet, or account summary or to interact with a contract to provide a signature or to provide confirmation of identity by scanning an ID. While the displayed information, contract, or content related to the ID scanning is the top layer, the user may want to check additional information, such as an account balance, or may need to retrieve additional information, such as an account number or username from the bank system. Such information can be accessed by interactive elements which are now present in a layer below that of the displayed information, contract, or ID scan. It is advantageous for the user to be able to interact with such elements without changing the layer order or visibility of the content.

In another example, a user may be viewing a meeting, presentation, lecture, class, or other suitable situation in which information is conveyed from an information provider (e.g. presenter, lecturer, teacher, professor, speaker, etc.) to one or more information recipients (e.g. audience, meeting attendees, students in class, etc.). The information can comprise visual information such as text, images, videos, etc. and/or auditory information such as a voice-over, live commentary, explanation, etc. The information recipients, however, may not be able to communicate in the language of information provider. Obviously this causes a problem in that the information cannot be comprehensibly conveyed. While in such a situation, comprehensible auditory information can be provided by translation services such as a translated audio feed or closed captioning, the visual information, particularly text, provided by the information provider remains in a language which is not understood by one or more of the information recipients. This obviously creates a problem for comprehensible information transfer which can be referred to as the "untranslated text problem".

One possible method of solving the untranslated text problem is to provide a pre-translated copy, transcript, or other suitable visual information supplement which contains a translation of the displayed text. This method of solving the untranslated text problem, however, has a number of disadvantages which may present undesirable barriers to communication. For example, the supplement may not be viewable at the same time as other visual information displayed by the information provider. A separate document or window may be necessary for viewing the supplement. The information recipient may have to divert attention to another area of the display. This situation makes it impossible for an information recipient to view non-text visual information displayed by the information provider and the translated text comprehensible to the information recipient simultaneously. The supplement can be costly to produce. The supplement can require large amounts of time to produce. A distinct supplement can be required for each individual language of the information recipients. Further, the information must be provided to generate the supplement, meaning that the supplement cannot be updated or have additional information added in real time.

The augmentation described above can provide a solution to the untranslated text problem which can avoid the specific disadvantages of the method described above or other methods of solving the untranslated text problem and can avoid other disadvantages which may be present in the method described above and such other methods. The augmentation can display the translated text in a display layer "floating above" the original displayed visual information, such that each information recipient sees the visual information (e.g. presentation) displayed in the language of his/her choosing.

A person using the augmentation (user) can see the entirety of the displayed visual information with the text portion of the visual information translated into a language he/she can comprehend/understand. Such a user would act as an information recipient as described above. A feature of the augmentation is that the translated text can be displayed to the user in such a way as to render the original text non-viewable (or obscured from view) to the user. Making the original text non-viewable may have distinct advantages such as reducing visual clutter (e.g. text superimposed or overlapping other text or other visual information), information ambiguity (e.g. which text corresponds to which other visual information), or requisite size reduction (e.g. making visual information smaller in size to accommodate the addition of translated text). By making the original text non-viewable, the display area taken up by the original text may be used to display the translated text. This may have distinct advantages such as preserving visual information orientation or arrangement and preserving information provider intent.

For example, the displayed visual information may comprise labeled buttons for controlling various interactive functions. Such buttons may perform various functions such as advancing or reversing slides in a slide deck, answering questions, providing feedback, or controlling options or preferences. In an exemplary embodiment, a professor or teacher may be giving a lecture to a class of students. The professor may wish to gauge the students' understanding of the material and may therefore include questions which require the students to click on or touch the correct answer. While a translation of the question and the answer options is necessary for the students to comprehend and provide an answer, a click on the choice selected by a student must be able to be registered and recorded. Overlaying a translation of the answer choices should therefore not prevent the click from being recorded as a selection by the student. In other words, with user interactivity turned on, the student can interact with button(s) on the first layer (or another layer) which may actually include an overlay on top thereof. For example, if a button is on the first layer, a layer of the overlay can be modified by the apparatus to allow user interaction with the first layer in order to control the button in the displayed data on the first layer.

In embodiments where an object in the augmentation or overlay contains the translated text has a different size or position compared to the first layer object or region it provides a translation for, the interactivity may be turned on for pixels which correspond to the object in the augmentation or overlay but which do not correspond to the first layer object or region. For example, in case where there is a total text space difference (due to a factor such as character number, font size, or the like), the object in the augmentation or overlay may be larger than its corresponding first layer object or region. When this is a translation of a button or other interactive element, a user may click in an area which appears to be the button as displayed in the augmentation, but corresponds to an area outside of the button as it originally appeared in the first layer. If interactivity was only maintained in the area of the button in the first layer, that click would appear to be effective to a user, but not be registered as effective by a device. The augmentation may be configured to register a click in one region of the overlay as a click corresponding to a region of the first layer. In this way, a click (or other user interaction) may be "interaction translocated" or "click translocated". This may be particularly advantageous in embodiments or situations in which certain elements are displayed in the augmentation in a location which is not the same as the location of corresponding elements in the first layer. Such a change in location while maintaining a correspondence or relationship can be referred to as "translocation" or the element being "translocated". In this way, the click may be "passed to" an appropriate portion or region of the first layer to maintain functionality even if the user interacts with an element in the augmentation. For example, the location in the augmentation layer can have specific x- and y-coordinates which correspond to a pixel in a display. If not translocated, the location in the base layer can have x- and y-coordinates which are the same as the x- and y-coordinates of the location in the augmentation layer. If translocated, the location in the base layer can have different x- and/or y-coordinates than the x- and y-coordinates of the location in the augmentation layer. The skilled artisan will appreciate that the above description of "interaction translocation" is advantageous to include in and applicable to a wide variety of situations and embodiments outside of the example above.

Note that in an embodiment, the layers can correspond to channels such that a first channel (or first layer) can include a single, still image (such as a screen displayed on a desktop (Microsoft PowerPoint)), a second channel (or second layer) can include a streaming video (for example, from a webcam or some other camera), a third channel (or third layer) can include yet another image/video source.

Described herein are a device, a method, and a computer-readable medium to control user interactivity with such an augmentation.

Referring now to the figures, FIG. 1 is a schematic view of an apparatus/electronic device, such as a client/user device (a first device 101) communicatively connected, via a network 151, to a second electronic device, such as a server (a second device 150), and a generating device 120, according to an embodiment of the present disclosure. Further, in an embodiment, additional client/user devices can be communicatively connected to both the first device 101 and the second device 150. A second client/user device (a third device 102) can be communicatively connected to the first device 101, the second device 150, and the generating device 120. As shown, a plurality of the client/user devices can be communicatively connected to, for example, an Nth user device 10n.

An application can be installed or accessible on the first device 101 for executing the methods described herein. The application can also be integrated into the operating system (OS) of the first device 101. The first device 101 can be any electronic device such as, but not limited to, a personal computer, a tablet pc, a smart-phone, a smart-watch, an integrated AR/VR (Augmented Reality/Virtual Reality) headwear with the necessary computing and computer vision components installed (e.g., a central processing unit (CPU), a graphics processing unit (GPU), integrated graphics on the CPU, etc.), a smart-television, an interactive screen, a smart projector or a projected platform, an IoT (Internet of things) device or the like.

Figure 8A:
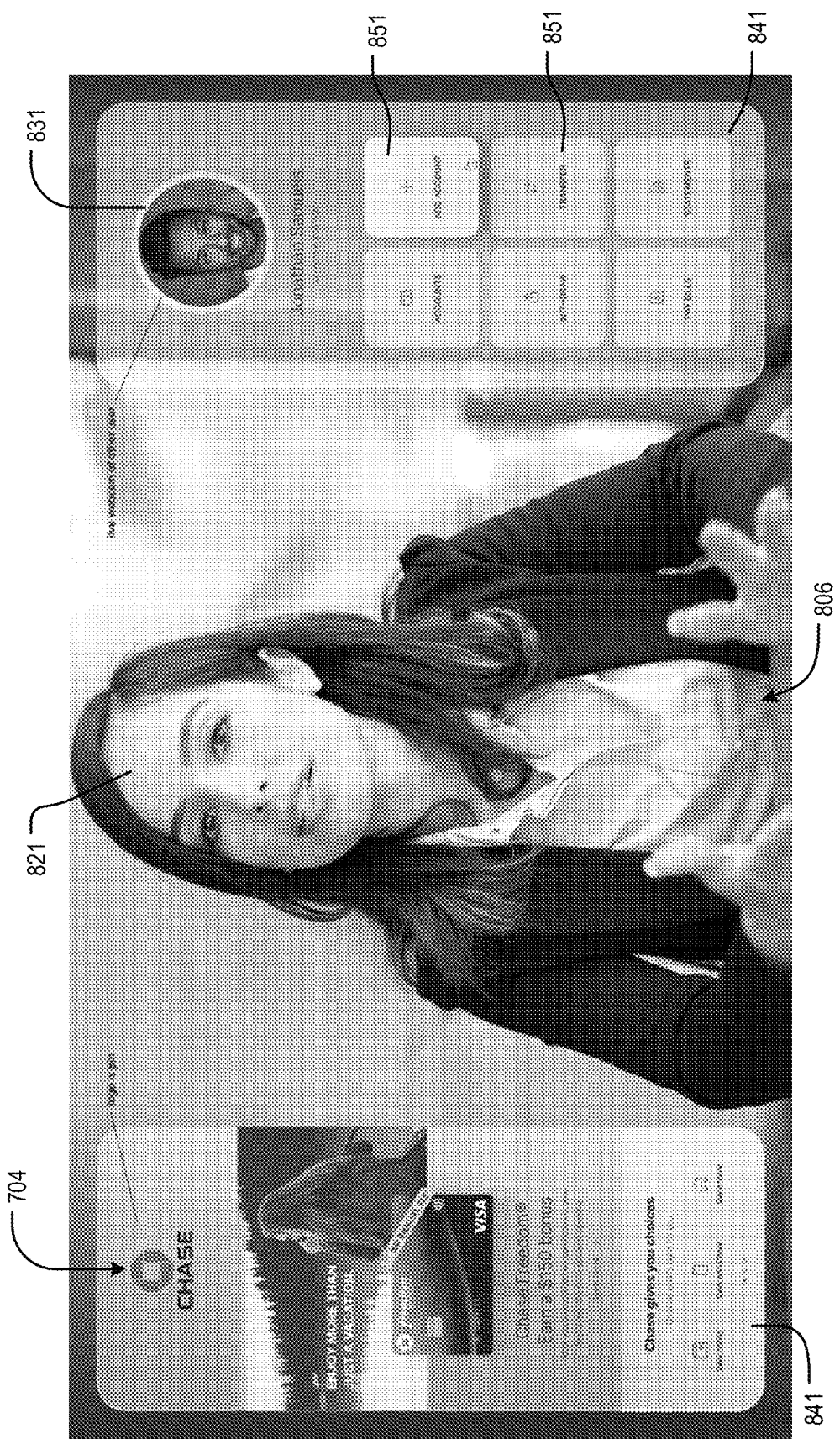
FIGS. 8A-8K depict an augmentation within a frame of a display, according to an exemplary embodiment of the present disclosure.
Figure 8B:
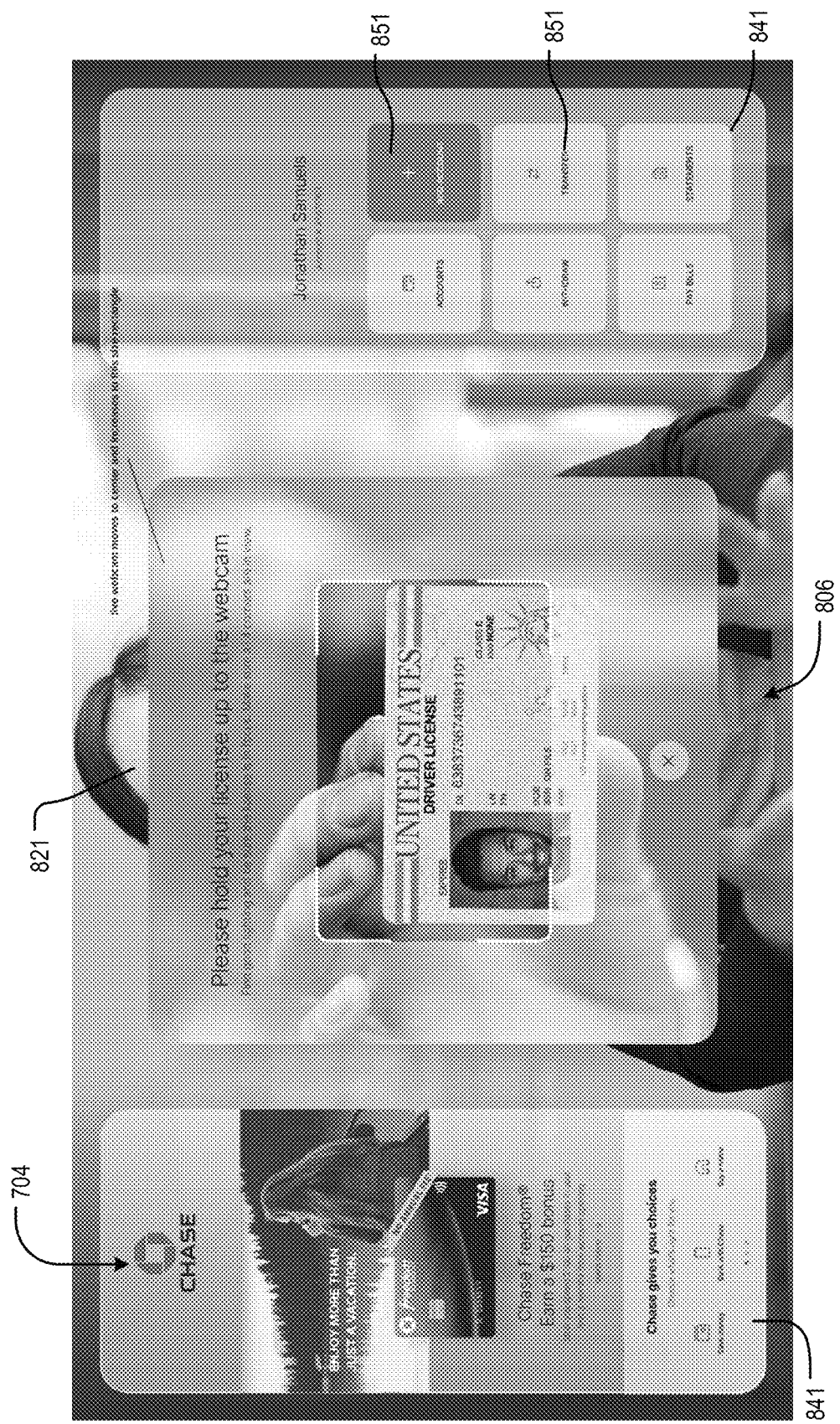
Figure 8C:
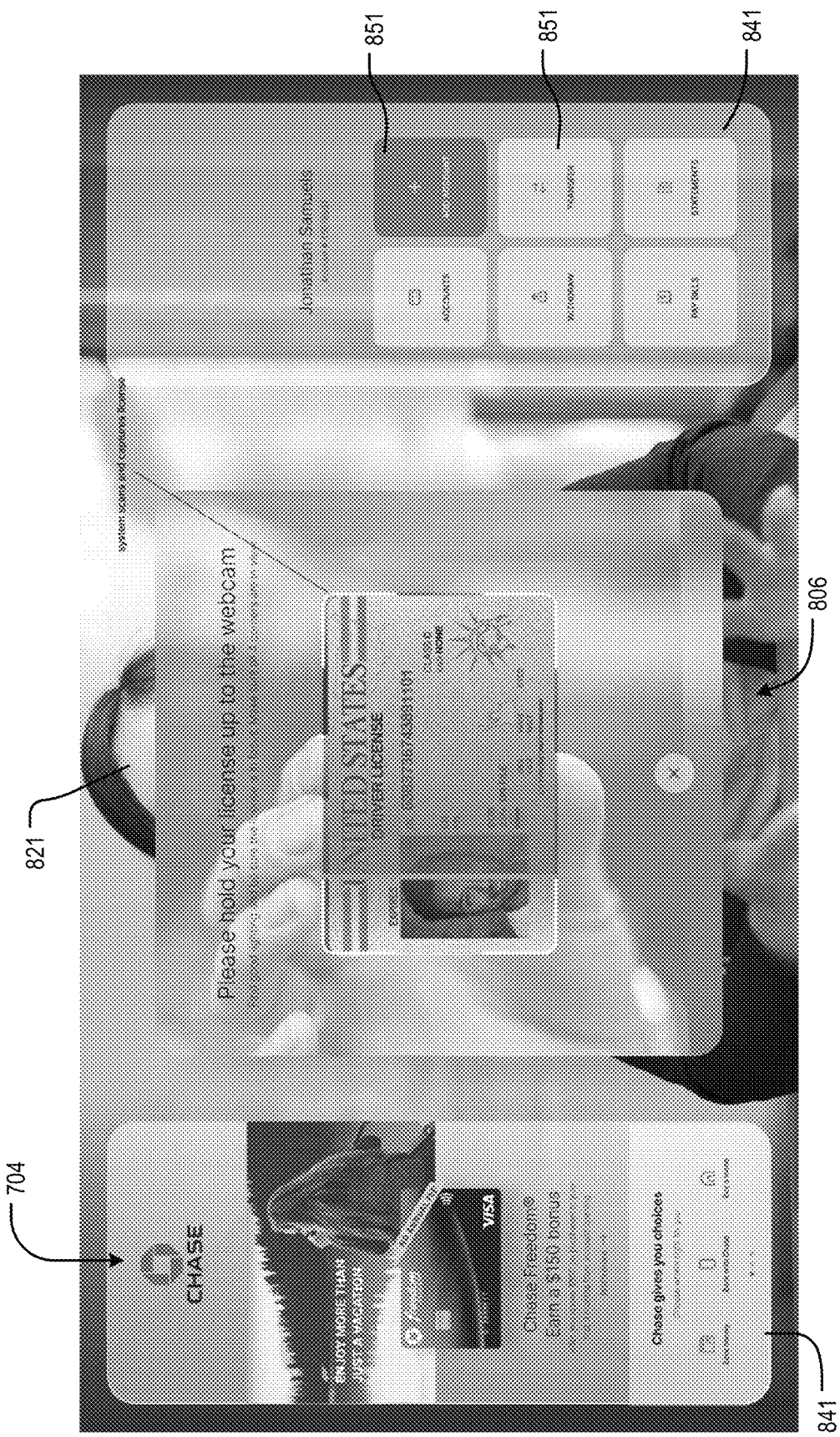
Figure 8D:
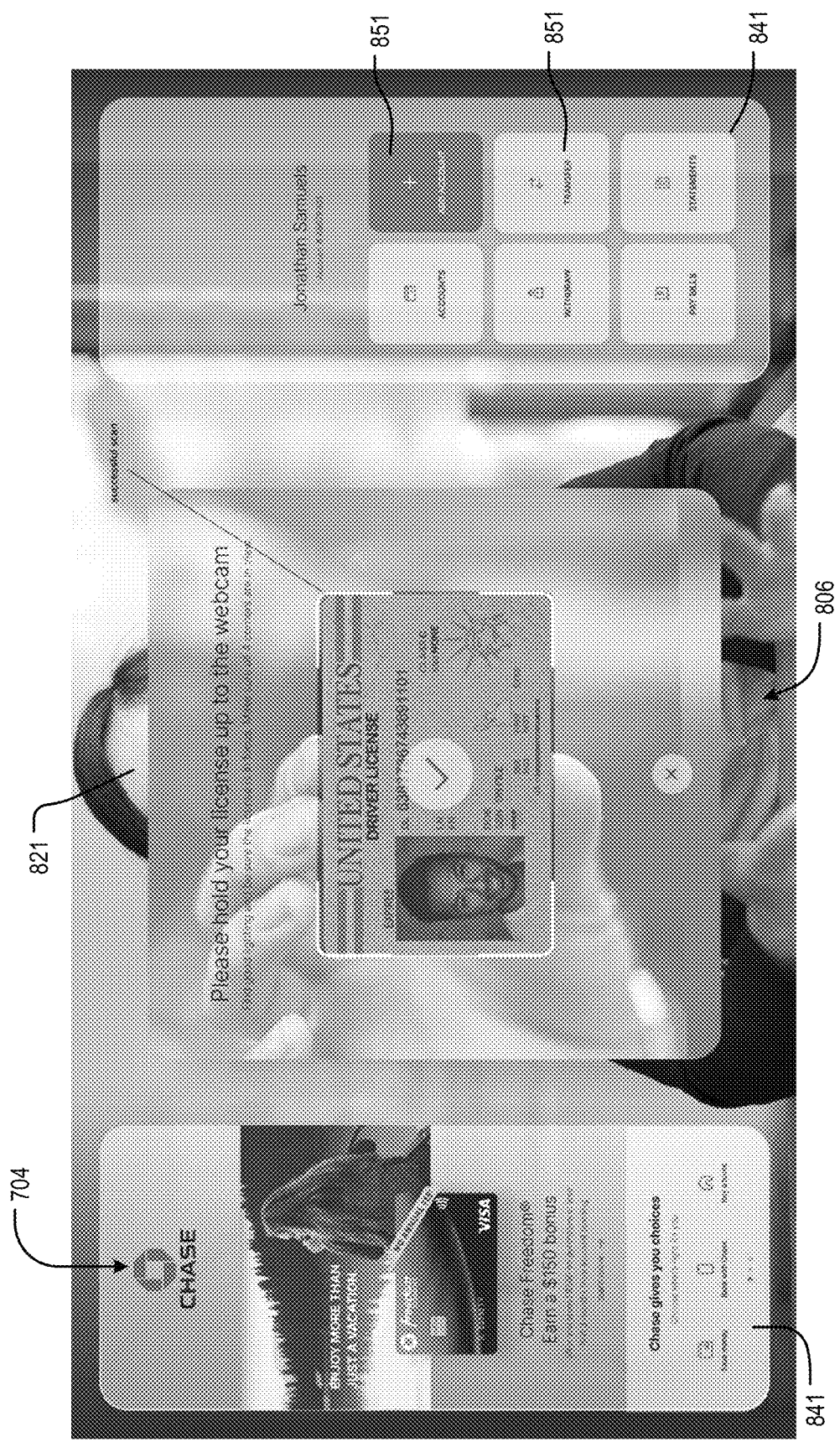
Figure 8E:
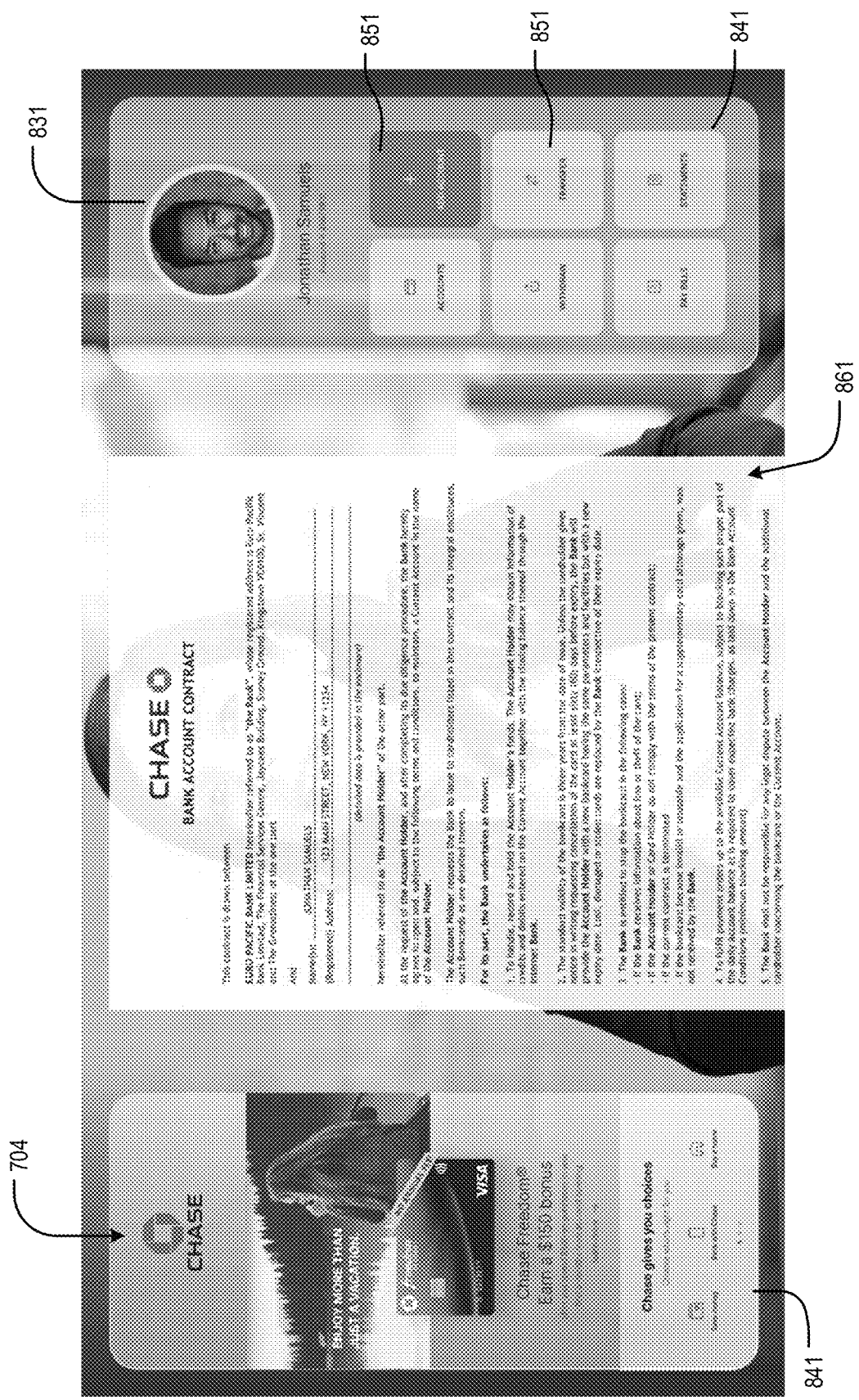
Figure 8F:
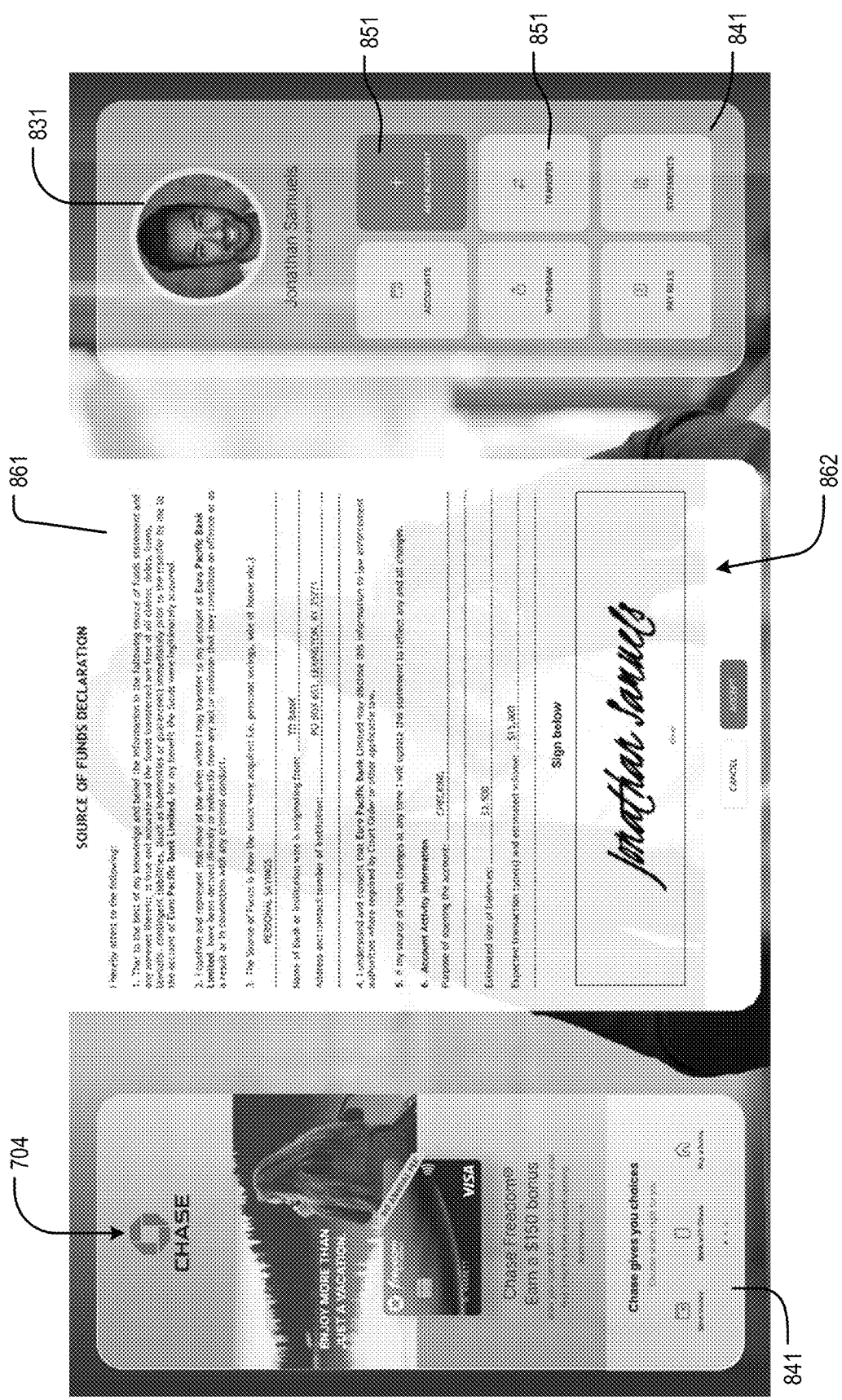
Figure 8G:
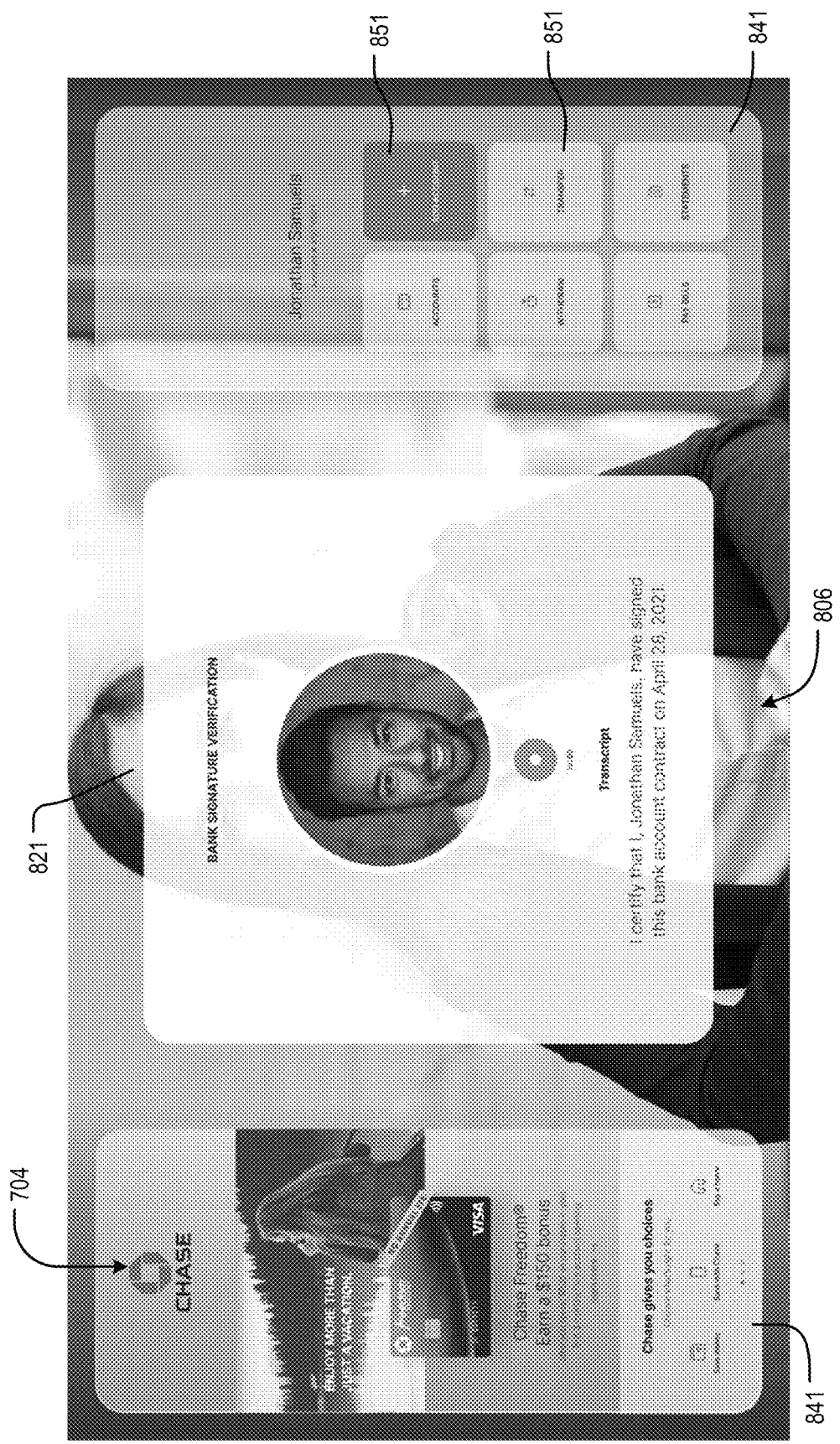
Figure 8H:
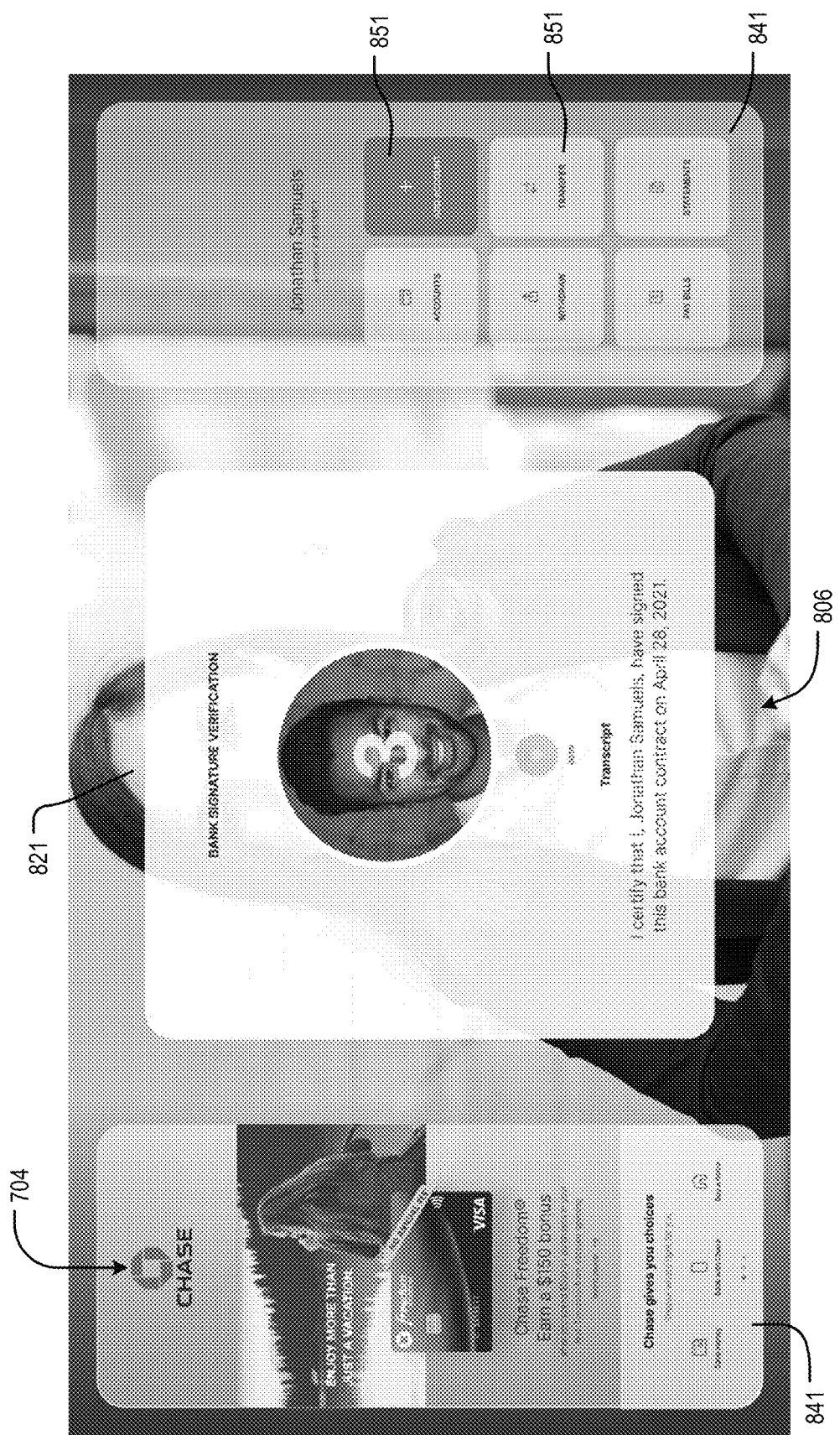
Figure 8I:
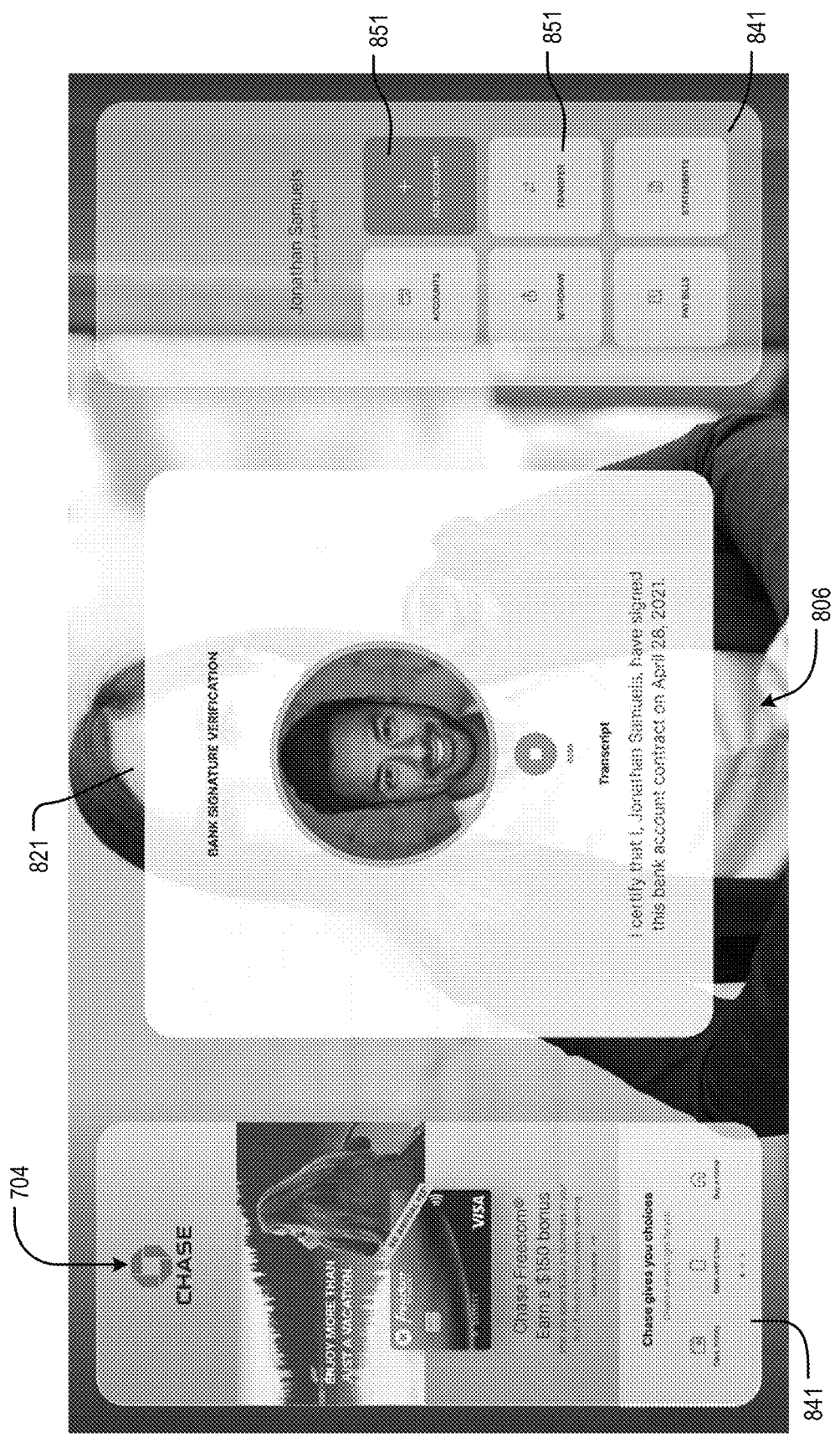
Figure 8J:
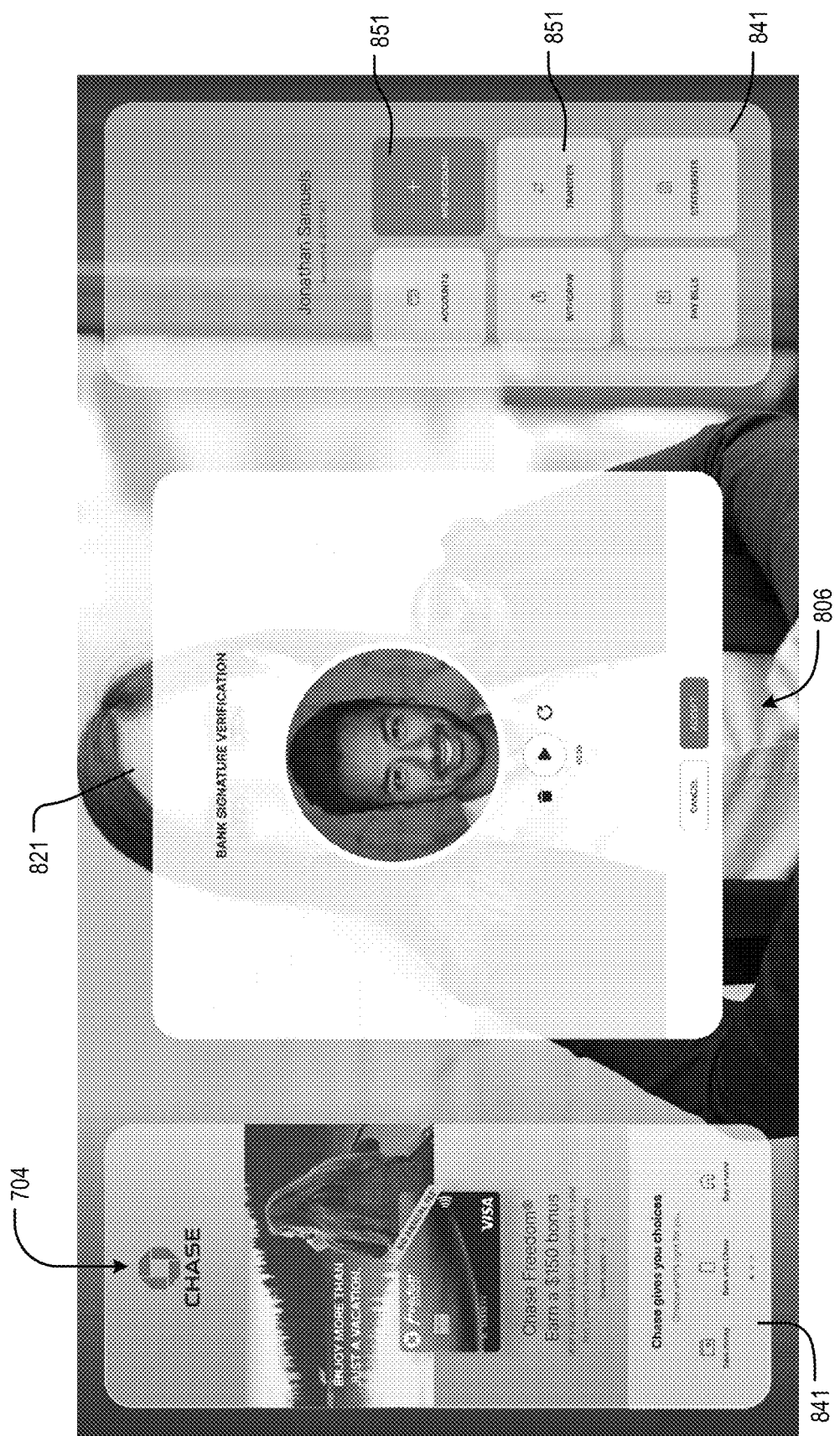
Figure 8K:
Figure 9:
FIG. 9 is an illustration of an augmentation within a frame of a display, according to an exemplary embodiment of the present disclosure.
Figure 10:
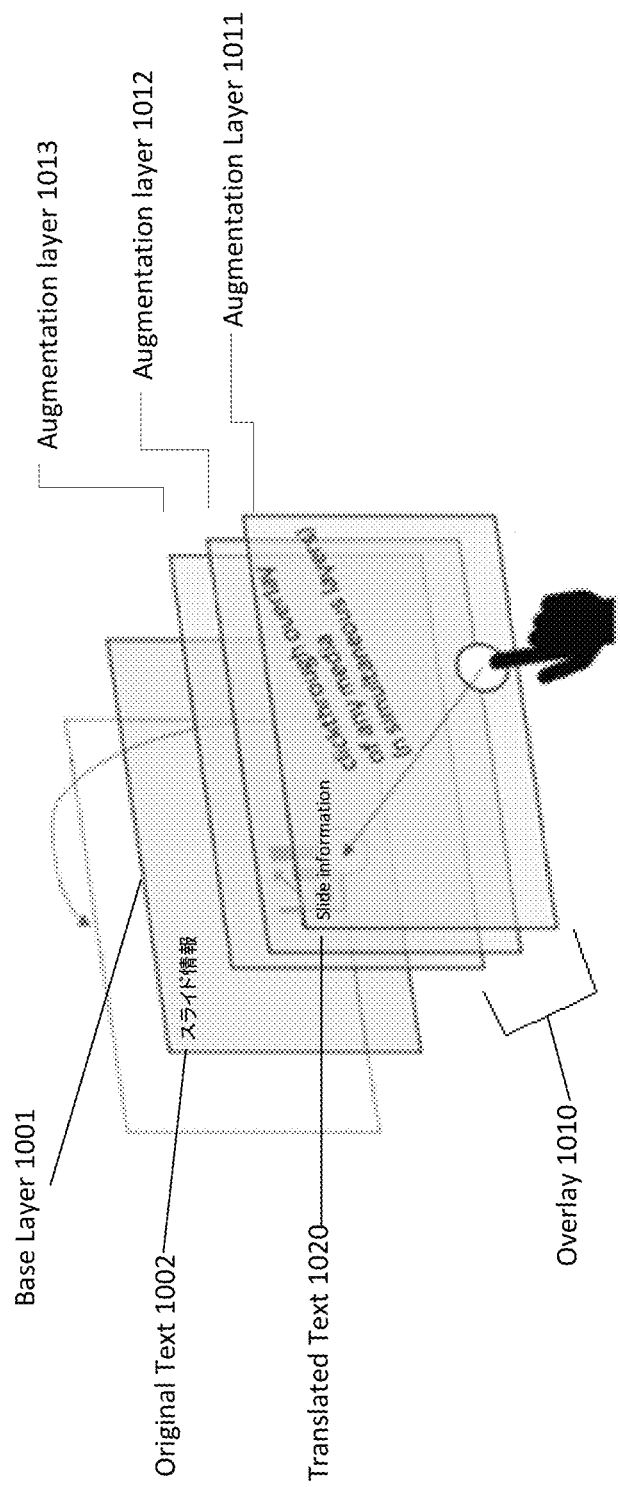
FIG. 10 is an illustration of an augmentation within a frame of a display, according to an exemplary embodiment of the present disclosure.

As illustrated in FIG. 1, the first device 101 includes a CPU, a GPU, a main memory, and a frame buffer, among other components (discussed in more detail in FIGS. 8-10). In an embodiment, the first device 101 can call graphics that are displayed on a display. The graphics of the first device 101 can be processed by the GPU and rendered in scenes stored on the frame buffer that is coupled to the display. In an embodiment, the first device 101 can run software applications or programs that are displayed on a display. In order for the software applications to be executed by the CPU, they can be loaded into the main memory, which can be faster than a secondary storage, such as a hard disk drive or a solid state drive, in terms of access time. The main memory can be, for example, random access memory (RAM) and is physical memory that is the primary internal memory for the first device 101. The CPU can have an associated CPU memory and the GPU can have an associated video or GPU memory. The frame buffer may be an allocated area of the video memory. The GPU can display the displayed data pertaining to the software applications. It can be understood that the CPU may have multiple cores or may itself be one of multiple processing cores in the first device 101. The CPU can execute commands in a CPU programming language such as C++. The GPU can execute commands in a GPU programming language such as HLSL. The GPU may also include multiple cores that are specialized for graphic processing tasks. Although the above description was discussed with respect to the first device 101, it is to be understood that the same description applies to the other devices (101, 102, 10n, and 120) of FIG. 1. Although not illustrated in FIG. 1, the second device 150 can also include a CPU, GPU, main memory, and frame buffer.

FIG. 2A is a flow chart for a method 200 of generating a reference patch and embedding the reference patch into displayed data, according to an embodiment of the present disclosure. The present disclosure describes generation of the reference patch and embedding of this patch into the displayed data content in order to integrate additional content on the first device 101. In an embodiment, the first device 101 can incorporate digital content into what is already being displayed (displayed data) for a more immersive experience.

In this regard, the first device 101 can generate the reference patch in step 205. The reference patch can be an object having an area and shape that is embedded in the displayed data at a predetermined location in the displayed data. For example, the reference patch can be a square overlayed and disposed in a corner of a digital document (an example of displayed data), wherein the reference patch can be fixed to a predetermined page for a multi-page (or multi-slide) digital document. The reference patch can thus also represent a region of interest in the digital document. The reference patch can be an object that, when not in a field of view of the user, is inactive. The reference patch can, upon entering the field of view of the user, become active. For example, the reference patch can become active when detected by the first device 101 in the displayed data. When active, the reference patch can retrieve digital content and augment the displayed data by incorporating the retrieved digital content into the displayed data. Alternatively, the reference patch can become active when being initially located within the frame of the screen outputting the displayed data. For example, even if another window or popup is placed over top of the reference patch, the reference patch may continue to be active so long as the reference patch remains in the same location after detection and the window including the document incorporating the reference patch is not minimized or closed. As will be described further below, the reference patch can have a predetermined design that can be read by the first device 101, leading to the retrieval and displaying of the digital content.

In an embodiment, the first device 101 can use a geometrical shape for the reference patch for placement into any displayed data using applications executed in the first device 101. The reference patch can take any shape such as a circle, square, rectangle or any arbitrary shape. In step 210, the reference patch can also have predetermined areas within its shape for including predetermined data. The predetermined data can be, for example, unique identifiers that correspond to a surface area of the displayed data. The unique identifiers can be, for example, a marker. As will be described below, the marker can take the form of patterns, shapes, pixel arrangements, pixel luma, and pixel chroma, among others. The surface area, by way of the unique identifiers, can be associated with predetermined digital content that is recalled and displayed at the corresponding surface area in the displayed data. The unique identifier can include encoded data that identifies the digital content, a location address of the digital content at the second device 150 (see description below), a screen position within the surface area at which the digital content is insertable in the displayed data, and a size of the digital content when inserted in the displayed data (adjustable before being displayed).

That is, in an embodiment, the surface area (or an available area in which digital content is insertable/to be inserted) of the displayed data can be portion(s) of the displayed data that do not include objects that might obscure the reference patch or the digital content displayed at the corresponding surface area in the displayed data. For example, the first device 101 can use computer vision (described below) to detect the objects. For example, the first device 101 can inspect an array to determine locations of the objects. For example, a slide in a slide deck can include text, pictures, logos, and other media, and the surface area can be the blank space or spaces around the aforementioned objects. Thus, the digital content can be displayed somewhere in the blank spaces. In an embodiment, the surface area of the displayed data can include portions of the displayed data that already include objects and the digital content can be displayed at the same location as the objects. For example, a slide in a slide deck can include a picture of a user, and the reference patch can be the area representing a face of the user and the digital content can be displayed at the same location as a body of the user. For example, a slide in a slide deck can include an image of a vehicle and the reference patch can be disposed in a blank space of the displayed data, while the digital content retrieved (e.g., a new car paint color and new rims) can be displayed over the image of the vehicle. In other words, the digital content may be placed in a blank area of the displayed data and/or in an area that is not blank (i.e., an area that includes text, image(s), video(s), etc.).

In step 215, the first device 101 can embed the reference patch into the displayed data, such as a word processing document file (i.e., DOC/DOCX) provided by e.g., Microsoft® Word, in a Portable Document Format (PDF) file such as the ones used by Adobe Acrobat®, in a Microsoft® PowerPoint presentation (PPT/PPTX), or in a video sequence file such as MPEG, MOV, AVI or the like. These file formats are illustrative of some file types which a user may be familiar with; however, applications included in the first device 101 are not limited to these types and other applications and their associated file types are possible.

The reference patch (or similar element) can be embedded into any displayed data, where the displayed data may be generated by an application running on or being executed by the first device 101. The reference patch can encompass the whole area designated by the displayed data, or just a portion of the area designated by the displayed data. The method of generating the reference patch and embedding the reference patch into the displayed data has been described as being performed by the first device 101, however, the second device 150 can instead perform the same functions. In order to be detected in the displayed data on the first device 101, the reference patch may only be simply displayed as an image on the screen. The reference patch may also simply be a raster image or in the background of an image. The reference patch is also able to be read even when the image containing the reference patch is low resolution. Because the reference patch is encoded in a hardy and enduring manner such that even if a portion of the reference patch is corrupted or undecipherable, the reference patch can still be activated and used.

In an embodiment, the reference patch can be embedded inside of a body of an email correspondence. The user can use any electronic mail application such as Microsoft Outlook®, Gmail®, Yahoo®, etcetera. As the application is running on the first device 101, it allows the user to interact with other applications. In an embodiment, the reference patch can be embedded on a video streaming or two-way communication interface such as a Skype® video call or a Zoom® video call, among others. In an embodiment, the reference patch can be embedded in displayed data for multi-party communication on a live streaming interface such as Twitch®.

One way in which the first device 101 may embed the reference patch into the displayed data is by arranging the generated reference patch in the displayed data such as in a desired document or other media. The reference patch may include a facade of the digital content which becomes an integrated part of the displayed data. The facade can act as a visual preview to inform the user of the digital content linked to the reference patch. The facade can include, for example, a screenshot of a video to be played, a logo, an animation, or an image thumbnail, among others. The facade can be a design overlay. The design overlay can be a picture that represents the underlying digital content superimposed over the reference patch. In an embodiment, the facade can indicate the content that is represented by the reference patch. The facade can be contained within the shape of the reference patch or have a dynamic size. For example, attention of the user can be brought to the facade by adjusting the size of the facade when the reference patch is displayed on the display. The adjustment of the size of the facade can also be dynamic, wherein the facade can enlarge and shrink multiple times. By the same token, a position and rotation of the facade can also be adjusted to produce a shaking or spinning effect, for instance.

Unlike traditional means of sending displayed data, the first device 101 may not send the whole digital content with a header file (metadata) and a payload (data). Instead, the reference patch that may include a facade of the underlying digital content is placed within the displayed data. If a facade is used, it indicates to the first device 101 that the surface area can have digital content that can be accessed with selection (clicking with a mouse, touchpad, eye-gaze, eye-blinks, or via voice-command) of the facade. The digital content can also be accessed or activated automatically, e.g., when the user has the reference patch displayed on the display of the first device 101. Other symbolic means of visualization can be employed to indicate to the user that the surface area is likely to include information for obtaining digital content. For example, a highlighting effect can be applied along a perimeter of the reference patch in a pulsating pattern of highlighting intensity to bring attention to the presence of the reference patch. For example, a series of spaced dashes surrounding the reference patch and oriented perpendicular to the perimeter of the reference patch can appear and disappear to provide a flashing effect. Other means can be employed to indicate to the user that the surface area is likely to include information for obtaining digital content, such as an audio cue.

The first device 101 employs further processes before embedding the reference patch into the displayed data. These processes and schemas are further discussed in FIG. 2B.

Figure 2B:
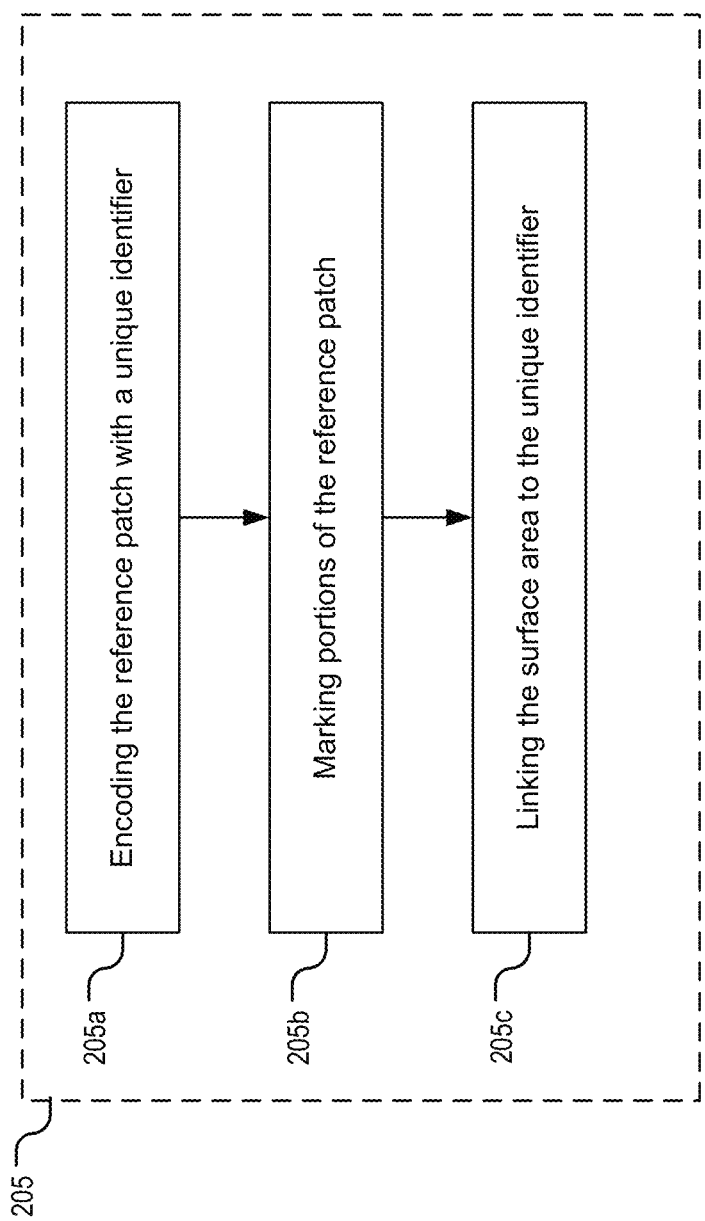
FIG. 2B is a flow chart of a sub-method of generating the reference patch, according to an exemplary embodiment of the present disclosure.

FIG. 2B is a flow chart of a sub-method of generating the reference patch, according to an embodiment of the present disclosure. The first device 101 can associate the digital content with the surface area corresponding to the reference patch (e.g., via the unique identifiers included therein) generated by the first device 101. In an embodiment, the surface area may encompass the whole of the displayed data or a portion of it.

The reference patch, which includes the unique identifiers corresponding to the surface area associated with the digital content, is then embedded into the displayed data by the first device 101. In some use cases, the displayed data including the reference patch can be sent or transmitted to a second user having the third device 102 including the same application, which then allows the second user to access information within the surface area and obtain the digital content and have it viewable on the third device 102. That is, the third device 102 can have the same displayed data overlaid with the augmenting digital content on the surface area of the display of the third device 102 in the location or locations defined by the reference patch.

In FIG. 2B, the generating device 120 uses additional processes to effectuate generation of the reference patch which is obtained and embedded by the first device 101. In an embodiment, the generating device 120 encodes the reference patch with the unique identifiers corresponding to the surface area in step 205*a*. The generating device 120 can mark areas of the reference patch in step 205*b* to form the marker that, either separately or in combination, define or may be used to access the unique identifiers. The marker can take the form of patterns, shapes, pixel arrangements, or the like. In an example, the marker can have a shape that corresponds to the shape of the surface area. In an example, the marker can have a size that corresponds to the size of the surface area. In an example, the marker can have a perimeter that corresponds to the perimeter of the surface area. The marker can use any feasible schema to provide identifying information that corresponds to the surface area within parts of the displayed data. In an embodiment, the marker can incorporate hidden watermarks that are only detectable by the first device 101 and the third device 102, which have detection functionality implemented therein, for example having the application installed or the functionality built into the operating system.

The marker can incorporate patterns which can then be extracted by the first device 101. In an example, the first device 101 can perform the embedding, then send the digital content having the embedded reference patch to the third device 102. The encoding is performed by the generating device 120 and may use any variety of encoding technologies such as the ARUCO algorithm to encode the reference patch by marking the reference patch with the marker. The first device 101 may also be used as the generating device 120.

In an embodiment, the marker can be comprised of a set of points, equidistant from each other and/or some angle apart from a reference point, such as the center of the reference patch or represent some other fiducial points. That is, the fiducial points corresponding to the marker can provide a set of fixed coordinates or landmarks within the digital content with which the surface area can be mapped relative to the fiducial points. In an embodiment, the marker can be comprised of a set of unique shapes, wherein predetermined combinations of the unique shapes can correspond to a target surface area (or available area, or areas) for displaying the displayed data. The predetermined combinations of the unique shapes can also correspond to predetermined digital content for displaying in the surface area. The predetermined combinations of the unique shapes can also correspond to/indicate a position/location where the digital content should be displayed at the surface area relative to a portion of the surface area. A combination of the set of points and unique identifiers can be used as well.

For example, the unique identifiers can be unique shapes that correlate to predetermined digital content as well as indicating where the digital content should be overlayed on the display (the screen position) relative to a set of points marked on the reference patch. The unique identifiers can also indicate a size of the digital content to be overlayed on the display, which can be adjustable based on the size of the surface area (also adjustable) and/or the size of the display of the first device 101. The unique identifiers can be relatively invisible or undetectable to the user, but readable by the first device 101 and cover predetermined areas of the reference patch. The unique identifiers, and by extension, the marker, can have an appearance that is marginally different from an appearance of the area of the reference patch. For example, the area of the reference patch can appear white to the user and the unique identifiers can also appear white to the user but may actually have a slightly darker pixel color that can be detected and interpreted by a device, such as the first device 101. For instance, the appearance of the unique identifiers can be 0.75% darker than the white color of the area of the reference patch. Such a small difference can be identified and discerned by the first device 101 while being substantially imperceptible to the user.

In an embodiment, the area of the reference patch can be divided into predetermined shapes, for instance a set of squares, and within each square, the marker (such as a "letter") can be included. For example, there can be 16 squares. Furthermore, subsets of the set of squares can be designated to represent varying information, such as a timestamp corresponding to 8 of the squares, a domain corresponding to 5 of the squares, a version corresponding to 1 of the squares, and additional information corresponding to a remainder of the squares. An identification based on the set of squares can be, for example, an 18-character (or "letter") hexadecimal. The set of squares can further include additional subsets for a randomization factor, which can be used for calculating a sha256 hash prior to encoding the reference patch with the hash. Together, the set of squares having the marker included therein can comprise the unique identifiers.

Moreover, the generating device 120 can also employ chroma subsampling to mark attributes represented by a particular pattern. In an embodiment, the generating device 120 can mark parts of the reference patch with predetermined patterns of pixel luma and chroma manipulation that represent a shape, a size, or a position of the surface area for displaying the digital content. Moreover, the generating device 120 can mark a perimeter of the reference patch with a predetermined edging pattern of pixel luma and chroma manipulation that represents a perimeter of the surface area for displaying the digital content.

The generating device 120 can further link the surface area with unique identifiers in step 205*c*. The unique identifiers can be hashed values (such as those described above) that are generated by the generating device 120 when the reference patch is generated (such as the one having the area of the reference patch divided into the subset of squares).

Figure 2C:
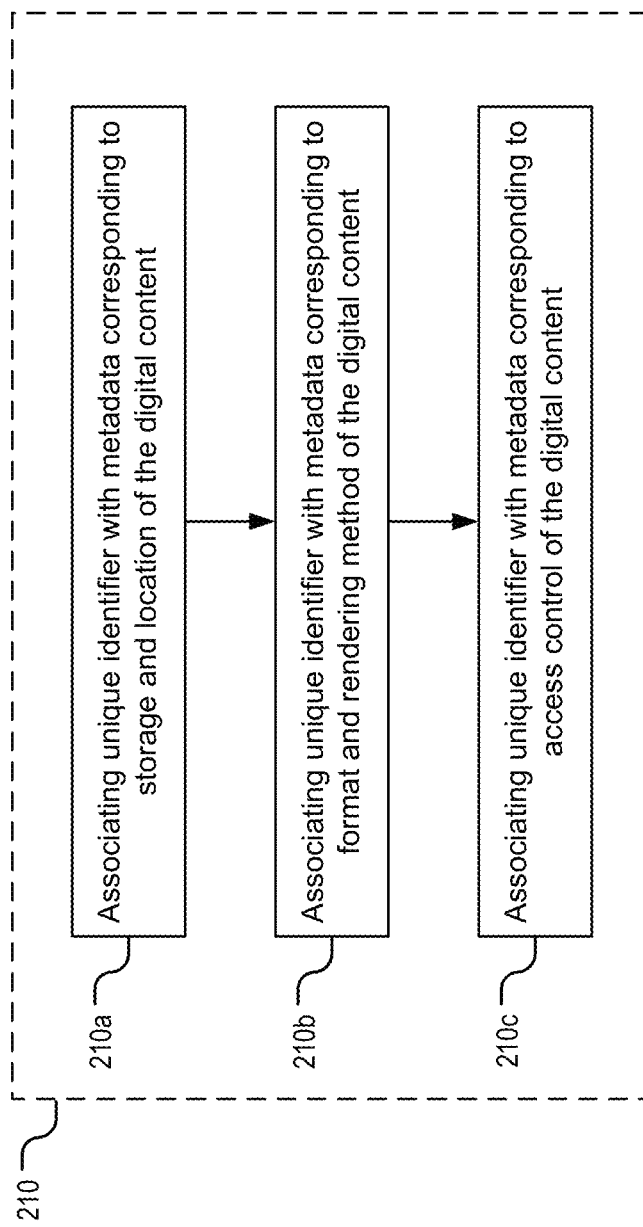
FIG. 2C is a flow chart of a sub-method of associating the surface area with digital content, according to an exemplary embodiment of the present disclosure.

FIG. 2C is a flow chart of a sub-method of associating the surface area with digital content, according to an embodiment of the present disclosure. In FIG. 2C, the generating device 120 uses additional processes to associate the surface area with digital content. In an embodiment, the generating device 120 can associate the unique identifiers corresponding to the surface area with metadata. In step 210*a*, the unique identifiers can be associated with metadata embodying information about the storage and location of the digital content. Moreover, in step 210*b*, the generating device 120 can associate the unique identifier of the surface area with metadata which embodies information about the format and rendering information used for the digital content. In step 210*c*, the generating device 120 can associate the unique identifiers of the surface area with metadata which embodies access control information of the digital content.

In an embodiment, the storage of the digital content can be on a remote server, such as the second device 150, and the location of the digital content can be the location address of the memory upon which it is stored at the remote server. The storage and location of the digital content are thus linked with the metadata that can point to where the digital content can later be obtained from. The digital content is not embedded into the displayed data. In an embodiment, the format and rendering information about the digital content is embodied in the metadata and associated with the unique identifiers. This information is helpful when the first device 101 or the third device 102 are on the receiving end of the transmitted displayed data and need to properly retrieve and process the digital content.

Moreover, in an embodiment, the access control of the digital content can also be encompassed in the metadata and associated with the unique identifiers corresponding to the surface area. The access control can be information defining whether the digital content can be accessed by certain individuals or within a certain geographical location. The access control information can define restrictions such as those placed upon time and date as to when and how long the digital content can be accessed. The access control information can define the type of display reserved for access by the first device 101. For example, a user may wish to restrict access to the digital content to certain types of devices, such as smartphone or tablets. Thus, the metadata defining a display requirement would encompass such an access control parameter.

Figure 2D:
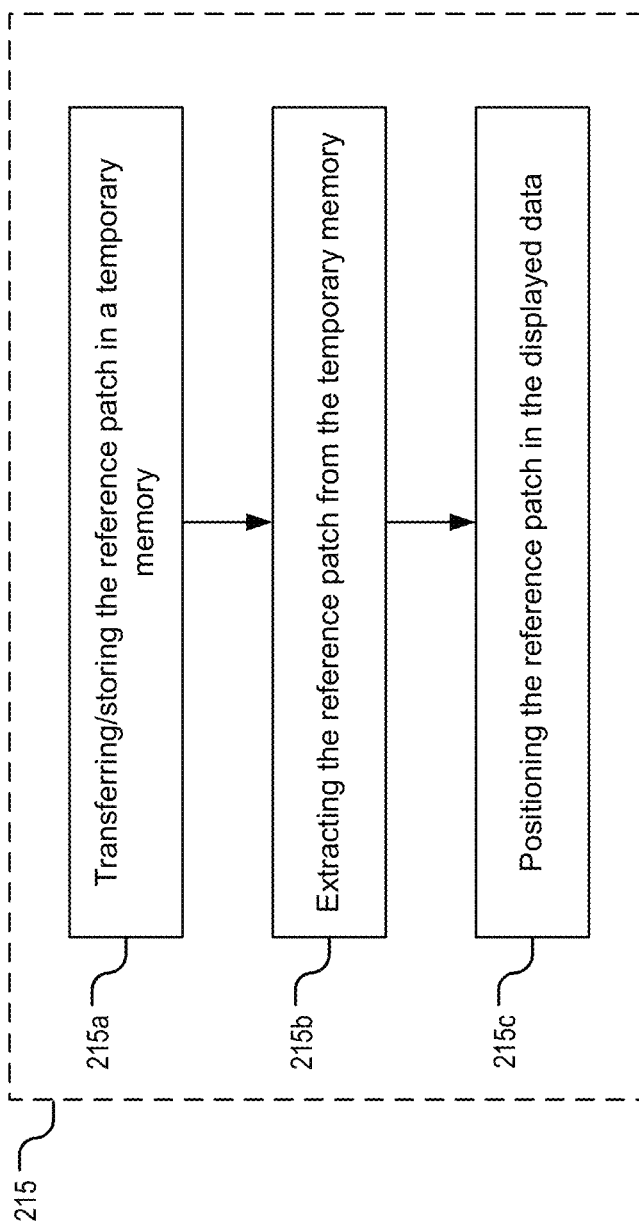
FIG. 2D is a flow chart of a sub-method of integrating the reference patch into the displayed data, according to an exemplary embodiment of the present disclosure.

FIG. 2D is a flow chart of a sub-method of integrating the reference patch into the displayed data, according to an embodiment of the present disclosure. In FIG. 2D, the generating device 120 uses additional processes to effectuate integration of the reference patch into the displayed data. In an embodiment, the first device 101 can temporarily transfer or store the reference patch in a storage of the first device 101 in step 215a. The storage can be accessed by the first device 101 for embedding the reference patch into the displayed data at any time. The first device 101 can extract the reference patch from the storage for embedding purposes in step 215b. The first device 101 can also arrange the reference patch at a predetermined location and with a predetermined reference patch size in step 215c. The first device 101 can further embed the reference patch such that a document, for example, having the reference patch embedded therein can be sent to a recipient, for example the second user using the third device 102, where he/she can access the document using the application on the third device 102 as further described below. Again, the features of the generating device 120 can be performed by the first device 101.

The displayed data can be output from a streaming application or a communication application with a data stream having the reference patch embedded therein. The actual digital content may not be sent along with the underlying displayed data or data stream, but only the unique identifier and/or a facade of the digital content is sent. The unique identifier and/or the underlying metadata can be stored in a cloud-based database such as MySQL which can point to the second device 150 or a cloud-based file hosting platform that ultimately houses the digital content. No limitation is to be taken with the order of the operation discussed herein; such that the sub-methods performed by the first device 101 can be carried out synchronous to one another, asynchronously, dependently or independently of one another, or in any combination. These stages can also be carried out in serial or in parallel fashion.

FIG. 3A is a flow chart for a method 300 of identifying the reference patch included in the displayed data and overlaying the digital content into displayed data, according to an embodiment of the present disclosure. In an embodiment, in step 305, the first device 101 can inspect the stream of data being outputted by the first device's 101 video or graphics card and onto the display of the first device 101. That is, the first device 101 can access a frame buffer of the GPU and analyze, frame by frame, in the frame buffer, the outputted stream of data which can include the displayed data. In an embodiment, a frame represents a section of the stream of the displayed data that is being displayed by the first device 101. In that regard, the first device 101 can inspect the outputted stream of data. The first device 101 can achieve this by intercepting and capturing data produced from the first device 101's video card or GPU that is communicated to the first device 101's display.

In an embodiment, in step 310, the first device 101 can process attributes of each pixel included in a single frame and detect groups of pixels within that frame, which may have a known predetermined pattern of pixel luma and chroma manipulation, in order to find the reference patch.

The inspected frame by frame stream of data is also used by the first device 101 to identify the reference patch which includes the unique identifiers therein. In an embodiment, the first device 101 employs pattern recognition algorithms to detect and identify the reference patch, the perimeter of the reference patch, and/or the area of the reference patch. In an embodiment, the first device 101 detects and identifies the reference patch via the marker itself. A variety of pattern recognition algorithms can be used, such as Artificial Neural Networks (ANN), Generative Adversarial Networks (GAN), thresholding, SVM (Support Vector Machines) or any classification and pattern recognition algorithm available conducive to computer vision. Computer vision techniques may be artificial intelligence techniques that train computers to interpret and understand a visual world. In an example, the computer vision techniques may be an image recognition task, a semantic segmentation task, and the like. In a non-limiting example, the processor-based computer vision operation can include sequences of filtering operations, with each sequential filtering stage acting upon the output of the previous filtering stage. For instance, when the processor (processing circuitry) is/includes a GPU, these filtering operations are carried out by fragment programs.

In another example, the computer vision techniques may be a processor-based computer vision technique. In an embodiment, the first device 101 can look for predetermined or repeatable patterns within the frame which indicates the presence of the reference patch. In an embodiment, the first device 101 can identify the reference patch based on a confidence level, the confidence level being high when the predetermined pattern of pixel luma and chroma manipulation and the predetermined edging pattern of pixel luma and chroma manipulation are detected in the reference patch. The confidence level can be lower when one or neither of the predetermined patterns is/are detected.

According to an embodiment, in the event that an input to the operation is an image, the input images can be initialized as textures and then mapped onto quadrilaterals. By displaying these quadrilaterals in appropriately sized windows, a one-to-one correspondence of image pixels to output fragments can be ensured. Similarly, when the input to the operation is an encoded image, a decoding process may be integrated into the processing steps described above. A complete computer vision algorithm can be created by implementing sequences of these filtering operations. After the texture has been filtered by the fragment program, the resulting image is placed into texture memory, either by using render-to-texture extensions or by copying the frame buffer into texture memory. In this way, the output image becomes the input texture to the next fragment program. This creates a pipeline that facilitates the entire computer vision algorithm. However, often a complete vision algorithm may require operations beyond filtering. For example, summations are common operations. Furthermore, more-generalized calculations, such as feature tracking, can also be mapped effectively onto graphics hardware.

In an embodiment, the reference patch can be identified by use of edge detection methods. In particular, edge detection can be used for the perimeter of the reference patch having a predetermined pattern (the predetermined edging pattern). In an example, the edge detection method may be a Canny edge detector. The Canny edge detector may run on the GPU. In one instance, the Canny edge detector can be implemented as a series of fragment programs, each performing a step of the algorithm.

In an embodiment, the identified reference patch can be tracked from frame to frame using feature vectors. Calculating feature vectors at detected feature points is an operation in computer vision. A feature in an image is a local area around a point with some higher-than-average amount of uniqueness. This makes the point easier to recognize in subsequent frames of video. The uniqueness of the point is characterized by computing a feature vector for each feature point. Feature vectors can be used to recognize the same point in different images and can be extended to more generalized object recognition techniques.

Feature detection can be achieved using methods similar to the Canny edge detector that instead search for corners rather than lines. If the feature points are being detected using sequences of filtering, the GPU can perform the filtering and read back to the CPU a buffer that flags which pixels are feature points. The CPU can then quickly scan the buffer to locate each of the feature points, creating a list of image locations at which feature vectors on the GPU will be calculated.

In step 315, the first device 101 can decode the encoded data of the unique identifiers from the area of the reference patch, wherein the unique identifiers correspond to the surface area. The unique identifiers can be hashed values that could have been generated beforehand by the first device 101.

In step 320, the first device 101 can use the unique identifiers to link the surface area with the digital content using metadata and retrieve the digital content based on the unique identifiers.

In step 325, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 3B:
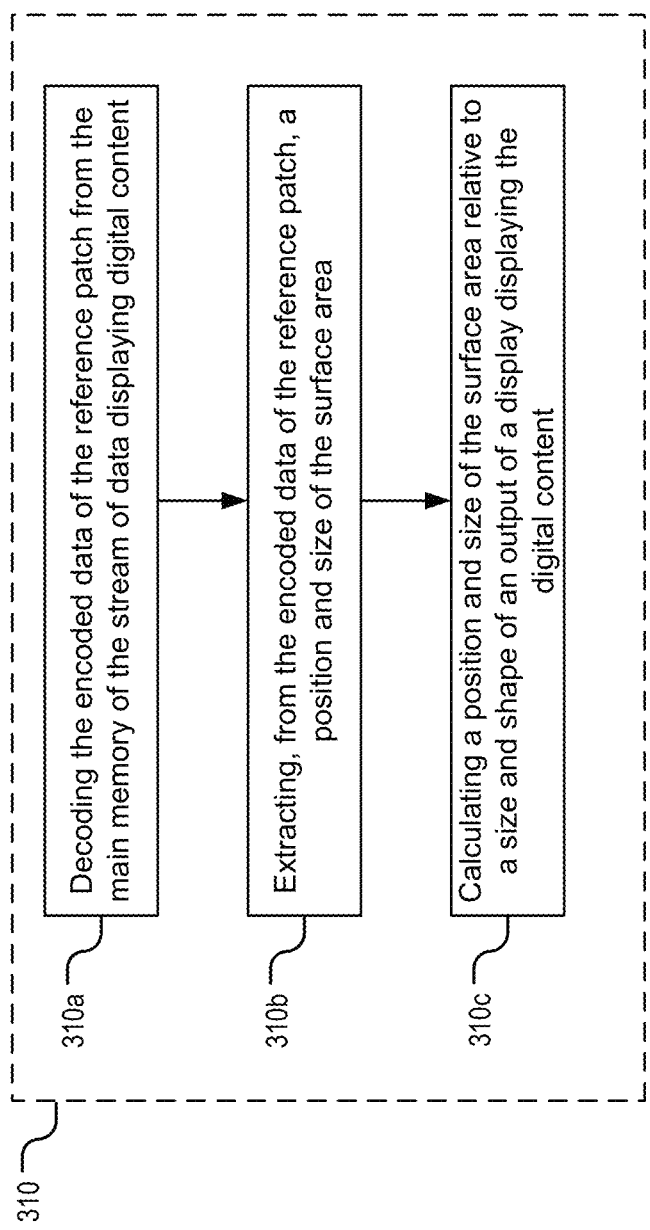
FIG. 3B is a flow chart of a sub-method of identifying the reference patch with unique identifiers corresponding to the surface area from the stream of data, according to an exemplary embodiment of the present disclosure.

In an embodiment, the first device 101 identifies the surface area corresponding to the reference patch by employing further processes to process the frames. To this end, FIG. 3B is a flow chart of a sub-method of identifying the reference patch with the unique identifiers corresponding to the surface area from the stream of data, according to an embodiment of the present disclosure.

In step 310a, the first device 101 can decode the encoded reference patch from the frame. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

In step 310b, the first device 101 can also extract attributes of the surface area from the reference patch. In an embodiment, the position, size, shape, and perimeter of the surface area are extracted, although other parameters can be extracted as well. Other parameters include boundary lines, area, angle, depth of field, distance, ratio of pairs of points, or the like. In an embodiment, where shape and perimeter are designated as the attributes, the first device 101 makes determinations of size, shape, and perimeter and outputs that result. Specifically, the size or shape of the surface area can be determined by evaluating a predetermined or repeatable pattern of pixel luma and chroma manipulation in the reference patch. The predetermined pattern can be marked on, within the area, or outside of the area of the reference patch. The predetermined pattern can correspond to the size or shape of the surface area. The predetermined pattern can correspond to the size or shape of the digital content. The perimeter of the surface area can also be determined by evaluating a predetermined edging pattern of pixel luma and chroma manipulation. The predetermined edging pattern can be marked on, within the area, or outside of the area of the reference patch. That is, the predetermined edging pattern of the reference patch can correspond to the perimeter of the surface area. The predetermined edging pattern of the reference patch can correspond to the perimeter of the digital content.

In step 310c, the first device 101 can also calculate a position and size of the surface area relative to the size and shape (dimensions) of the output signal from the display that is displaying the displayed data. In an embodiment, the calculating of the size, relative to the size and shape of the outputted signal from the display, includes determining the size of the surface area by inspecting a furthest measured distance between the edges of the surface area. Furthermore, the calculating of a location of the surface area, relative to the size and shape of the outputted signal from the display, includes determining the location of the surface area relative to the size and shape of the displayed data outputted through the display. This includes calculating the distance between the outer edges of the surface area and the inner edges of the displayed data being outputted by the display. The determined size and location of the surface area can be outputted as a result. Notably, prior to overlaying the digital content into the displayed data, the first device 101 can adjust, based on the predetermined pattern and the predetermined edging pattern, the size and perimeter of the digital content for displaying in the display of the first device 101. For example, the size and perimeter of the digital content for displaying in the display of the first device 101 can be scaled based on the size and perimeter of the surface area and/or the size of the display.

The first device 101 can provide information regarding the characteristics of the output video signal, such that the digital content that is later overlaid can correctly be displayed to account for various manipulations or transformations that may take place due to hardware constraints, user interaction, image degradation, or application intervention. Such manipulations and transformations may be the relocation, resizing, and scaling of the reference patch and/or the surface area, although the manipulations and transformations are not limited to those enumerated herein.

In an embodiment, the reference patch itself can be used as the reference for which the digital content is displayed on the surface area. In one example, the location at which to display the digital content in the surface area can be determined relative to the location of the reference patch on the displayed data. In one example, the size of the surface area can be determined relative to the size of the reference patch on the displayed data. In an example employing a combination of the two properties of the reference patch, the reference patch displayed in the displayed data on a smart phone having a predetermined size and a surface area can be scaled relative to the predetermined size of the display of the smart phone. This can be further adjusted when the reference patch in the same displayed data is displayed on a desktop monitor, such that the predetermined size of the reference patch in the displayed data displayed on the desktop monitor is larger and thus the size of the surface area can be scaled to be larger as well. Furthermore, the location of the surface area can be determined via a function of the predetermined size of the reference patch. For example, the location at which to display the digital content in the surface area can be disposed some multiple widths laterally away from the location of the reference patch as well as some multiple heights longitudinally away from the location of the reference patch. As such, the predetermined size of the reference patch can be a function of the size of the display of the first device 101. For example, the predetermined size of the reference patch can be a percentage of the width and height of the display, and thus the location and the size of the surface area are also a function of the width and height of the display of the first device 101.

In an embodiment, the first device 101 can determine an alternative location at which to display the digital content based on behaviors of the user. For example, the first device 101 can compare the encoded data corresponding to the location at which to display the digital content in the surface area to training data describing movement and focus of the user's eyes while viewing the displayed data. Upon determining the location at which to display the digital content in the surface area (as encoded in the reference patch) is not the same as the training data, the first device 101 can instead display the digital content at the location described by the training data as being where the user's eyes are focused in the displayed data at a particular time. For example, the user's eyes may be predisposed to viewing a bottom-right of a slide in a slide deck. The first device 101 can decode the reference patch and determine the digital content is to be displayed in a bottom-left of the slide deck. The training data can indicate that, for example, the user's eyes only focus on the bottom-left of the slide 10% of the time, while user's eyes focus on the bottom-right of the slide 75% of the time. Thus, the first device 101 can then display the digital content in the bottom-right of the slide instead of the bottom-left. The training data can also be based on more than one user, such as a test population viewing a draft of the slide deck. For example, the training data can be based on multiple presentations of the slide deck given to multiple audiences, wherein eye tracking software determines the average location of the audience's focus on each of the slides.

Figure 3C:
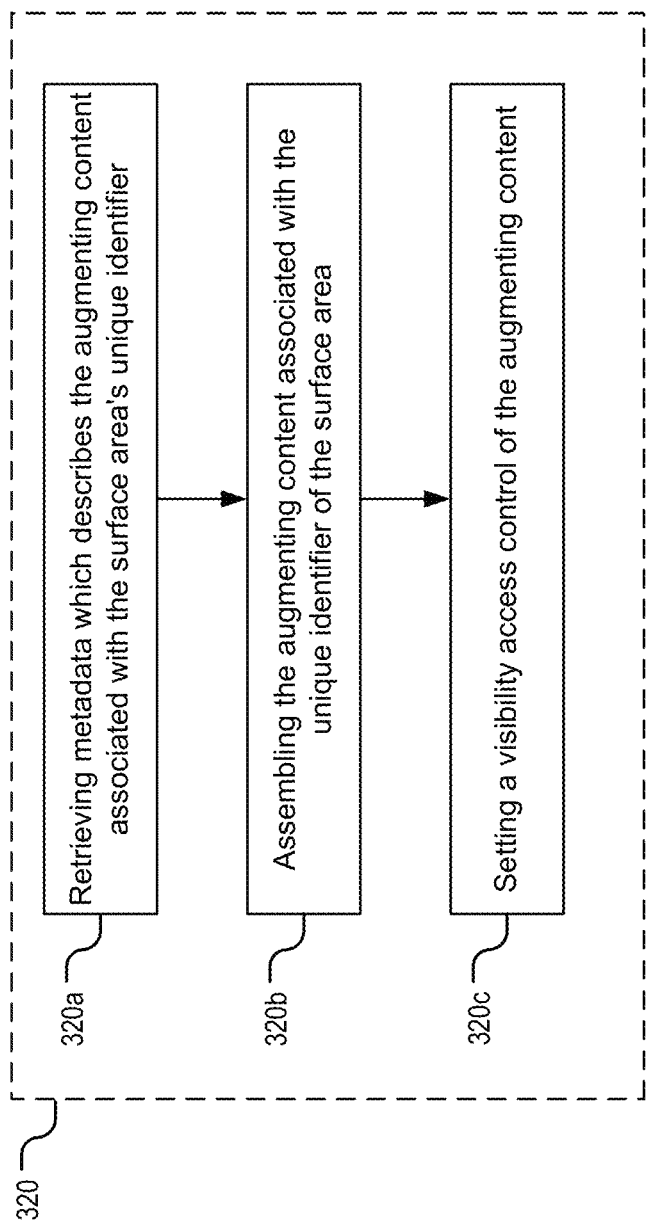
FIG. 3C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 3C is a flow chart of a sub-method of associating the unique identifiers with digital content, according to an embodiment of the present disclosure. In step 320a, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 320b, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 320c, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 3A, in step 325, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

FIG. 4A is a flow chart for a method 400 of identifying the reference patch included in the displayed data and overlaying the digital content into displayed data, according to an embodiment of the present disclosure. In an embodiment, in step 405, the first device 101 can inspect the main memory on the first device 101. Again, the main memory of the first device 101 refers to physical internal memory of the first device 101 where all the software applications are loaded for execution. Sometimes complete software applications can be loaded into the main memory, while other times a certain portion or routine of the software application can be loaded into the main memory only when it is called by the software application. The first device 101 can access the main memory of the first device 101 including an operating system (OS) memory space, a computing memory space, and an application sub-memory space for the computing memory space in order to determine, for example, which software applications are running (computing memory space), how many windows are open for each software application (application sub-memory space), and which windows are visible and where they are located (or their movement) on the display of the first device 101 (OS memory space). That is to say, the OS memory takes up a space in (or portion of) the main memory, the computing memory takes up a space in (or portion of) the main memory, and the application sub-memory takes up a space in (or portion of) the computer memory. This information can be stored, for example, in the respective memory spaces. Other information related to each software application can be obtained and stored and is not limited to the aforementioned features.

In an embodiment, in step 410, the first device 101 can aggregate the various memory spaces into an array (or table or handle). That is, the first device 101 can integrate data corresponding to the OS memory space and data corresponding to the computing memory space into the array. The array can be stored on the main memory of the first device 101 and include information regarding the software applications running on the first device 101. In an embodiment, the computing memory spaces (including the application sub-memory spaces) can be aggregated into the array. This can be achieved by querying the main memory for a list of computing memory spaces of all corresponding software applications governed by the OS and aggregating all the computing memory spaces obtained from the query into the array. This can be, for example, aggregating the computing memory space of a PowerPoint file and the computing memory space of a Word file into the array. The information in the computing memory spaces stored in the array can include metadata of the corresponding software application. For example, for PowerPoint, the information in the array can include a number of slides in a presentation, notes for each slide, etc. Moreover, each window within the PowerPoint file and/or the Word file can be allocated to a sub-memory space. For example, the array can include the location of each window for each software application running on the first device 101, which can be expressed as an x- and y-value pixel coordinate of a center of the window. For example, the array can include the size of each window for each software application running on the first device 101, which can be expressed as a height and a width value.

In an embodiment, in step 415, the first device 101 can determine a rank or a hierarchy of the computing memory spaces in the array. The rank can describe whether a window of a software application or the software application itself is active or more active as compared to another software application running on the first device 101. An active window or software application can correspond to the window or software application that is currently selected or clicked in or maximized. For example, an active window can be a window of a web browser that the user is scrolling through. In an embodiment, this can be achieved by querying the OS memory space and each computing memory space in the main memory for existing sub-memory spaces, querying the OS memory space and each computing memory space in the main memory for a rank or hierarchical relationship between (software application) sub-memory spaces found, recording the list of sub-memory spaces and the rank relationship between sub-memory spaces, and associating the list of sub-memory spaces and the rank relationship between the sub-memory spaces with the array. For example, a window of a first application can be an active window on the first device 101 and has a higher rank than an inactive window of a second application also running on the first device 101. The active window can be the window the user has currently selected and displayed over all other windows on the display of the first device 101. Notably, there can be multiple visible windows, but one of said multiple visible windows can have a higher rank because it is currently selected by the user and is the active window.

For example, two documents can be viewed in a split-screen side-by-side arrangement without any overlap of one window over another window, and a third document can be covered by the two documents in the split-screen side-by-side arrangement. In such an example, the user can have one of the two split-screen documents selected, wherein the selected document is the active window and would have a higher rank (the highest rank) than the other of the two split-screen documents since the higher (highest) ranked document is selected by the user. The third document behind the two split-screen documents would have a lower rank (the lowest rank) than both of the two split-screen documents since it is not visible to the user. Upon bringing the third document to the front of the display and on top of the two split-screen documents, the third document rank would then become the highest rank, while the two split screen documents' rank would become lower (the lowest) than the third document (and the rank of the two split screen documents can be equal).

In an embodiment, the rank can be determined based on eye or gaze tracking of the user (consistent with or independent of whether a window is selected or has an active cursor). For example, a first window and a second window can be visible on the display, wherein the first window can include a video streaming from a streaming service and the second window can be a word processing document. The rank of the first window and the second window can be based on, for example, a gaze time that tracks how long the user's eyes have looked at one of the two windows over a predetermined time frame. The user may have the word processing document selected and active while the user scrolls through the document, but the user may actually be watching the video instead. In such a scenario, an accrued gaze time of the first window having the video can be, for example, 13 seconds out of a 15 second predetermined time frame, with the other 2 seconds in the predetermined time frame being attributed to looking at the first window having the word processing document. Thus, the rank of the first window having the video can be higher than the rank of the second window because the gaze time of the first window is higher than the gaze time of the second window. Notably, if there is only one open window, the rank of that window would be ranked as the top-ranked window (because it is the only window) regardless of/independent from other user input, such as gaze, selection, etc.

In an embodiment, the rank can be determined based on the eye tracking and a selection by the user. For example, the user can select the first window having the video and looking at a description of the video playing in the same first window. In such a scenario, both the eye tracking accruing a longer gaze time (than the second window) and the user selecting the first window to make it the active window can make the first window the top-ranked window.

Thus, the rank can be determined based on one or a plurality of elements. The more elements being used, the more accurate the determination of the rank. Hence, the rank can be determined by a combination of eye or gaze tracking, an input selection by a user (for example, the user clicking on an icon or a display element in a window (the first window or the second window), a user hovering a mouse or pointer over a portion of a window (without necessarily clicking or selecting anything), etc. The rank determination can also go beyond these elements/factors to include preset settings related to a particular user and/or past behavior/ experiences. For example, the user can preset certain settings and/or the user's device can learn from user's past behavior/experiences about his/her preference when two or more windows are displayed at the same time side by side.

For example, this particular user may always play a video in the first window while working on a presentation in the second window. In such case, the user's device can learn from this behavior and use this knowledge to more accurately determine the rank (for example, when the first window has a video playing and the second window corresponds to a work processing document or a presentation, the active window is likely the second window). Such knowledge can be paired with eye gaze direction and other factors such as mouse/cursor movement, etc. in order to more accurately determine the rank.

In an embodiment, in step 420, the inspected main memory data can also include a reference patch therein and the first device 101 can identify the reference patch in the main memory data. In an embodiment, the first device 101 can detect and identify the reference patch in the main memory by a value, such as a known encoding, where the format of the of the data itself can indicate to the application where the reference patch is located. For example, the known encoding can be 25 bytes long and in a predetermined position within the binary bits of the main memory. In an embodiment, the reference patch can be identified by parsing an application (e.g. a Word document), looking through the corresponding metadata in the computing memory space, and finding the reference patch in the metadata by attempting to match the metadata with a predetermined indicator indicating the presence of the reference patch, such as the unique identifier.

In step 425, the first device 101 can determine whether the software application corresponding to the computing memory space (and sub-memory space) in which the reference patch was identified is active or in the displayed data. Referring to the example of step 415, while the window of the first application can include the reference patch, the inactive window of the second application can become active and overlay over the window of the first application which was previously the active window. In such a scenario, the reference patch in the window of the first application can become covered by the window of the second application. As such, the secondary digital content of the reference patch in the window of the first application need not be displayed or can cease being displayed. However, in an alternative scenario, the window of the first application, including the reference patch, can be active and the reference patch therein can be uncovered and visible.

In step 430, upon determining the software application corresponding to the computing memory space (and submemory space) in which the reference patch was identified is active or in the displayed data, the first device 101 can decode the encoded data of the unique identifiers from the area of the reference patch, wherein the unique identifiers correspond to the surface area.

In step 435, the first device 101 can use the unique identifiers to link the surface area with the digital content using metadata and retrieve the digital content based on the unique identifiers.

In step 440, the first device 101 can overlay the digital content onto the surface area of the displayed data based on the unique identifiers.

Again, the method of identifying the reference patch included in the displayed data and augmenting the displayed data is described as performed by the first device 101, however, the second device 150 can instead perform the same functions.

Figure 4B:
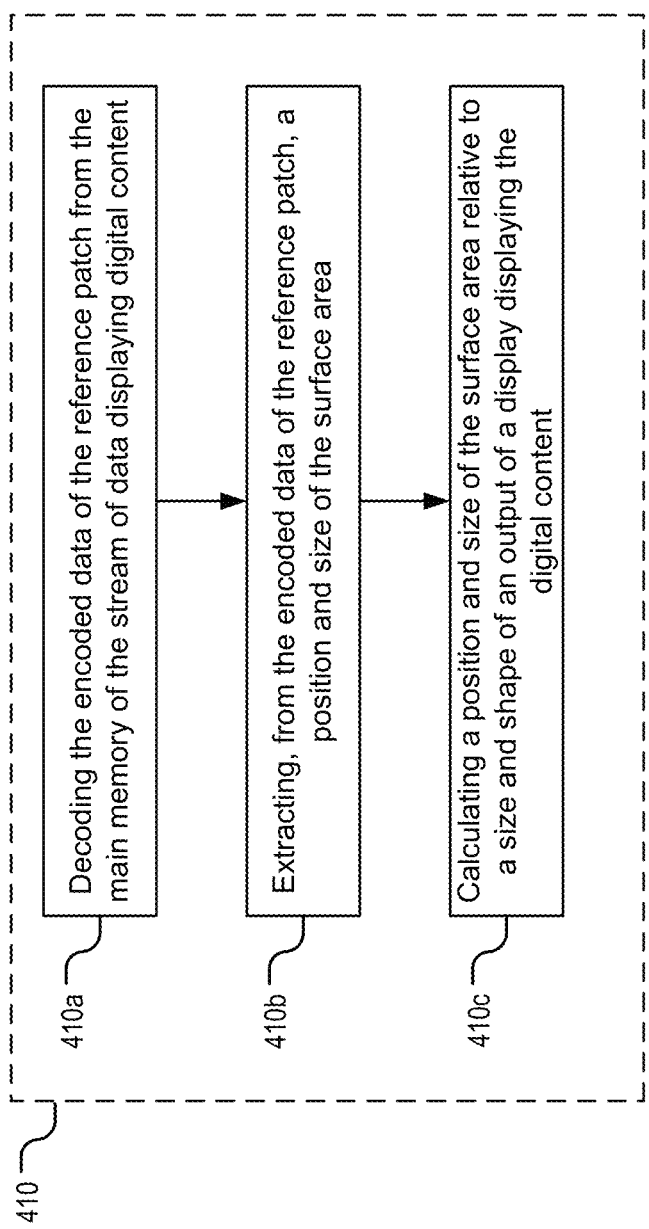
FIG. 4B is a flow chart of a sub-method of identifying the reference patch with the unique identifiers corresponding to the surface area from the stream of data, according to an exemplary embodiment of the present disclosure.

In an embodiment, the first device 101 identifies the surface area corresponding to the reference patch by employing further processes. To this end, FIG. 4B is a flow chart of a sub-method of identifying the reference patch with the unique identifiers corresponding to the surface area from the stream of data, according to an embodiment of the present disclosure.

In step 410*a*, the first device 101 can decode the encoded reference patch from the main memory. The encoded reference patch can include the marker that makes up the unique identifiers within the reference patch incorporated previously. The reference patch can also include other identifying information. The marker can be disposed within the reference patch, such as within the area of the reference patch or along a perimeter of the reference patch, or alternatively, outside of the area of the reference patch.

Again, whatever schema is used to encode the marker in the reference patch is also used in reverse operation to decode the underlying information contained within the reference patch. As stated above, in an embodiment, the encoded marker can be patterns generated and decoded using the ARUCO algorithm or by other algorithms that encode data according to a predetermined approach.

Similarly, as described above, in step 410*b*, the first device 101 can also extract attributes of the surface area from the reference patch.

Similarly, as described above, in step 410*c*, the first device 101 can also calculate a position and size of the surface area relative to the size and shape (dimensions) of the output signal from the display that is displaying the displayed data.

Similarly, as described above, the first device 101 can provide information regarding the characteristics of the output video signal, such that the digital content that is later overlaid can correctly be displayed to account for various manipulations or transformations that may take place due to hardware constraints, user interaction, image degradation, or application intervention.

Similarly, as described above, the reference patch itself can be used as the reference for which the digital content is displayed on the surface area.

Similarly, as described above, the first device 101 can determine an alternative location at which to display the digital content based on behaviors of the user.

Figure 4C:
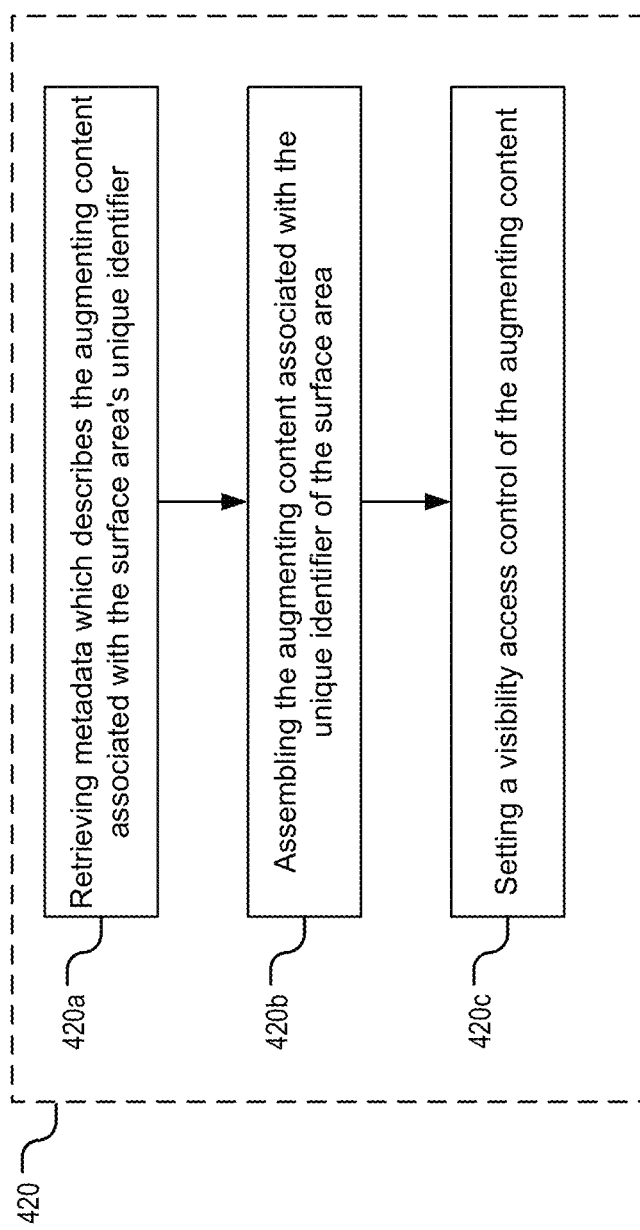
FIG. 4C is a flow chart of a sub-method of associating the unique identifiers with digital content, according to an exemplary embodiment of the present disclosure.

In an embodiment, the first device 101 employs other processes to associate the unique identifiers with the digital content. To this end, FIG. 4C is a flow chart of a sub-method of associating the unique identifiers with digital content, according to an embodiment of the present disclosure. In step 420*a*, the first device 101 can send the unique identifiers to the second device 150 and the second device 150 can retrieve metadata that describes the digital content, the digital content being associated with the surface area through the unique identifiers. This can be done by querying a remote location, such as a database or a repository, using the unique identifiers of the surface area as the query key. In an embodiment, the first device 101 sends the unique identifiers to the second device 150 and the second device 150 associates the unique identifier of the reference patch to corresponding digital content based on the metadata. The metadata associated with the surface area's unique identifier can be transmitted to the first device 101 with the augmentation content.

In step 420*b*, the first device 101 can assemble the digital content that is associated with the surface area's unique identifier. The assembly can entail loading the necessary assets for assembling the digital content. In an embodiment, this can entail loading manipulation software or drivers in order to enable the first device 101 to process the digital content. Other assembling processes can be the loading of rendering information in order to transform and manipulate an individual portion of the digital content. Furthermore, the loaded manipulation software, drivers, or rendering information can be used to compile all the individual portions of the entire digital content together. In an embodiment, this can include adapting the file formats of the digital content, delaying the playback for the digital content, converting from one format to another, scaling the resolution up or down, converting the color space, etc.

In step 420*c*, the first device 101 can provide access control parameters for the digital content. The access control parameters can dictate whether the digital content is visible to some users, or to some geographical locations, or to some types of displays and not others, as well as the date and time or duration of time a user can access the digital content or is allowed to access. In an embodiment, visibility of the digital content can be defined for an individual. For example, the digital content can be a video that is appropriate for users over a certain age. In an embodiment, visibility of the digital content can be defined for a geographic location. For example, the digital content can be a video that is region-locked based on a location of the first device 101. In an embodiment, visibility of the digital content can be defined for a type of display displaying the displayed data. For example, the digital content can be VR-based and will only display with a VR headset. In an embodiment, visibility of the digital content can be defined for a predetermined date and a predetermined time. For example, the digital content can be a video that will only be made publicly available after a predetermined date and a predetermined time. In an embodiment, visibility of the digital content can be defined for a time period. For example, the digital content can be a video that is only available for viewing during a holiday. The first device 101 thus calculates the user's access level based on those parameters and provides an output result as to the user's ability to access the digital content, i.e., whether the digital content will be visible or invisible to the user. Note that the access control parameters can be global, for all the displayed data, or it can be localized per surface area and the underlying digital content.

Referring again to FIG. 4A, in step 440, the first device 101 can carry on the processes of overlaying the surface area with the digital content into the displayed data in accordance with the surface area, the position, and the size identified by the unique identifier. The first device 101 can determine or adjust the size and location of the assembled digital content on the surface area relative to the size and shape of the displayed data being outputted by the display. Then, the first device 101 can render the associated digital content (or the assembled individual portions) over the surface area's shape and perimeter using the size and location information. Thus, the digital content is superimposed on top of the surface area.

The first device 101 can continuously monitor changes that are taking place at the end user's device (such as the second device 150 of the second user) to determine whether the reference patch and/or the surface area has moved or been transformed in any way (see below for additional description). Thus, the first device 101 can continuously inspect subsequent frames of the stream of the data (for example, every 1 ms or by reviewing every new frame), displaying the displayed data, to determine these changes. The first device 101 can further continuously decode the reference patch's data from the identified reference patch. Then the first device 101 can continuously extract attributes from the data, the attributes being of size, shape, and perimeter and comparing those changes between the current frame and last frame. Further, the first device 101 can continuously calculate the size and location of the surface area and compare changes between the size and location of the surface area from the current and the last frame and then continuously overlay the digital content on the surface area by incorporating the changes in the reference patch's attributes and the changes in the size and location of the surface area. As stated above, when the user manipulates his/her display device by scaling, rotating, resizing or even shifting the views from one display device and onto another display device, the first device 101 can track these changes and ensure that the digital content is properly being superimposed onto the surface area.

In an embodiment, the methodologies discussed with reference to FIG. 3 that use the frame buffer can be used without using the methodologies discussed with reference to FIG. 4 that use the memory space and vice-versa. In other words, in an embodiment, either the methodologies of FIG. 3 or the methodologies of FIG. 4 can be used to identifying a reference patch and overlay the digital content in displayed data.

However, in an embodiment, both the methodologies discussed with reference to FIG. 3 that use the frame buffer and the methodologies discussed with reference to FIG. 4 that use the memory space can be used together. In such embodiment, a device can use both approaches to accurately identify the same reference patch (applying both approaches can yield better results). In an embodiment, both approaches can be used to identify different reference patches. For example, if a document includes a plurality of reference patches, the first device can apply the methodologies discussed with reference to FIG. 3 to a first reference patch, while applying the methodologies discussed with reference to FIG. 4 to a second reference patch.

Figure 5:
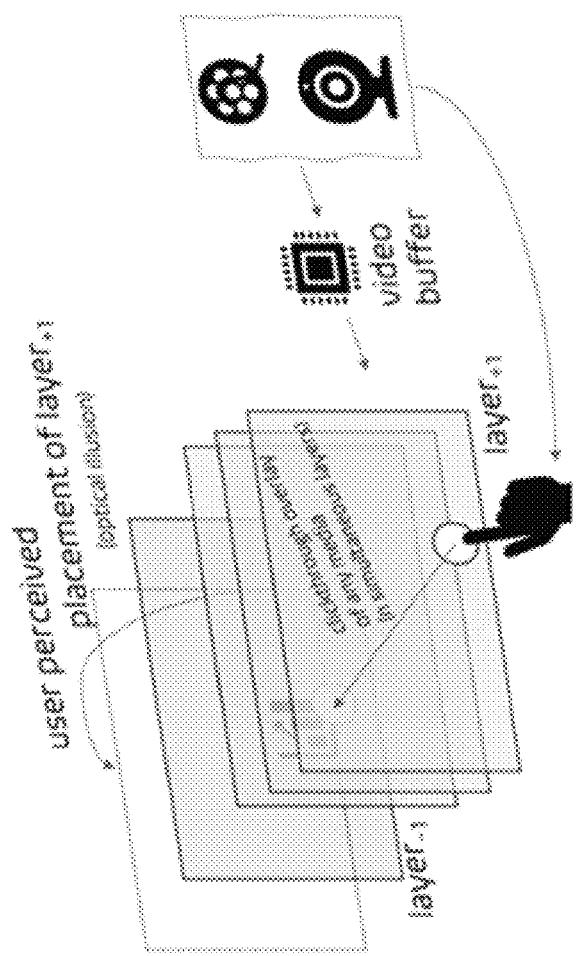
FIG. 5 illustrates an example an augmentation configured to manage, manipulate, and merge multiple layers of content, according to an embodiment of the present disclosure.

FIG. 5 illustrates an example of an augmented experience. One or more layers are retrieved from memory (e.g. frame buffers) and overlaid over one another as layer +1. Pixel characteristics, such as the transparency, of each pixel in the one or more layers of layer +1 can be configured to be semi- or fully-transparent. These one or more layers in layer +1, now at least partially see-through, can be shown on top of, and in the same window as, layer −1 (e.g. operating system display). In this exemplary scenario, pixels on layer −1 have interactivity on, whereas pixels on layer +1 have interactivity off, though any pixel(s) in either layer can "move" between any of the layers by adjusting interactivity and/or transparency. The overall effect is an optical illusion for a user viewing the device, where the one or more layers from layer +1 seem to be displayed behind layer −1.

In an embodiment, interactivity can be utilized via input obtained via at a suitable input device. Examples of such suitable input devices include, but are not limited to, mouse, keyboard, touchscreen, touchpad, and microphone.

In an embodiment, interactivity can be utilized via gestures from a user (i.e. touch-ability). For example, one of the layers in layer +1 show live video of the user, and gesture-recognition techniques can be utilized to track the user as they interact with pixels in layer −1. This can look like displaying a live video of the user from a webcam buffer as a layer in layer +1, displaying an operating system desktop from a video buffer on layer −1, turning off the interactivity of all pixels on layer +1, and interacting with pixels on layer −1 using gesture information from a user. From a user's perspective, visual feedback of himself/herself via the live video can indicate, for instance, that their hand is located over a particular button or file in layer −1 for clicking.

Figure 6A:
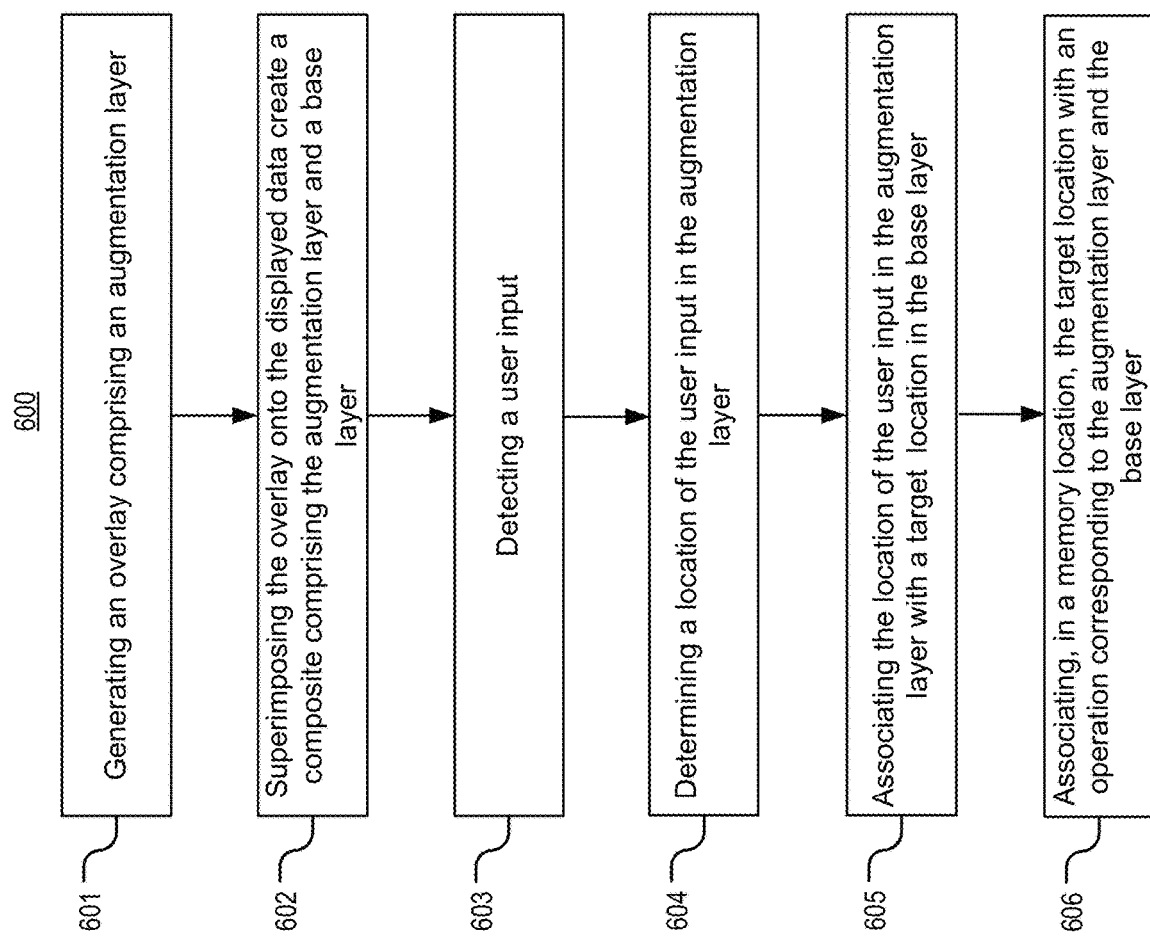
FIG. 6A depicts a flowchart outlining the process involved in the method of certain embodiments of present disclosure.
Figure 6B:
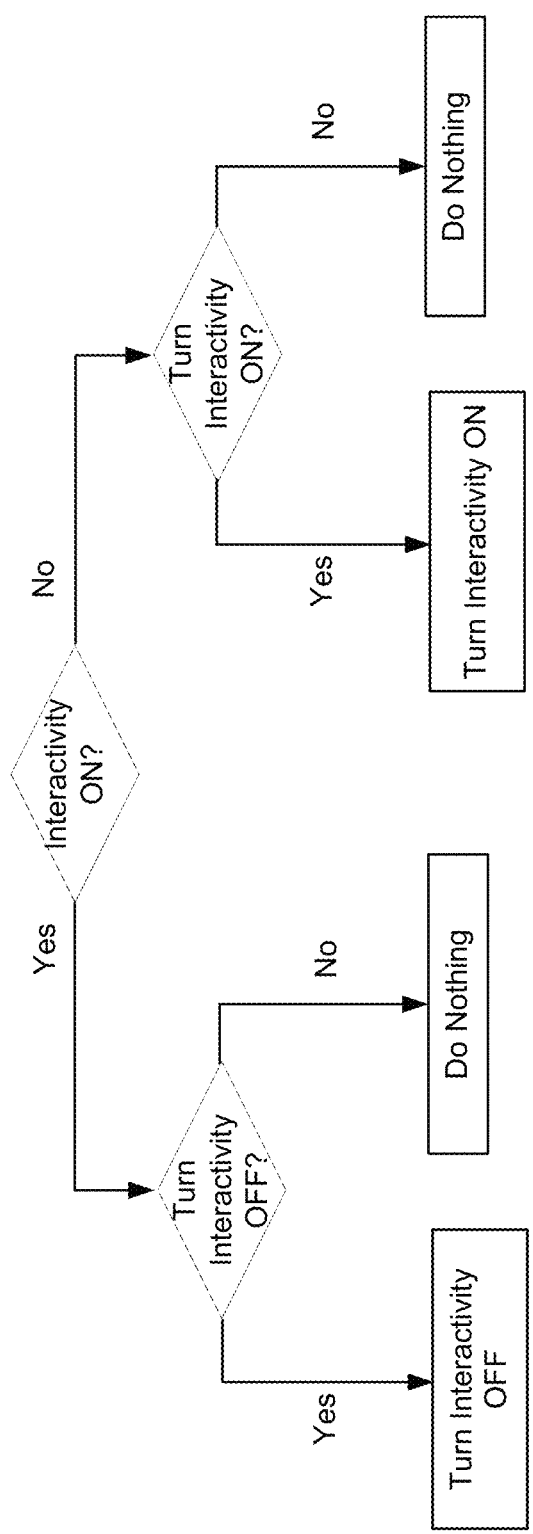
FIG. 6B depicts a flowchart outlining the process involved in managing interactivity, according to an embodiment of the present disclosure.

In order to achieve the functionality described above, the apparatus of the current disclosure can perform the following process. FIG. 6A depicts a flowchart outlining the process involved in the method of present disclosure. The first step 601 is generating an overlay comprising an augmentation layer. In an embodiment, the augmentation and corresponding content can be shown/displayed above the first and/or second layer, thereby creating a floating illusion. Details for how to generate an augmentation in step 601 are discussed below with respect to the detector 1103.

The second step 602 is superimposing the overlay onto the displayed data to create or generate a composite comprising the augmentation layer and a base layer. The superimposing can be performed such that the content is viewable while a portion of the base layer is obscured from view. The superimposing can look like placing the second layer (e.g., the overlay or an augmentation layer), represented by a second set of pixels, over the first layer (e.g., the base layer), represented by a first set of pixels, or vice versa, and adjusting the transparency of pixels within one or both layers to create a transparency effect so that both layers are visible.

Further, the superimposing can include controlling at least one pixel parameter, such as brightness, vibrancy, contrast, color, transparency, and/or an initial interactivity of one or more pixels. The control of such pixel parameters can be for one or more pixels in the first set of pixels, the second set of pixels, or another set of pixels. As an example, video footage from the frame buffer of a computer's webcam is placed over a webpage from a frame buffer of a graphics card, and the pixels in the video footage are adjusted to become slightly transparent. In this example, the pixels corresponding to the webpage can be altered or unaltered. In an embodiment, the superimposing can involve the creation or generation of a location record. The location record can be a map, table, array, database, or other similar data structure which is useful for recording or tabulating positions of pixels in the augmentation layer and the base layer.

The location record can be useful for determining a proper alignment of elements in the augmentation layer and the base layer such that proper obscuring of portions of the base layer is achieved. The location record can be further useful for tracking visibility of such obscured portions. In an embodiment, the location record can be useful in translocation as described above and further described below. For example, in an embodiment where the augmentation layer comprises elements which have a correspondence to elements in the base layer but are displayed at a location in the augmentation layer which is different from the location in the base layer, the location record can be useful for tracking such differences. In an embodiment, the location record can interact with the OS memory to determine an absolute location. The absolute location can relate the locations of the augmentation layer elements and base layer elements with, for example, hardware locations or specific pixels of a display.

The third step 603 is detecting a user input. The input from the user can be transmitted from any type of input device, such as a mouse, keyboard, microphone, and a gesture-recognition sensor (e.g. camera, motion capture gloves). Such an input can correspond to any suitable action which may be performed by a user, for example left click, right click, drag, scroll, double-click, key press, etc.

Usage of a gesture-recognition sensor can allow a user to have a touchless experience, where he/she can interact with pixels in the first and/or second layer using their body as the peripheral. The gesture-recognition sensor can track elements such as a user's finger(s), eye(s), face, hand(s), and pose. Different gestures can correspond to different commands. For instance, a tapping action with a finger can represent a single left-click, a tapping action with two fingers can represent a single right-click, pinching can representing zooming, and so on. The combination of superimposing a live video of a user (with interactivity off) over another layer (with interactivity on) allows the user to interact with the latter layer using gestures, while at the same time, seeing themselves on the former layer as a visual cue to where they are relative to pixels in the latter layer. From a device perspective, the device 101 can collect gesture data of a user utilizing a camera, and send the gesture data to the processing device (e.g. CPU or GPU) to analyze and interpret the gesture data to update pixels accordingly.

The fourth step 604 is determining a location of the user input in the augmentation layer. In an embodiment, the location of the user input in the augmentation layer is determined from a memory. In an embodiment, the memory is a main memory as described above. Such a main memory may be an OS memory, a computing memory, or a combination thereof. For example, the OS memory can determine, track, request, poll, or record a location of a cursor which is able to be controlled by a mouse. The location may be assigned x- and y-coordinates corresponding to the x- and y-coordinates of a certain pixel in a display. These x- and y-coordinates may be recorded at the time an input, e.g. a click, is detected. The system or apparatus may then access, request, or otherwise obtain the x- and y-coordinates of the mouse at the time of the input (click). Such x- and y-coordinates can then be associated with a particular pixel in the augmentation. In another example, the mouse can generate a signal which is transferred to the OS memory upon a click, the signal comprising parameters of the click. Upon receipt of the signal, the OS memory can determine the location of the click. This may be referred to as a "memory location determination".

In an embodiment, the location of the user input may be determined from the location of an input marker. Such an input marker may be any suitable input marker which makes the location of an element which acts to convey a user input, e.g. a cursor, pointer, or the like. This input marker can be visible on the screen. The visibility on the screen, and therefore the location can be determined by accessing the frame buffer and analyzing a frame. Such accessing and analyzing can be performed as described above. The detection of the input marker can be performed as described above. The system or apparatus can analyze the frame to determine the location of the input market at the time of the input. The location of the input marker can be determined relative to other pixels in the augmentation or can be determined from x- and y-coordinates. This may be referred to as a "computer vision location determination". This may be particularly advantageous in an embodiment in which the user input is a gesture.

The fifth step 605 is associating the location of the user input in the augmentation layer with a target location in the base layer. In an embodiment, this associating can be performed by the device which performs the superimposing. In an embodiment, the associating can be performed using the location record as described above. In an embodiment, the associating can be performed by passing the location of the user input in the augmentation layer or a request comprising such a location to the memory, which can return a response comprising base layer elements associated with that location in the base layer. For example, the x- and y-coordinates in the augmentation layer can be looked up in the location record to find the corresponding x- and y-coordinates in the base layer. In another example, the x- and y-coordinates in the augmentation layer can be passed to the OS memory. The OS memory can then return or provide information comprising base layer elements associated with the same x- and y-coordinates in the base layer. In another example, the associating can be performed by a computer vision approach as described above. In such an example, the location in the augmentation layer can be analyzed or inspected in the frame buffer to determine a location in the base layer. That location in the base layer can be analyzed, for example, by object detection, to determine if there are elements in the base layer at that location.

The sixth step 606 is associating, in a memory location, the target location with an operation corresponding to the augmentation layer and the base layer. This associating should be performed such that the user input in the augmentation layer can activate an input in the base layer.

In general, the memory location can be a location in the OS memory, the computing memory, or both, as described above. In an embodiment, the location of the user input in the augmentation layer can be associated with a specific memory location associated with the augmentation layer. That location can contain a parameter setting or controlling interactivity for the pixel, object, or layer where the user input was detected. That location can perform a function or instruct another piece of software to pass an instruction to another memory location for performing a function or operation. For example, a portion of the augmentation layer can be associated with the display of a "save" icon. When user input is detected in the augmentation layer at the location of the displayed save icon, the input can be associated with the save function as performed by a piece of software (e.g. Microsoft PowerPoint). In an embodiment, the location of the user input can be associated with a portion of memory or a memory location which is currently serving or associated with that piece of software (e.g. Microsoft PowerPoint). That piece of software can then receive the input or an instruction related to the input to perform a specific function (e.g. save the file).

In such an example, if the software is in the augmentation layer, the method can proceed directly to associating the input location with a memory location. If the software is in the base layer, the method can determine the location within the base layer as described above. In another example, the memory location associated with the augmentation can pass an instruction to an OS memory location to register an input at the specific input location in the base layer. The OS memory can then take appropriate action as if the input was received directly at that location in the absence of the augmentation layer. That appropriate action can involve passing an instruction or associating the user input with, for example, a computing memory location associated with a specific piece of software. In an embodiment, the location of the user input can prevent or otherwise inhibit the performance of a function or operation or the instruction of another piece of software to pass an instruction to another memory location for performing a function or operation. For example, the user input can be detected and associated with a location where interactivity is off. Interactivity being off can cause a memory location associated with the augmentation to perform a function which prevents another memory location from performing a function. For example, the memory location associated with the augmentation can pass an instruction to an OS memory location to disregard the input.

In an embodiment, the associating the user input in the augmentation with a memory location is performed by determining, based on the memory location, the target location in the base layer, and associating the target location in the base layer with a function or operation of the interaction in a memory location. For example, this associating can bypass the OS memory location in the example described above. In another example, the augmentation or processing circuitry associated with the augmentation can access the OS memory to determine a location of memory associated with the input location, then determine a computing memory location associated with a piece of software associated with the input location from the OS memory. Then, the user input can be directly passed to the computing memory location with the software, so that software can perform a function. This example does not involve passing the location of the input or an instruction to the OS memory, which then passes such information to a piece of software associated with the computing memory location.

In an embodiment, the method involves detecting or determining an interactivity of the pixel at the location of the user input in the augmentation. In such an embodiment, the method can be truncated so as to not associate the location of the user input pin the augmentation with a function of the interaction in a memory location. Such truncation may be advantageous for reducing computational intensity or resource utilization by the augmentation.

In an embodiment, the apparatus of the current disclosure can perform a process substantially similar to that described above further involving a reference patch detected by either the computer vision techniques described above (e.g. with reference to FIGS. 3A-3C) or the memory vision techniques described above (e.g. with reference to FIGS. 4A-4C). Of course, in an embodiment, both the frame buffer and the memory may be used to identify the same reference patch (or different reference patches), as discussed above.

In an embodiment, the first device 101 can perform the entire aforementioned process. In an embodiment, the process can be performed by a first device 101 and any number of other devices (102 and 10n).

In an embodiment, the augmentation performed by the first device 101 (or by a combination of the first device 101 and any number of other devices 102, 10n as described above) may be controlled by the reference patch. That is, the reference patch can contain, in addition to the instruction to retrieve content, additional instructions related to the operation of the augmentation, such as the interactivity. Such additional instructions can be or contain, for example, instructions relating to controlling the interactivity of pixels, objects, and/or layers in the augmentation. For example, the reference patch can contain an addition instruction to turn off interactivity for all pixels in the region of the content.

In general, any number of reference patches may be present or detected. For example, a single reference patch may be used to initiate and/or control an augmentation for an entire document or slide deck. A single reference patch may be used for each page or slide in a document to initiate and/or control an augmentation for that single page or slide. A single reference patch may be used for each piece of content to initiate and/or control an augmentation for that content.

Figure 7C:
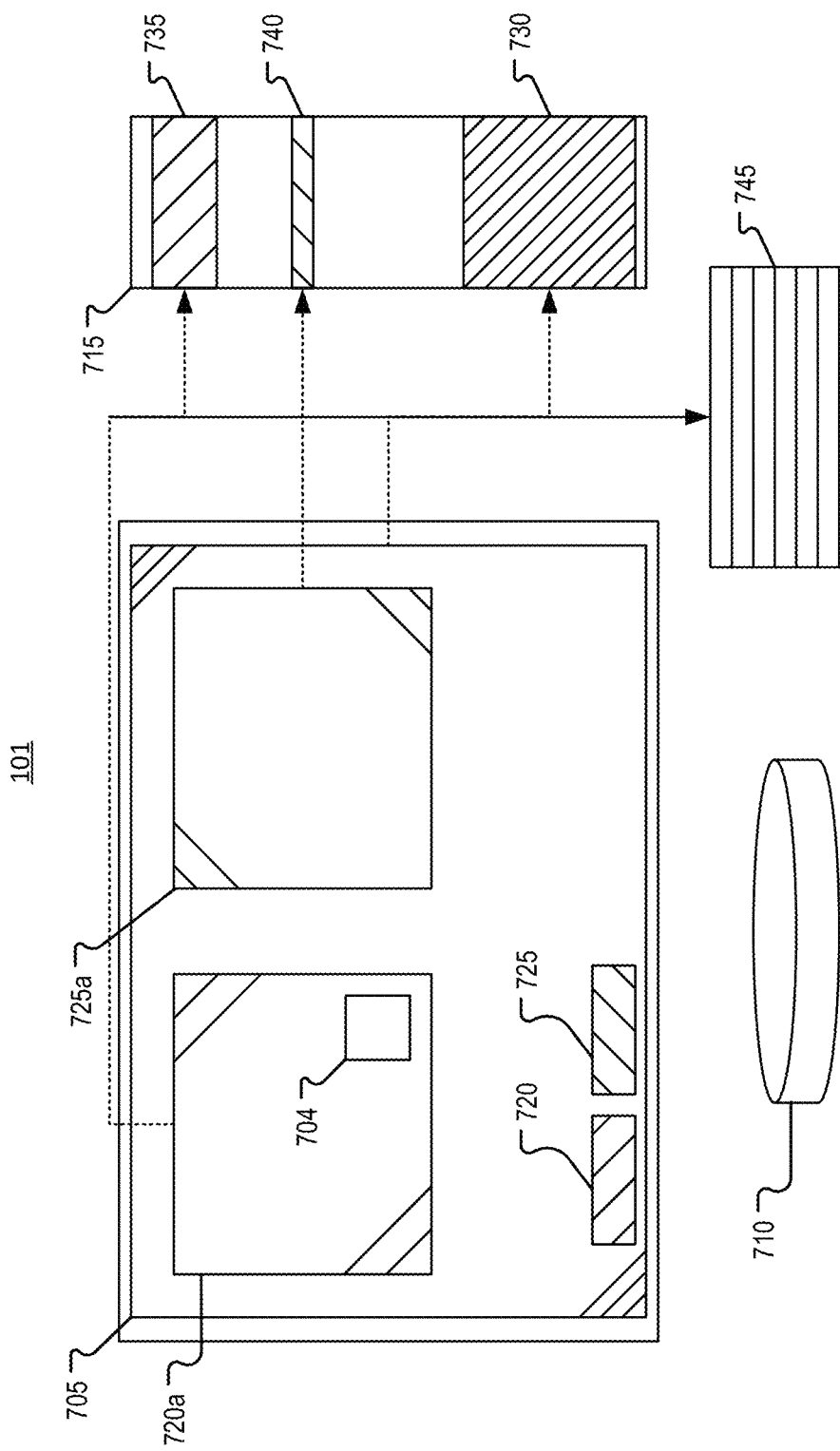
FIG. 7C is a schematic of the information streamed to the main memory aggregated in the array, according to an embodiment of the present disclosure.

An illustrative example will now be discussed with reference to FIG. 7A to FIG. 7E to show a mechanism by which the interactivity of the present application may be achieved. FIG. 7A is a schematic of a software application running on a device, according to an embodiment of the present disclosure. The device can be a first device 101 or any other devices (102, 10n, etc.). In an embodiment, the device can include a desktop or an OS 705, a secondary storage 710, a main memory 715, a first window 720a of a first software application 720 (herein referred to as "first application 720") running on the device, and a first window 725a of a second software application 725 (herein referred to as "second application 725") running on the device. Notably, the first window 720a can include a reference patch 704. The first window 720a and the first window 725a can refer to a graphic control element generated by the first application 720 and the second application 725 and can comprise a visual area including some of the graphical user interface of the software application the window 720a, 725a corresponds to. The visual area can be framed by a border, and a top portion of the border can include, commonly, a title bar for manipulation functions (e.g., relocate, close, maximize, minimize, resize, etc.). For example, the first window 720a can be a PowerPoint slide presentation and the first window 725a can be a Word document.

The first application 720 and the second application 725 are shown as icons along a bottom of the OS 705 for simplicity to indicate the active software applications on the first device 101. The first application 720 and the second application 725 can initially be executed and loaded from the secondary storage 710. The secondary storage 710 can therefore be a hard disk drive or a solid state drive of the first device 101. The main memory 715 can be primary internal memory on the first device 101, such as RAM.

FIG. 7B is a schematic of the memory allocation in the main memory 715, according to an embodiment of the present disclosure. In an embodiment, the first application 720 (and the second application 725) can be loaded from the secondary storage 710 (also known as loaded off the hard disk drive or the solid state drive) and written to the main memory 715. Notably, the first application 720 can be written to a first specific portion of the main memory 715, which can be termed a first computing memory space 735. That is, the first specific portion of the main memory 715 can be allocated to the first application 720. Similarly, the second application 725 can also be written to a second specific portion of the main memory 715 corresponding to the second application 725, which can be termed a second computing memory space 740. Again, that is to say, the second specific portion of the main memory 715 can be allocated to the second application 725. The OS 705 also consumes or is written to a portion of the main memory 715, which can be termed an OS memory space 730.

In an embodiment, the first application 720 and the second application 725 are running and the first window 720a and the first window 725a can be visible on the OS 705. The OS memory space 730 can include information (written and updated by the OS 705) regarding the data on the OS 705, such as the windows that are displayed and visible, the sizes of the windows, the locations of the windows, the movement of a mouse pointer or cursor, and a movement of the windows, among others. Of course, the recording of the reference patch 704 at a specific location on the OS 705 can also be written to the OS memory space 730. For example, the reference patch 704 can be an image, such as a .PNG file. However, the OS memory space 730 may not correlate that the first window 720a corresponds to the first application 720. The OS memory space 730 may simply record that a .PNG file (the reference patch 704) is displayed and located at a particular x- and y-coordinate pixel. The first device 101 can access the main memory 715, inspect the main memory 715 including the OS memory space 730, and identify the .PNG file (the reference patch 704) in the OS memory space 730. The first device 101 can also identify, as previously described, the locations of windows and whether the reference patch 704 is covered by the windows, such as via the x- and y-coordinates of the windows in conjunction with the size of the windows and their rank (if a window is active/selected, visible, partially visible, not visible, etc.) to determine an area covered by the windows. Upon determining the reference patch 704 is not covered by any other objects or windows, the first device 101 can decode the encoded data of the unique identifiers from the area of the reference patch 704, retrieve the digital content based on the unique identifiers, and overlay the digital content onto the surface area of the displayed data based on the unique identifiers.

In an embodiment, the first application 720 can include metadata which can have a predetermined format with predetermined keywords that can be interpreted. The metadata can be information regarding the first window 720a corresponding to the first application 720 which is written to the first computing memory space 735. The information can include, for a PowerPoint presentation example, the slide number of the presentation being displayed in the first window 720a, a total number of slides in the presentation, and the slide in which the reference patch 704 is embedded, among others. Furthermore, for the PowerPoint example, the application sub-memory space can correlate to each individual slide of the presentation. The first device 101 can access the main memory 715, inspect the main memory 715 including the first computing memory space 735 and the second computing space 740, and identify the .PNG file (the reference patch 704) in the first computing memory space 735.

FIG. 7C is a schematic of the information streamed to the main memory 715 aggregated in the array 745, according to an embodiment of the present disclosure. In an embodiment, the information from the OS memory space 730, the first computing memory space 735, and the second computing memory space 740 can be aggregated into the array 745. That is, information, such as the movement of the windows 720a, 725a, the opening of new windows, and the locations of various objects can be written to the array 745 and monitored. For example, the array 745 can include the x- and y-coordinate pixel values of the objects on the OS 705. The information can also include a rank or hierarchy of the computing memory spaces 735, 740 that describes which application's window is currently the selected, active window. For example, the array 745 can describe the first window 720a being relocated to overlay the first window 725a. Using both of the two memory spaces and the monitored information from the array 745, the location of the reference patch 704 on the OS 705 can now be correlated to the first window 720a located at the same location, and additionally that the reference patch 704 is located in the first window 720a based on the OS memory space 730. Furthermore, based on the first computing memory space 735, the first window 720a corresponds to the first application 720 and the metadata of the first application 720 provides additional information that the reference patch 704 is disposed in a predetermined slide of the PowerPoint presentation. Thus, based on the OS memory space 730 and the metadata of the first application 720 in the first computing memory space 735, the location of the reference patch 704 can be identified and correlated to the first application 720. Furthermore, based on the OS memory space 730, the movement and visibility of the windows 720a, 725a can be tracked. Also, based on the first computing memory space 735, if the first window 720a is visible, the slide number of the PowerPoint presentation being viewed can be tracked.

Figure 7D:
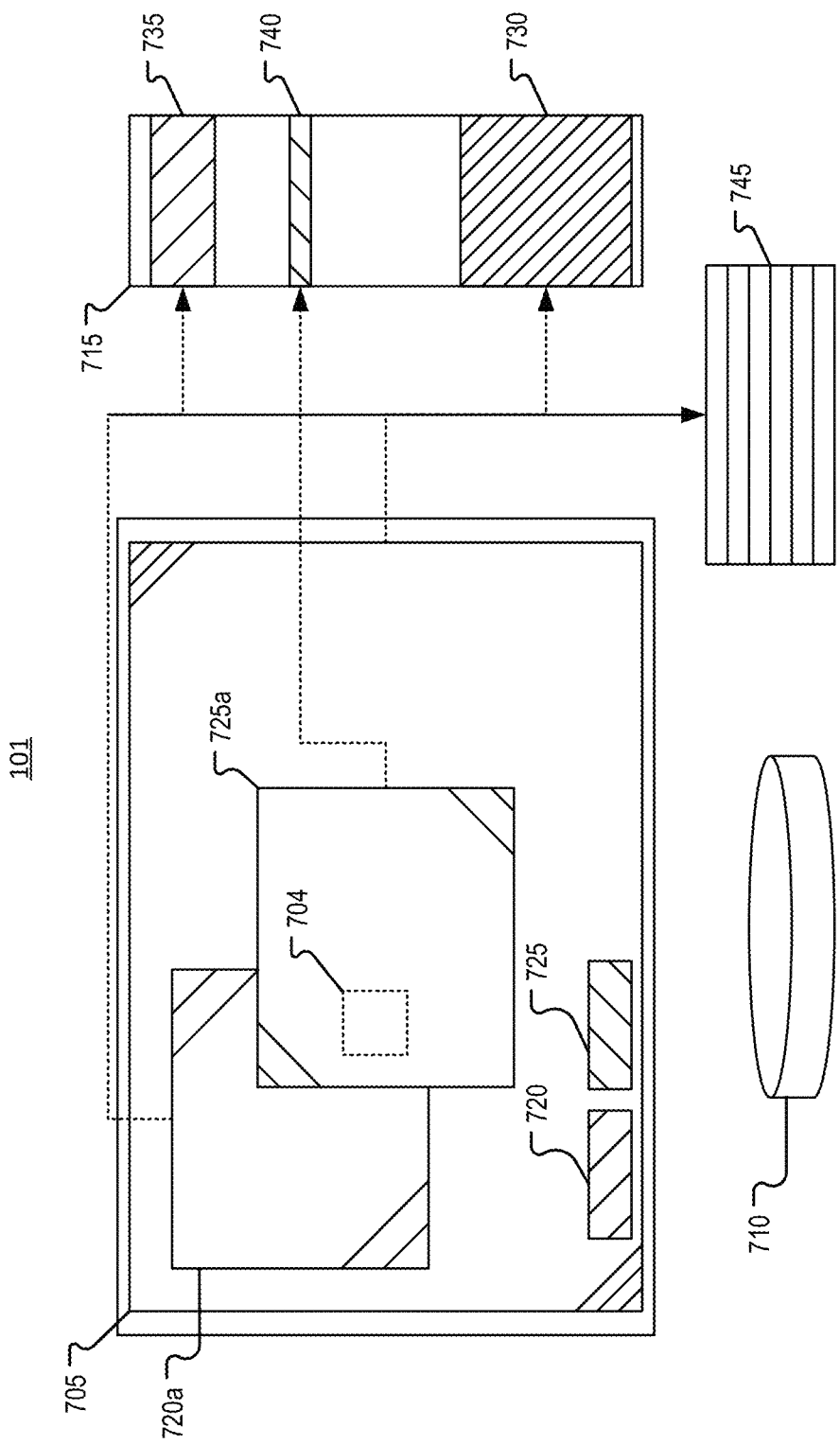
FIG. 7D shows a schematic of the reference patch covered, according to an embodiment of the present disclosure.

FIG. 7D shows a schematic of the reference patch 704 covered, according to an embodiment of the present disclosure. In an embodiment, computational resources can be preserved when the reference patch 704 is not visible as determined by the combination of using the array 745 and the monitored information of the windows 720a, 725a including the OS memory space 730, the first computing memory space 735, and the second computing memory space 740. As shown, the first window 725a of the second application 725 can be moved to cover a portion of the first window 720a of the first application 720 and the reference patch 704 disposed therein. Advantageously, the first device 101, knowing the reference patch 704 is no longer visible, need not spend resources to continually search for and identify the reference patch 704, as well as retrieve and overlay the secondary content.

In an embodiment, multiple reference patches 704 can be included in various content from the one or more computing memory spaces. In an embodiment, identifying the reference patches 704 in the main memory 715 can include querying the software application sub-memory spaces of the software applications for reference patches 704 that are identified therein. A list of the reference patches 704 found in each of the software application sub-memory spaces can be recorded. Finally, the list of all the reference patches 704 found can be associated to the array 745. Notably, the list of reference patches 704 recorded can be continually checked in the main memory to determine whether any changes to the list have occurred. For example, a new reference patch 704 can be identified and recorded to the list.

As previously discussed, any of the pixels in any of the layers can "move" between layers. In other words, the hierarchy, transparency, interactivity, or any other relevant pixel parameter can be altered. For example, interactivity can be turned off for all the layers of a first layer, interactivity can be turned on for all the pixels in a second layer, and interactivity can be turned off for all the pixels of the third layer except for the pixels of an object utilizing the circuitry of the device. Thus, the user can have the ability to click on any of the pixels in the second layer, as well as the object in the third layer. Such interaction can be detected and be used to perform a function, for example, opening a file, closing a file, saving a file, responding to a prompt, entering text, etc.

Further, certain pixels can be seemingly lifted above other layers for additional visibility, focus, and interactions. For example, in the object can cropped from a frame buffer containing the third layer, generated as another layer over the first layer, second layer, and third layer by the circuitry of the device, and has been resized, rotated, and relocated based on input from the user via gestures collected by a suitable input module.

Of course, many additional use cases exist. For example, a device can capture a user's drawings on a drawing application (e.g. Microsoft Paint) of a first layer by capturing and analyzing the user's gestures. At the same time, the device can display live video feedback of the user overlaid over the drawing application. As the user's gestures (i.e. drawing strokes) are captured, the pixels in the drawing application can change color based on the user's captured gestures.

As another example, a smart-window of a vehicle can display a default screen (e.g. completely transparent layer). Another layer can be overlaid over the default screen, where the layer is configured to display directions. That way, as the vehicle is driving, a semi-transparent layer can display when to turn, which direction to turn, the speed limit, weather information, traffic information, et cetera. Pixels can have click-ability on, off, or a combination thereof.

FIGS. 8A-8K depict exemplary use cases. A user can be a bank teller discussing a new savings account with a potential bank member. The bank teller can initiate a video call with the potential bank member. The bank teller can include, within a video stream being transmitted from the bank teller to the potential bank member, the reference patch 704. The transmitted video stream can include a video feed generated by a camera associated with a device (e.g. 101, 102, 10n, 120, etc.) of the bank teller. Accordingly, the transmitted video stream can include an image of, for instance, a face of the bank teller and the reference patch 704 therein. Upon receiving the video stream, a device of the potential bank member (e.g. a third device 103, 120, etc.) can process the video stream and identify the reference patch 704. Accordingly, a device of the potential bank member can generate a local augmentation (i.e., retrieve and display the corresponding digital content) on the respective display of that user's device in order to allow the potential bank member to be able to interact with the bank teller and establish the new savings account. Such a local augmentation should be interactive, i.e. having interactivity on for one or more pixels in the local augmentation. The digital content can appear on top of the live video stream of the bank teller. The digital content can include a number of objects to be displayed and can be configured to display different subsets of objects based on interactions of a user with the digital content, the objects being interactive in some cases. This allows for the digital content to be updated and other functions to be performed, such as those necessary for the potential bank member to establish the new savings account, in response to user interactions.

For instance, updated digital content can reflect a step by step process of opening the new savings account, the digital content being updated at each step according to the interactions of the potential bank member. First, the digital content can require confirmation of identity, which can include instructing the potential bank member in exhibiting his/her driver's license such that an image of the driver's license can be obtained. The confirmation of identity can also include instruction related to and acquisition of an image of the potential bank member. Next, the digital content can present a banking contract to the potential bank member, the potential bank member then being able to review and sign the banking contract. Lastly, the digital content can request the potential bank member provide verbal confirmation of the approval of the bank contract. Each of these steps can be associated with a same reference patch 704 corresponding to digital content that guides the 'new' bank member along the account setup process. The interactivity can be automatically controlled such that in each of these steps, interactivity can be turned on to allow the user to input necessary inputs (clicks, typed information, etc.) without causing other content (such as security-related features, the bank employee, user account information, etc.) to be obscured or otherwise non-viewable or non-interactive. In an embodiment, the interactivity can be automatically controlled such that in each of these steps, interactivity can be turned off to prevent the user from inadvertently disrupting the process.

With reference now to FIG. 8A through FIG. 8K, an exemplary implementation of a live stream video augmentation will be described in more detail. In the exemplary implementation, a bank teller 821 (e.g., on a first device 101) discusses a new savings account with a potential bank member 831 (e.g., on a second device 102). The bank teller 821 can initiate the video call with the potential bank member 831. The bank teller 821 can include, within a video stream being transmitted from the bank teller to the potential bank member 831, the reference patch 704. In the example of FIG. 8A, the reference patch 704 is a bank logo (in this case, a Chase logo). The transmitted video stream can include a video feed 806 generated by a camera associated with the first device 101 of the bank teller 821. Accordingly, the transmitted video stream can include an image of, for instance, a face of the bank teller 821 and the reference patch 704 therein. Upon receiving the video stream, the second device 102 of the potential bank member 831 can process the video stream and identify the reference patch 704 within this video stream.

Accordingly, the second device 102 of the potential bank member 831 can obtain rendering instructions for digital content 841 (i.e., an augmentation) corresponding to the reference patch 704 and then retrieve and display the digital content 841 at/on the surface area on a respective display of the third device 702 and control the interactivity of the augmentation in order to allow the potential bank member 831 to be able to interact with the bank teller 821 and establish the new savings account. The digital content 841 can be generated on top of the live video stream 806 of the bank teller 821. The digital content 841 can include a number of objects 851 to be displayed and can be configured to display different subsets of objects based on interactions of the potential bank member 831 with the digital content 841, the objects 851 being interactive in some cases. This allows for the digital content 841 to be updated in response to user interactions and for other functions the device can perform to be performed in response to user interaction. Note that the digital content can be retrieved from a server such as the second device 850.

For instance, updated digital content may reflect the step by step process of opening the new savings account, the digital content being updated at each step according to the interactions of the potential bank member. With reference to FIG. 8B through FIG. 8D, the digital content 841 may first require confirmation of the identity of the potential bank member 831. This can include instructing the potential bank member 831 to exhibit his/her driver's license such that an image of the driver's license can be obtained. As shown in FIG. 8C, a guide can be deployed and a confirmation graphic can be displayed, as in FIG. 8D, when an adequate image of the driver's license has been obtained. The confirmation of identity can also include instruction related to and acquisition of an image of the potential bank member 831. The data input by the user (i.e. the image of the driver's license) can be used to perform a specific function related to the input (e.g. saving the image, transferring the image to the first device 101 of the bank teller, etc.). The specific area of the display depicting the capturing of the driver's license can have interactivity turned on such that user input provided in the form of video input captured by a camera can update pixels only in the area of the capturing. Next, the digital content 841 may present a banking contract 861 to the potential bank member 831, as shown in FIG. 8E. As shown in the FIG. 8F, the potential bank member 831 may then review and provide a signature 862 if the banking contract 861 is approved. Lastly, the digital content 841 can request the potential bank member 831 to provide verbal confirmation of the approval of the banking contract 861. For example, a signature area of the banking contract 861 can be displayed and can have interactivity turned on such that user input (e.g. touch input related to signing the contract) is only effective within the signature area. That is, inputs outside of the signature area do not perform a function. This lack of "effectiveness" of the inputs can be due to the fact that interactivity has been turned off for pixels outside of the signature area. Upon acceptance of the signature, for example, the interactivity of pixels outside of the signature area can be turned on. At the same time, the interactivity of pixels inside of the signature area can be turned off such that the signature cannot be altered.

As shown in FIG. 8G, the potential bank member 831 may be prompted with a transcript that is to be read back and recorded via the digital content 841 to confirm the approval of the potential bank member 831. As shown in FIG. 8H and FIG. 8I, the potential bank member 831 may instructed by a countdown and an indication of live recording. FIG. 8J illustrates an aspect of the digital content 841 that allows the potential bank member 831 to review the recorded spoken transcript approving the bank contract 861. Once completed, as shown in FIG. 8K, the digital content 841 can display a congratulatory graphic and welcome the newest member of the bank. Each of these steps can be associated with a same reference patch corresponding to digital content that guides the new bank member along the account setup process.

FIG. 9 depicts another exemplary embodiment of the present disclosure. A slide deck may be generated by a concierge-type service that seeks to connect a client with potential garden designers. As in FIG. 9, the slide deck may be presented to the client within a viewable area 903 of a display 902 of a device. The presently viewable content of the slide deck within the viewable area 903 of the display 902 may be a current frame of display data 906. Traditionally, the slide deck may include information regarding each potential garden designer and may direct the client to third-party applications that allow the client to contact each designer. In other words, in order to connect with one or more of the potential garden designers, the client, traditionally, may need to exit the presentation and navigate to a separate internet web browser in order to learn more about the garden designers and connect with them. Such a digital user experience can be also cumbersome.

With augmentation, however, the client need not leave the presentation in order to set up connections with the garden designers. For instance, as shown in FIG. 4B, a reference patch 704 can be positioned within the slide deck to be in the current frame 106 and viewable within the viewable area 903 of the display 902 at an appropriate moment. The reference patch 704 may correspond to digital content 905 (i.e., one or more augmentations) and, when the reference patch 704 is visible to/detectable by the device, the digital content 905 is retrieved and displayed by the device at the corresponding surface area. The digital content 905 can include, as shown in FIG. 9, interactive buttons, images, videos, windows, and icons, among others, that allow the client to interact with the displayed data and to, for instance, engage with the garden designers without leaving the presentation. In an example, the interactive digital content 905 may allow for scheduling an appointment with a given garden designer while still within the slide deck.

As previously noted, the above-described augmentations are particularly relevant to environments where the underlying content is static. Static content may include textual documents or slide decks. Often, the static content is stored locally in the electronic device. Due to its nature, the static content is not capable of being dynamically adjusted according to complex user interactions, in real-time, during the user experience.

Such a dynamic environment includes one where, for instance, a video conversation is occurring. A first participant of the video conversation may share their screen with a second participant of the video conversation and wish to remotely-control the digital content on a display of a device of the second participant. By including the reference patch within the displayed data that is being shared, which may be the video itself or another digital item, where sharing the displayed data includes transmitting the displayed data over a communication network from the first participant to the second participant, the second participant may be able to experience the digital content when the device of the second participant receives the transmitted displayed data and processes it for display to the user.

Generally, and as introduced in the above example of a dynamic environment, in an embodiment, the reference patch can be inserted into displayed data displayed on a first computer or the first device. The display of the first device can be streamed to a second computer or the third device. In an example, the third device decodes the streamed display of the first device and, based on the identified presence of the reference patch, can locally-augment the display of the third device to overlay the intended digital content on the streamed display of the first device. The design and the arrangement of the digital content can be provided relative to the reference patch placed into the displayed data on the first device. The digital content can include objects to be displayed and may be configured to display different subsets of objects based on interactions of a user with the digital content. The objects, therefore, may be interactive.

In an example of a live video stream, a user may be a yoga instructor teaching a remote yoga class by Microsoft Teams. Each participant in the class may be able to view the yoga instructor via their respective devices, wherein the 'live streamed' video includes video of the yoga instructor guiding the participants of the class through the techniques. At the end of class, the yoga instructor may wish to receive payment from each of the participants. The instructor may open a cloud-based slide which, for instance, may have the reference patch, therein. The reference patch may be configured to augment a pay button relative to a position of the reference patch on a device display of each participant. Upon screen sharing the cloud-based slide with the participants in the class, each participant's device receives the transmitted displayed data and processes the displayed data for display. During processing, each device observes and identifies the reference patch within the displayed data. Accordingly, each device can generate a local augmentation (i.e., retrieve and display the corresponding digital content) on a respective display in order for the participant to be able to enter the payment information and pay for the remote yoga class. The digital content may be generated within the live video stream. The participant can interact with the pay button and other elements of the augmentation to enter payment information without interruption of the live stream.

FIG. 10 shows an exemplary augmented user experience generated by the processes of the present disclosure. This particular example is discussed further above. The displayed data (e.g. the frame) may be referred to as a "base layer". As shown, the base layer 1001 comprises original text 1002 (shown in Japanese for exemplary purposes). Shown overlaid over the base layer is the overlay 1010 which comprises one or more augmentation layers 0011, 1012, and 1013, the overlay comprising translated text 1020.

For example, the base layer 1001 may contain slides presented as part of a slideshow (for example, in a Microsoft PowerPoint presentation). Those slides may have images, video, text such as original text 1002, and/or other visual information displayed on them. The slides may have interactive elements described below. It may be advantageous or desirable for a user to have the Japanese language text translated into English. The overlay 1010 can be used to simultaneously obscure the original Japanese language text and display the translated English text. Due to the finite amount of slide area available, it can be advantageous to use the display area taken up by the original Japanese text, which is incomprehensible to this particular user, to display the translated English text. In this way, the translated English text can match the position of the original Japanese text. In other words, the translated text can be displayed at a position corresponding to the original position of the Japanese text.

The original Japanese text can, for example, be a label for a button. The button can have an associated function within a program. For example, the button can be used to open a specific menu within Microsoft PowerPoint. To know which menu the button opens, the translated text can be displayed over the original text which acts as a label for the button. Because user interaction opens the menu, having interactivity on for the pixels of the augmentation in the region of or making up the display of the button can be advantageous for informing the user on proper control and manipulation of the program. If interactivity was off for such pixels, the user would not be able to perform vital functions within the program while being informed of the information contained within the original text (because the user cannot read said text).

The original Japanese text can, for example, be a label for a graph. For proper communication, the translated English text label can be the same position as the original Japanese text so it can be understood by the user to be such a label and to be applied to the proper portion of or information in the graph. If the original Japanese text were still visible, the translated English text would have to either be superimposed over the original Japanese text, creating an unreadable visual jumble of indistinguishable letters and/or characters or the translated English text would have to be displayed in a different position within the area of the slide, causing possible miscommunication or confusion. To achieve this obscuring of the original text 1002, the overlay can have non-transparent pixels which can make up an overlay digital object present in an augmentation layer to form a non-transparent overlay digital object (such as a text box or a covering rectangle) which can be positioned over the original text 1002. The translated text 1020 can be displayed in an augmentation layer (such as layers 1011-1013). The translated text 1020 can be displayed in the same augmentation layer as the non-transparent overlay digital object (e.g. the text being positioned within the text box) or can be displayed in another augmentation layer and positioned over the non-transparent overlay digital object (e.g. text box positioned over the covering rectangle).

An overlay digital object which contains a translated text 1020 may be referred to as an "overlay text-containing object" while an overlay digital object which does not contain a translated text 1020 may be referred to as an "overlay mask". Overlay masks may be useful for obscuring portions of the original text 1002 which are not obscured by an overlay text-containing object. Overlay masks may be particularly useful in situations where, for example, there is a large discrepancy between the area of a display taken up by an original text compared to a translated text. This way, the original Japanese text which is a label on a graph can be obscured (i.e. not visible to a user), the translated English text can be displayed in the position of the original Japanese text, and the rest of the graph and slide can be visible to the user and can be interactive. Such overlay masks may be useful for translocating interactivity as described above.

Figure 11:
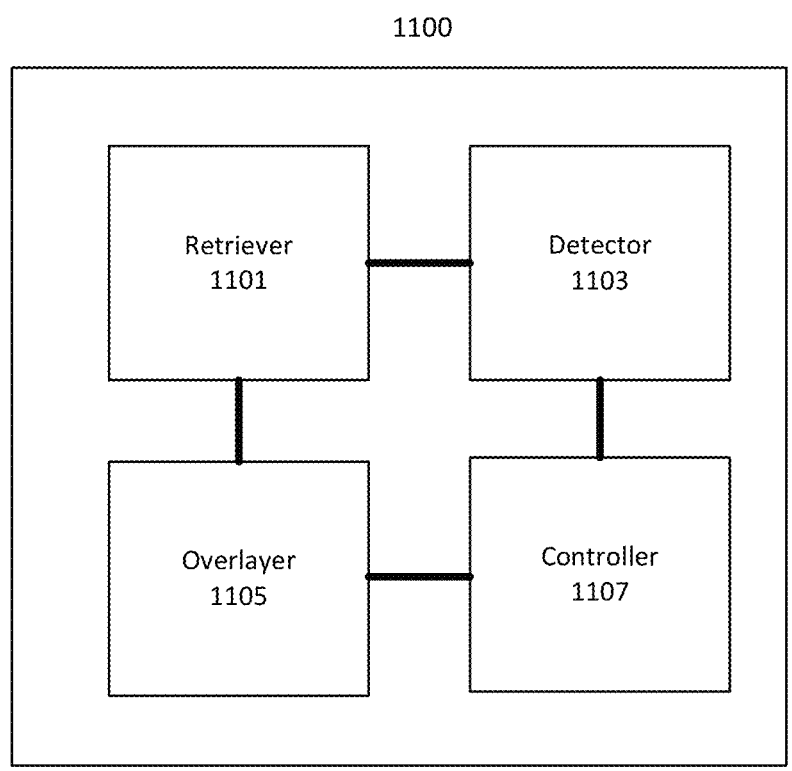
FIG. 11 illustrates a system that can be used for managing, manipulating, and merging multiple layers of content, according to an embodiment of the present disclosure.

FIG. 11 is a block diagram for an exemplary overlay apparatus 1100 that can be utilized for creating a multi-layer computing experience. The overlay apparatus 1100 includes processing circuitry that is configured to perform the functions of the retriever 1101, detector 1103, overlayer 1105, and controller 1107.

The retriever 1101 retrieves layers from memory. For example, a first layer (e.g., the base layer), represented by a first set of pixels, is retrieved from a first portion of memory, while a second layer (e.g., the overlay or an augmentation layer), represented by a second set of pixels, is retrieved from a second portion of memory. The first and second layers can be any type of digital content. For example, the first layer can be a desktop obtained from a video/graphics card, while the second layer can be a live video of a user from a webcam. In one embodiment, the first portion of memory is a first frame buffer, and/or the second portion of memory is a second frame buffer. Of course, more than two layers can be retrieved from more than two portions of memory in other scenarios.

The detector 1103 detects specific pixels and/or patterns of pixels (i.e., objects) in the first layer and/or second layer. Any detection technique appropriate for detecting a specific object can be used, such as convolutional neural networks. Examples of objects can include text, a play/pause button, volume button, and record button. Though the detector 403 is not always mandatory, it can be useful for turning on interactivity of objects in a layer that otherwise has interactivity turned off (or vice versa), highlighting certain objects, performing snap-to-grid functionalities, et cetera. The objects to be detected can be automatically detected based on various parameters made known to the detector 1103, such as commonly selected objects and/or specific object requests made by a software application. Furthermore, in one embodiment, the detector 1103 can also crop detected objects from their frame buffer, create another layer containing those detected objects, and display that additional layer over all the existing layers. The optical effect is that the object seems to have been "cut out" and "lifted" from its original layer. Thereafter, those objects can be altered to rotate, resize, and/or move based on inputs from a user via processing circuitry.

The detector 1103 can also function to identify the reference patch, using a computer vision approach, memory vision approach, or a combination thereof as described above. Further details of how to identify and utilize such reference patches are described in U.S. provisional patent applications 63/213,326 and 63/068,878 and U.S. patent application Ser. No. 17/408,065, which are incorporated by reference herein in their entirety.

In one embodiment, a convolutional neural network (CNN) encoder adds a CCN-readable reference patch into any digital content (documents, video streams, etc.). The reference patch-encoded document is sent to (or screen shared with) a computer vision or memory vision device (e.g. the first device 101) configured to perform the computer vision and/or memory vision techniques The computer vision or memory vision device continuously scans for reference patches using the computer vision and/or memory vision techniques. If a reference patch is detected, the computer vision or memory vision device decodes the unique identifier from the reference patch. The computer vision or memory vision device, which has previously been securely authenticated, sends a secured session token and the unique identifier (obtained from the reference patch) to a remote, secured SaaS server. The server identifies the computer vision or memory vision device from the session token and determines if the computer vision or memory vision device is authorized to retrieve the specific data that the reference patch's unique identifier refers to. If the computer vision or memory vision device is authorized to retrieve the augmentation content, it is delivered electronically to the computer vision or memory vision device. The augmentation content is then added to the computer vision or memory vision device, where it visually "floats above" the operating system display and is never directly added to the operating system display layer or original digital content.

The overlayer 1105 overlays the layers retrieved by the retriever 1101 over one another, and adjusts pixel characteristics for one or more pixels of one or more layers. Adjusting pixel characteristics include adjusting the transparency (from anywhere between 0% to 100% translucency) of the pixels in each layer to create a semi-translucent effect, though other characteristics can also be adjusted, including but not limited to: brightness, vibrance, contrast, and color. The transparency levels of pixels can vary between different layers and/or within layers. For example, if three layers are being displayed at once, all the pixels in one layer can have no transparency, all the pixels in a second layer can have 50% transparency, and all the pixels in a third layer can have 80% transparency. Adjusting the transparency levels can affect depth perception by making certain layers and/or groups of pixels seem closer or further relative to others.

The controller 1107 controls interactivity of pixels in the layers. All the pixels in a layer, or portions of pixels in the layer, can have their interactivity turned on or off. Having interactivity on refers to being able to interact with a pixel that is provided with user input, whereas having interactivity off refers to pixels not being affected by a user input. In one embodiment, the controller 1107 can turn interactivity on or off for specific pixels (e.g. utilizing an operating system executed by the circuitry of apparatus 1100) based on parameters such as pixel color, pixel transparency, pixel location, et cetera. In an embodiment, the controller can perform all or some of the method described above for controlling the interactivity. For example, the controller 1107 can determine a location of the user input in the augmentation and associate the location of the user input in the augmentation with a function of the interaction in a memory location. In another example, the controller 1107 can perform the function if interactivity is on. In such an example, the controller can pass an instruction to the memory of the device (e.g. the OS memory, the computing memory, or a combination of these) to perform the function.

In one embodiment, pixels in one layer have interactivity on, while pixels in the remaining layers have interactivity off. Further, portions of pixels within layers that have interactivity off can have their interactivity turned on, while the remaining pixels in that layer remain off (and vice versa). The determination of which pixels have interactivity on and off can be determined based on parameters such as user settings, hot spots, application settings, user input, et cetera. Hot spots can refer to regions of a computer program, executed by circuitry of a device 101/102/10n/150/etc., where a high percentage of the computer program's instructions occur and/or where the computer program spends a lot oft time executing its instructions Examples of hot spots can include play/pause buttons on movies, charts on presentations, specific text in documents, et cetera.

The overlayer 1105 and controller 1107 can work in tandem to "move" pixels between layers, where pixels in layers that otherwise look to be in the background can be brought to the forefront (or vice versa). Though the pixels themselves do not physically move, by controlling characteristics such as transparency, size, location, interactivity, color, et cetera, the end effect is a multi-layered experience, where a user interacting with such a system can view and interact with any pixel across any layer.

Additional details on exemplary method of superimposing display layers and systems for creating a multi-layer computing experience are described in U.S. provisional patent application 63/222,757, which is incorporated by reference herein in its entirety.

Embodiments of the subject matter and the functional operations described in this specification are implemented by processing circuitry, in tangibly embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of a data processing apparatus/device, (such as the server, device, or the like). The computer storage medium can be a machine-readable storage device, a machine-readable storage substrate, a random or serial access memory device, or a combination of one or more of them.

The term "data processing apparatus" refers to data processing hardware and can encompass all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which can also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, Subroutine, or other unit suitable for use in a computing environment. A computer program can, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA an ASIC.

Computers suitable for the execution of a computer program include, by way of example, general or special purpose microprocessors or both, or any other kind of central processing unit. Generally, a CPU will receive instructions and data from a read-only memory or a random access memory or both. Elements of a computer are a CPU for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more Such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients (user devices) and servers. A client and server are generally remote from each other and typically interact through a communication network. The relationship of client and server arises by virtue of computer programs running on the respective computers and having a client-server relationship to each other. In an embodiment, a server transmits data, e.g., an HTML, page, to a user device, e.g., for purposes of displaying data to and receiving user input from a user interacting with the user device, which acts as a client. Data generated at the user device, e.g., a result of the user interaction, can be received from the user device at the server.

Figure 12:
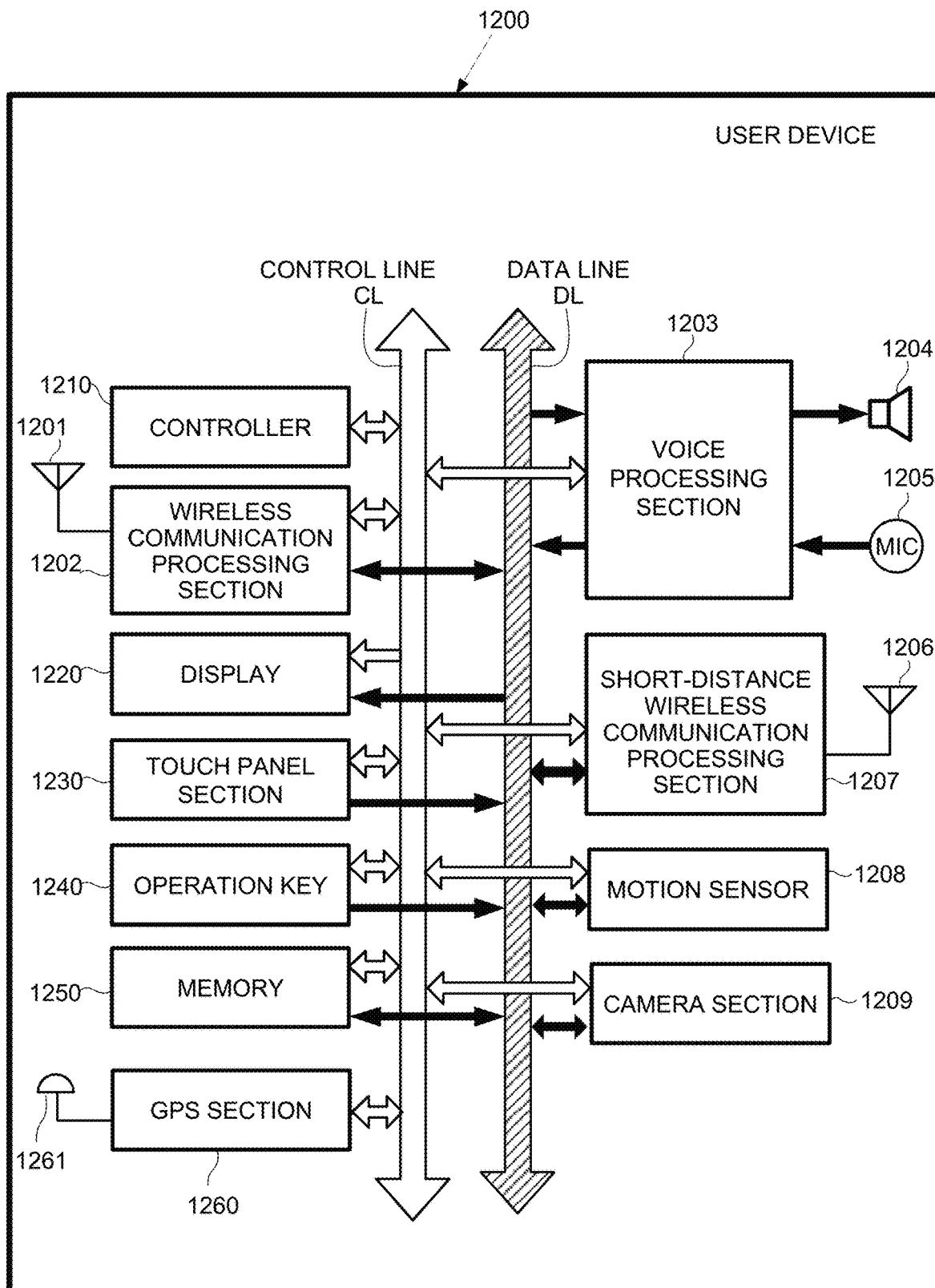
FIG. 12 is a schematic of a user device for performing a method, according to an exemplary embodiment of the present disclosure.

Electronic device 1200 shown in FIG. 12 can be an example of one or more of the devices shown in FIG. 1 (e.g. 101, 102, 10n, 120, 150). In an embodiment, device 1200 can be a smartphone. However, the skilled artisan will appreciate that the features described herein can be adapted to be implemented on other devices (e.g., a laptop, a tablet, a server, an e-reader, a camera, a navigation device, etc.). The device 1200 of FIG. 12 includes processing circuitry, as discussed above. The processing circuitry includes one or more of the elements discussed next with reference to FIG. 12. The device 1200 can include other components not explicitly illustrated in FIG. 12, such as a CPU, GPU, frame buffer, etc. The device 1200 includes a controller 1210 and a wireless communication processor 1202 connected to an antenna 1201. A speaker 1204 and a microphone 1205 are connected to a voice processor 1203.

The controller 1210 can include one or more processors/ processing circuitry (CPU, GPU, or other circuitry) and can control each element in the device 1200 to perform functions related to communication control, audio signal processing, graphics processing, control for the audio signal processing, still and moving image processing and control, and other kinds of signal processing. The controller 1210 can perform these functions by executing instructions stored in a memory 1250. Alternatively or in addition to the local storage of the memory 1250, the functions can be executed using instructions stored on an external device accessed on a network or on a non-transitory computer readable medium.

The memory 1250 includes but is not limited to Read Only Memory (ROM), Random Access Memory (RAM), or a memory array including a combination of volatile and non-volatile memory units. The memory 1250 can be utilized as working memory by the controller 1210 while executing the processes and algorithms of the present disclosure. Additionally, the memory 1250 can be used for long-term storage, e.g., of image data and information related thereto.

The device 1200 includes a control line CL and data line DL as internal communication bus lines. Control data to/from the controller 1210 can be transmitted through the control line CL. The data line DL can be used for transmission of voice data, display data, etc.

The antenna 1201 transmits/receives electromagnetic wave signals between base stations for performing radio-based communication, such as the various forms of cellular telephone communication. The wireless communication processor 1202 controls the communication performed between the device 1200 and other external devices via the antenna 1201. For example, the wireless communication processor 1202 can control communication between base stations for cellular phone communication.

The speaker 1204 emits an audio signal corresponding to audio data supplied from the voice processor 1203. The microphone 1205 detects surrounding audio and converts the detected audio into an audio signal. The audio signal can then be output to the voice processor 1203 for further processing. The voice processor 1203 demodulates and/or decodes the audio data read from the memory 1250 or audio data received by the wireless communication processor 1202 and/or a short-distance wireless communication processor 1207. Additionally, the voice processor 1203 can decode audio signals obtained by the microphone 1205.

The exemplary device 1200 can also include a display 1220, a touch panel 1230, an operation key 1240, and a short-distance communication processor 1207 connected to an antenna 1206. The display 1220 can be an LCD, an organic electroluminescence display panel, or another display screen technology. In addition to displaying still and moving image data, the display 1220 can display operational inputs, such as numbers or icons which can be used for control of the device 1200. The display 1220 can additionally display a GUI for a user to control aspects of the device 1200 and/or other devices. Further, the display 1220 can display characters and images received by the device 1200 and/or stored in the memory 1250 or accessed from an external device on a network. For example, the device 1200 can access a network such as the Internet and display text and/or images transmitted from a Web server.

The touch panel 1230 can include a physical touch panel display screen and a touch panel driver. The touch panel 1230 can include one or more touch sensors for detecting an input operation on an operation surface of the touch panel display screen. The touch panel 1230 also detects a touch shape and a touch area. Used herein, the phrase "touch operation" refers to an input operation performed by touching an operation surface of the touch panel display with an instruction object, such as a finger, thumb, or stylus-type instrument. In the case where a stylus or the like is used in a touch operation, the stylus can include a conductive material at least at the tip of the stylus such that the sensors included in the touch panel 1230 can detect when the stylus approaches/contacts the operation surface of the touch panel display (similar to the case in which a finger is used for the touch operation).

In certain aspects of the present disclosure, the touch panel 1230 can be disposed adjacent to the display 1220 (e.g., laminated) or can be formed integrally with the display 1220. For simplicity, the present disclosure assumes the touch panel 1230 is formed integrally with the display 1220 and therefore, examples discussed herein can describe touch operations being performed on the surface of the display 1220 rather than the touch panel 1230. However, the skilled artisan will appreciate that this is not limiting.

For simplicity, the present disclosure assumes the touch panel 1230 is a capacitance-type touch panel technology. However, it should be appreciated that aspects of the present disclosure can easily be applied to other touch panel types (e.g., resistance-type touch panels) with alternate structures. In certain aspects of the present disclosure, the touch panel 1230 can include transparent electrode touch sensors arranged in the X-Y direction on the surface of transparent sensor glass.

The touch panel driver can be included in the touch panel 1230 for control processing related to the touch panel 1230, such as scanning control. For example, the touch panel driver can scan each sensor in an electrostatic capacitance transparent electrode pattern in the X-direction and Y-direction and detect the electrostatic capacitance value of each sensor to determine when a touch operation is performed. The touch panel driver can output a coordinate and corresponding electrostatic capacitance value for each sensor. The touch panel driver can also output a sensor identifier that can be mapped to a coordinate on the touch panel display screen. Additionally, the touch panel driver and touch panel sensors can detect when an instruction object, such as a finger is within a predetermined distance from an operation surface of the touch panel display screen. That is, the instruction object does not necessarily need to directly contact the operation surface of the touch panel display screen for touch sensors to detect the instruction object and perform processing described herein. For example, in an embodiment, the touch panel 1230 can detect a position of a user's finger around an edge of the display panel 1220 (e.g., gripping a protective case that surrounds the display/touch panel). Signals can be transmitted by the touch panel driver, e.g. in response to a detection of a touch operation, in response to a query from another element based on timed data exchange, etc.

The touch panel 1230 and the display 1220 can be surrounded by a protective casing, which can also enclose the other elements included in the device 1200. In an embodiment, a position of the user's fingers on the protective casing (but not directly on the surface of the display 1220) can be detected by the touch panel 1230 sensors. Accordingly, the controller 1210 can perform display control processing described herein based on the detected position of the user's fingers gripping the casing. For example, an element in an interface can be moved to a new location within the interface (e.g., closer to one or more of the fingers) based on the detected finger position.

Further, in an embodiment, the controller 1210 can be configured to detect which hand is holding the device 1200, based on the detected finger position. For example, the touch panel 1230 sensors can detect a plurality of fingers on the left side of the device 1200 (e.g., on an edge of the display 1220 or on the protective casing), and detect a single finger on the right side of the device 1200. In this exemplary scenario, the controller 1210 can determine that the user is holding the device 1200 with his/her right hand because the detected grip pattern corresponds to an expected pattern when the device 1200 is held only with the right hand.

The operation key 1240 can include one or more buttons or similar external control elements, which can generate an operation signal based on a detected input by the user. In addition to outputs from the touch panel 1230, these operation signals can be supplied to the controller 1210 for performing related processing and control. In certain aspects of the present disclosure, the processing and/or functions associated with external buttons and the like can be performed by the controller 1210 in response to an input operation on the touch panel 1230 display screen rather than the external button, key, etc. In this way, external buttons on the device 1200 can be eliminated in lieu of performing inputs via touch operations, thereby improving watertightness.

The antenna 1206 can transmit/receive electromagnetic wave signals to/from other external apparatuses, and the short-distance wireless communication processor 1207 can control the wireless communication performed between the other external apparatuses. Bluetooth, IEEE 802.11, and near-field communication (NFC) are non-limiting examples of wireless communication protocols that can be used for inter-device communication via the short-distance wireless communication processor 1207.

The device 1200 can include a motion sensor 1208. The motion sensor 1208 can detect features of motion (i.e., one or more movements) of the device 1200. For example, the motion sensor 1208 can include an accelerometer to detect acceleration, a gyroscope to detect angular velocity, a geomagnetic sensor to detect direction, a geo-location sensor to detect location, etc., or a combination thereof to detect motion of the device 1200. In certain embodiments, the motion sensor 1208 can generate a detection signal that includes data representing the detected motion. For example, the motion sensor 1208 can determine a number of distinct movements in a motion (e.g., from start of the series of movements to the stop, within a predetermined time interval, etc.), a number of physical shocks on the device 1200 (e.g., a jarring, hitting, etc., of the electronic device), a speed and/or acceleration of the motion (instantaneous and/or temporal), or other motion features. The detected motion features can be included in the generated detection signal. The detection signal can be transmitted, e.g., to the controller 1210, whereby further processing can be performed based on data included in the detection signal. The motion sensor 1208 can work in conjunction with a Global Positioning System (GPS) section 1260. The information of the present position detected by the GPS section 1260 is transmitted to the controller 1210. An antenna 1261 is connected to the GPS section 1260 for receiving and transmitting signals to and from a GPS satellite.

The device 1200 can include a camera section 1209, which includes a lens and shutter for capturing photographs of the surroundings around the device 1200. In an embodiment, the camera section 1209 captures surroundings of an opposite side of the device 1200 from the user. The images of the captured photographs can be displayed on the display panel 1220. A memory section saves the captured photographs. The memory section can reside within the camera section 1209 or it can be part of the memory 1250. The camera section 1209 can be a separate feature attached to the device 1200 or it can be a built-in camera feature.

Figure 13:
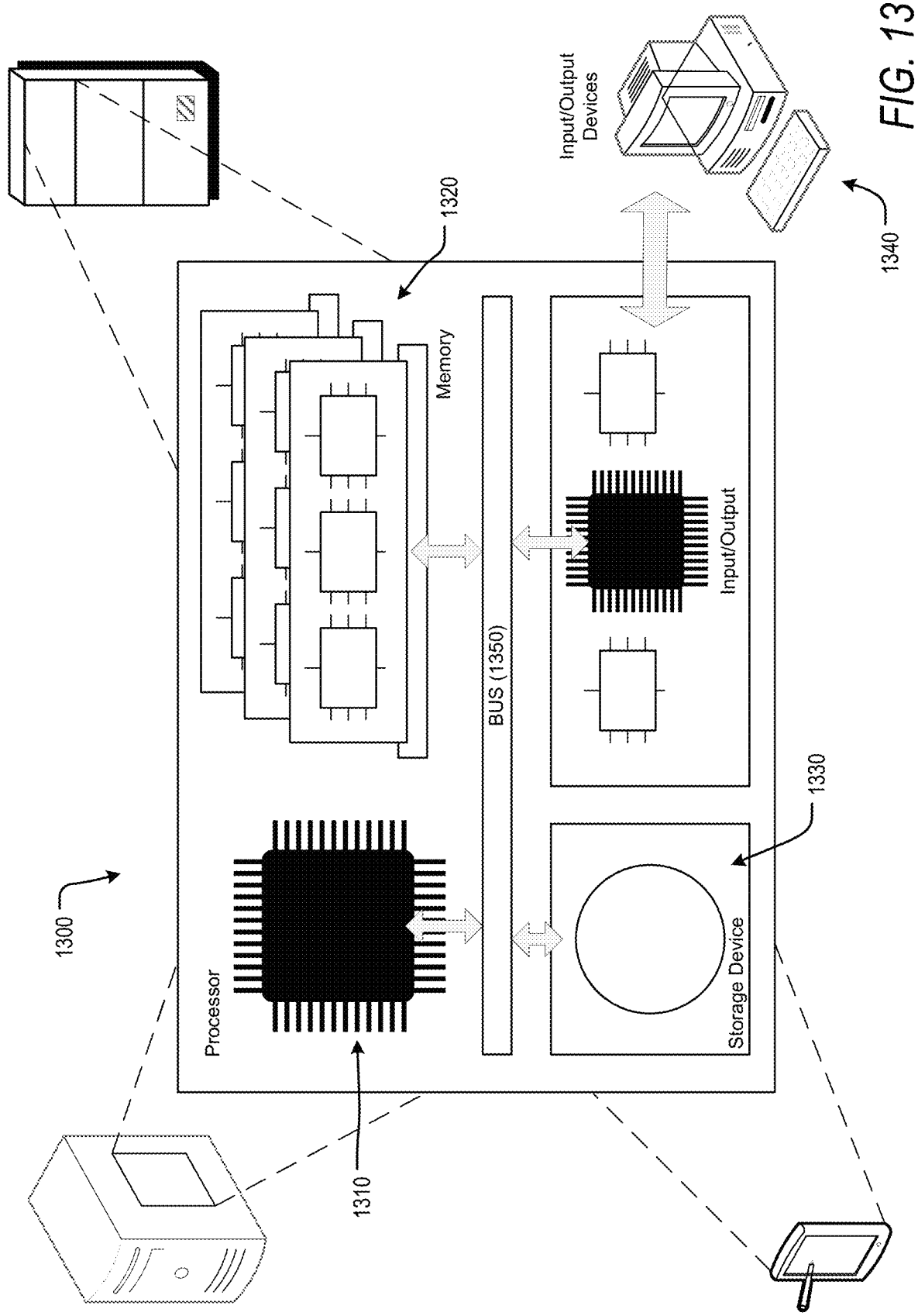
FIG. 13 is a schematic of a hardware system for performing a method, according to an exemplary embodiment of the present disclosure.

An example of a type of computer is shown in FIG. 13. The computer 1300 can be used for the operations described in association with any of the computer-implement methods described previously, according to one implementation. For example, the computer 1300 can be an example of devices 101, 102, 10n, 120, or a server, such as device 150. The computer 1300 includes processing circuitry, as discussed above. The device can include other components not explicitly illustrated in FIG. 13, such as a CPU, GPU, frame buffer, etc. The processing circuitry includes one or more of the elements discussed next with reference to FIG. 13. In FIG. 13, the computer 1300 includes a processor 1310, a memory 1320, a storage device 1330, and an input/output device 1340. Each of the components 1310, 1320, 1330, and 1340 are interconnected using a system bus 1350. The processor 1310 is capable of processing instructions for execution within the system 1300. In one implementation, the processor 1310 is a single-threaded processor. In another implementation, the processor 1310 is a multi-threaded processor. The processor 1310 is capable of processing instructions stored in the memory 1320 or on the storage device 1330 to display graphical information for a user interface on the input/output device 1340.

The memory 1320 stores information within the computer 1300. In one implementation, the memory 1320 is a computer-readable medium. In one implementation, the memory 1320 is a volatile memory. In another implementation, the memory 1320 is a non-volatile memory.

The storage device 1330 is capable of providing mass storage for the system 1300. In one implementation, the storage device 1330 is a computer-readable medium. In various different implementations, the storage device 1330 can be a floppy disk device, a hard disk device, an optical disk device, or a tape device.

The input/output device 1340 provides input/output operations for the computer 1300. In one implementation, the input/output device 1340 includes a keyboard and/or pointing device. In another implementation, the input/output device 1340 includes a display for displaying graphical user interfaces.

Figure 14:
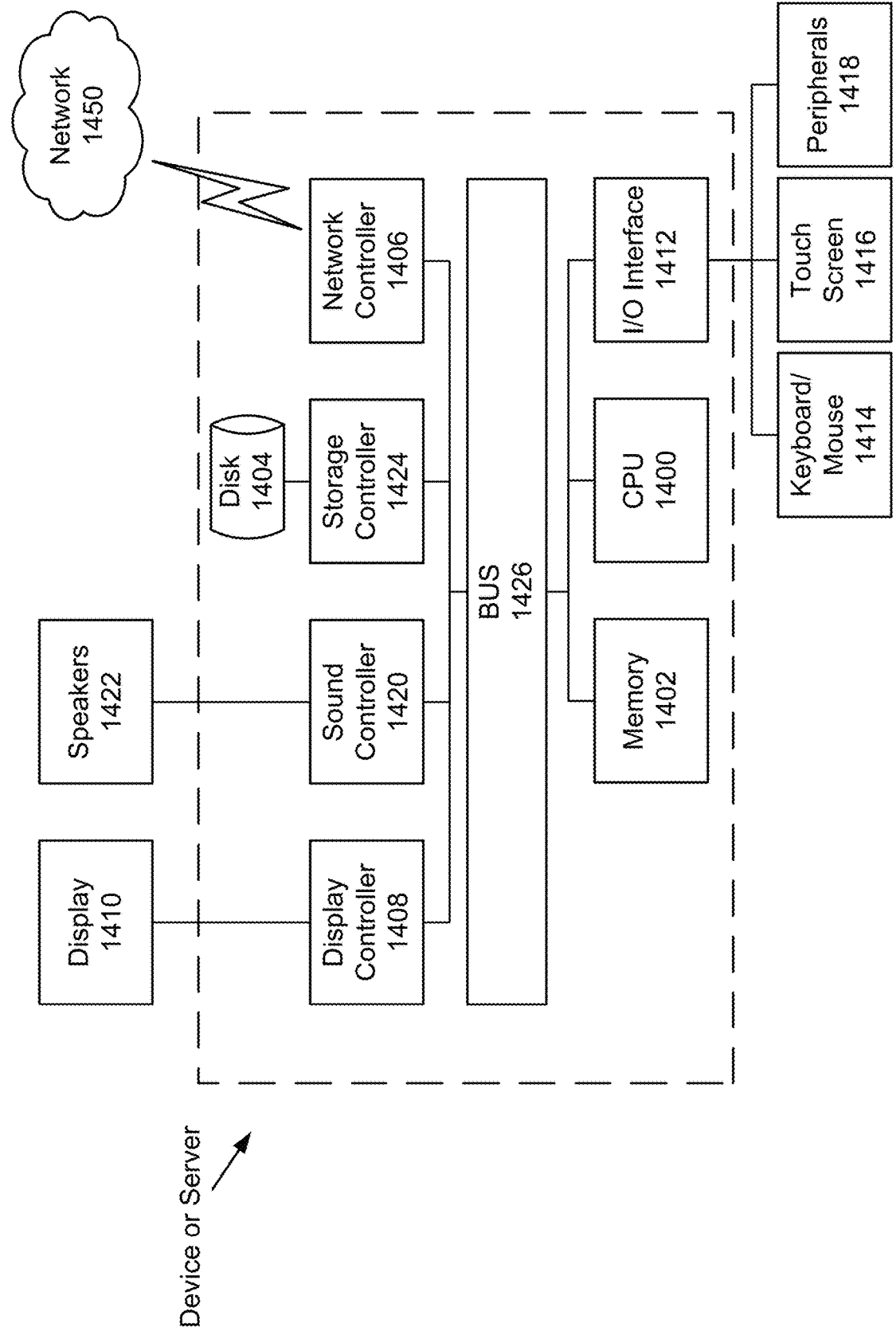
FIG. 14 is a schematic of a hardware configuration of a device for performing a method, according to an exemplary embodiment of the present disclosure.

Next, a hardware description of a device according to exemplary embodiments is described with reference to FIG. 14. In FIG. 14, the device, which can be the above-described devices of FIG. 1, includes processing circuitry, as discussed above. The processing circuitry includes one or more of the elements discussed next with reference to FIG. 14. The device may include other components not explicitly illustrated in FIG. 14, such as a CPU, GPU, frame buffer, etc. In FIG. 14, the device/server includes a CPU 1400 which performs the processes described above/below. The process data and instructions can be stored in memory 1402. These processes and instructions can also be stored on a storage medium disk 1404 such as a hard drive (HDD) or portable storage medium or can be stored remotely. Further, the claimed advancements are not limited by the form of the computer-readable media on which the instructions of the inventive process are stored. For example, the instructions can be stored on CDs, DVDs, in FLASH memory, RAM, ROM, PROM, EPROM, EEPROM, hard disk or any other information processing device with which the device communicates, such as a server or computer.

Further, the claimed advancements can be provided as a utility application, background daemon, or component of an operating system, or combination thereof, executing in conjunction with CPU 1400 and an operating system such as Microsoft Windows, UNIX, Solaris, LINUX, Apple MAC-OS and other systems known to those skilled in the art.

The hardware elements in order to achieve the device can be realized by various circuitry elements, known to those skilled in the art. For example, CPU 1400 can be a Xenon or Core processor from Intel of America or an Opteron processor from AMD of America, or can be other processor types that would be recognized by one of ordinary skill in the art. Alternatively, the CPU 1400 can be implemented on an FPGA, ASIC, PLD or using discrete logic circuits, as one of ordinary skill in the art would recognize. Further, CPU 1400 can be implemented as multiple processors cooperatively working in parallel to perform the instructions of the processes described above. CPU 1400 can be an example of the CPU illustrated in each of the devices of FIG. 1.

The device in FIG. 14 also includes a network controller 1406, such as an Intel Ethernet PRO network interface card from Intel Corporation of America, for interfacing with network 1450 (also shown in FIG. 1 as 150). As can be appreciated, the network 1450 can be a public network, such as the Internet, or a private network such as an LAN or WAN network, or any combination thereof and can also include PSTN or ISDN sub-networks. The network 1450 can also be wired, such as an Ethernet network, or can be wireless such as a cellular network including EDGE, 3G, 4G and 5G wireless cellular systems. The wireless network can also be WiFi, Bluetooth, or any other wireless form of communication that is known.

The device further includes a display controller 1408, such as a NVIDIA GeForce GTX or Quadro graphics adaptor from NVIDIA Corporation of America for interfacing with display 1410, such as an LCD monitor. A general purpose I/O interface 1412 interfaces with a keyboard and/or mouse 1414 as well as a touch screen panel 1416 on or separate from display 1410. General purpose I/O interface also connects to a variety of peripherals 1418 including printers and scanners.

A sound controller 1420 is also provided in the device to interface with speakers/microphone 1422 thereby providing sounds and/or music.

The general purpose storage controller 1424 connects the storage medium disk 1404 with communication bus 1426, which can be an ISA, EISA, VESA, PCI, or similar, for interconnecting all of the components of the device. A description of the general features and functionality of the display 1410, keyboard and/or mouse 1414, as well as the display controller 1408, storage controller 1424, network controller 1406, sound controller 1420, and general purpose I/O interface 1412 is omitted herein for brevity as these features are known.

As shown in FIG. 15, in some embodiments, one or more of the disclosed functions and capabilities may be used to enable a volumetric composite of content-activated layers of Transparent Computing, content-agnostic layers of Transparent Computing and/or camera-captured layers of Transparent Computing placed visibly behind 2-dimensional or 3-dimensional content displayed on screens, placed in front of 2-dimensional or 3-dimensional content displayed on screens, placed inside of 3-dimensional content displayed on screens and/or placed virtually outside of the display of screens. Users can interact via Touchless Computing with any layer in a volumetric composite of layers of Transparent Computing wherein a user's gaze, gestures, movements, position, orientation, or other characteristics observed by a camera are used as the basis for selecting and interacting with objects in any layer in the volumetric composite of layers of Transparent Computing to execute processes on computing devices.

In some embodiments, one or more of the disclosed functions and capabilities may be used to enable users to see a volumetric composite of layers of Transparent Computing from a 360-degree Optical Lenticular Perspective wherein a user's gaze, gestures, movements, position, orientation, or other characteristics observed by cameras are a basis to calculate, derive and/or predict the 360-degree Optical Lenticular Perspective from which users see the volumetric composite of layers of Transparent Computing displayed on screens. Further, users can engage with a 3-dimensional virtual environment displayed on screens consisting of layers of Transparent Computing placed behind the 3-dimensional virtual environment displayed on screens, placed in front of a 3-dimensional virtual environment displayed on screens, and/or placed inside of the a 3-dimensional virtual environment displayed on screens wherein users can select and interact with objects in any layer of Transparent Computing to execute processes on computing devices while looking at the combination of the 3-dimensional virtual environment and the volumetric composite of layers of Transparent Computing from any angle of the 360-degree Optical Lenticular Perspective available to users.

While this specification contains many specific implementation details, these should not be construed as limitations on the scope of what can be claimed, but rather as descriptions of features that can be specific to particular embodiments.

Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing can be advantageous.

Obviously, numerous modifications and variations are possible in light of the above teachings. It is therefore to be understood that within the scope of the appended claims, embodiments of the present disclosure may be practiced otherwise than as specifically described herein.

Embodiments of the present disclosure may also be as set forth in the following parentheticals.

(1) An apparatus, comprising processing circuitry, including a graphics processing unit (GPU), configured to access a frame buffer of the GPU, analyze, in the frame buffer of the GPU, a frame representing a section of a stream of displayed data that is being displayed by a display device, based on the analyzed frame, identify a reference patch that includes an instruction to retrieve content, generate an overlay comprising an augmentation layer, the augmentation layer including the content, superimpose the overlay onto the displayed data to create a composite comprising the augmentation layer and a base layer, such that the content is viewable while a portion of the base layer is obscured from view, detect a user input, determine a location of the user input in the augmentation layer, associate the location of the user input in the augmentation layer with a target location in the base layer, associate, within memory, the target location with an operation corresponding to the augmentation layer and the base layer such that the user input in the augmentation layer activates an input in the base layer.

(2) The apparatus of (1), wherein determining the location of the user input in the augmentation layer is performed by detecting, based on the analyzed frame, an input marker in the displayed data, and determining a location of the input marker in the augmentation layer.

(3) The apparatus of (2), wherein the input marker comprises an image of the user captured by a camera and displayed in the augmentation layer.

(4) The apparatus of any one of (1) to (3), wherein the input is obtained via at least one of a mouse, keyboard, and microphone.

(5) The apparatus of any one of (1) to (4), wherein the input is obtained via a gesture, the gesture performed by a user and captured by a camera.

(6) The apparatus of any one of (1) to (5), wherein the location of the user input in the augmentation layer includes an augmentation layer position on the display device which is different from a base layer position on the display device of the target location in the base layer.

(7) A method, comprising accessing a frame buffer of the GPU, analyzing, in the frame buffer of the GPU, a frame representing a section of a stream of displayed data that is being displayed by a display device, based on the analyzed frame, identifying a reference patch that includes an instruction to retrieve content, generating an overlay comprising an augmentation layer, the augmentation layer including the content, superimposing the overlay onto the displayed data to create a composite comprising the augmentation layer and a base layer, such that the content is viewable while a portion of the base layer is obscured from view, detecting a user input, determining a location of the user input in the augmentation layer, associating the location of the user input in the augmentation layer with a target location in the base layer, and associating, within memory, the target location with an operation corresponding to the augmentation layer and the base layer such that the user input in the augmentation layer activates an input in the base layer.

(8) The method of (7), wherein determining the location of the user input in the augmentation layer is performed by detecting, based on the analyzed frame, an input marker in the displayed data, and determining a location of the input marker in the augmentation layer.

(9) The method of (8), wherein the input marker comprises an image of the user captured by a camera and displayed in the augmentation layer.

(10) The method of any one of (7) to (9), wherein the input is obtained via at least one of a mouse, keyboard, and microphone.

(11) The method of any one of (7) to (10), wherein the input is obtained via a gesture, the gesture performed by a user and captured by a camera.

(12) The method of any one of (7) to (11), wherein the location of the user input in the augmentation layer includes an augmentation layer position on the display device which is different from a base layer position on the display device of the target location in the base layer.

(13) A non-transitory computer-readable storage medium storing computer-readable instructions that, when executed by a computer, cause the computer to perform a method, the method comprising accessing a frame buffer of a graphics processing unit (GPU), analyzing, in the frame buffer of the GPU, a frame representing a section of a stream of displayed data that is being displayed by a display device, based on the analyzed frame, identifying a reference patch that includes an instruction to retrieve content, generating an overlay comprising an augmentation layer, the augmentation layer including the content, superimposing the overlay onto the displayed data to create a composite comprising the augmentation layer and a base layer, such that the content is viewable while a portion of the base layer is obscured from view, detecting a user input, determining a location of the user input in the augmentation layer, associating the location of the user input in the augmentation layer with a target location in the base layer, and associating, within memory, the target location with an operation corresponding to the augmentation layer and the base layer such that the user input in the augmentation layer activates an input in the base layer.

(14) The non-transitory computer-readable storage medium of (13), wherein determining the location of the user input in the augmentation layer is performed by detecting, based on the analyzed frame, an input marker in the displayed data, and determining a location of the input marker in the augmentation layer.

(15) The non-transitory computer-readable storage medium of (14), wherein the input marker comprises an image of the user captured by a camera and displayed in the augmentation layer.

(16) The non-transitory computer-readable storage medium of any one of (13) to (15), wherein the input is obtained via at least one of a mouse, keyboard, and microphone.

(17) The non-transitory computer-readable storage medium of any one of (13) to (16), wherein the input is obtained via a gesture, the gesture performed by a user and captured by a camera.

(18) The non-transitory computer-readable storage medium of any one of (13) to (17), wherein the location of the user input in the augmentation layer includes an augmentation layer position on the display device which is different from a base layer position on the display device of the target location in the base layer.

Thus, the foregoing discussion discloses and describes merely exemplary embodiments of the present disclosure. As will be understood by those skilled in the art, the present disclosure may be embodied in other specific forms without departing from the spirit thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

The invention claimed is:

1. An apparatus, comprising:
processing circuitry, including a graphics processing unit (GPU), configured to
access a frame buffer of the GPU,
analyze, in the frame buffer of the GPU, a frame representing a section of a stream of displayed data that is being displayed by a display device,
based on the analyzed frame, identify a reference patch that includes an instruction to retrieve content,
generate an overlay comprising an augmentation layer, the augmentation layer including the content,
superimpose the overlay onto the displayed data to create a composite comprising the augmentation layer and a base layer, such that the content is viewable while a portion of the base layer is obscured from view,
detect a user input,
determine a location of the user input in the augmentation layer,
associate the location of the user input in the augmentation layer with a target location in the base layer,
associate, within memory, the target location with an operation corresponding to the augmentation layer and the base layer such that the user input in the augmentation layer activates an input in the base layer.

2. The apparatus of claim 1, wherein determining the location of the user input in the augmentation layer is performed by
detecting, based on the analyzed frame, an input marker in the displayed data; and
determining a location of the input marker in the augmentation layer.

3. The apparatus of claim 2, wherein the input marker comprises an image of the user captured by a camera and displayed in the augmentation layer.

4. The apparatus of claim 1, wherein the user input is obtained via at least one of a mouse, keyboard, and microphone.

5. The apparatus of claim 1, wherein the user input is obtained via a gesture, the gesture performed by a user and captured by a camera.

6. The apparatus of claim 1, wherein the location of the user input in the augmentation layer includes an augmentation layer position on the display device which is different from a base layer position on the display device of the target location in the base layer.

7. A method, comprising:
accessing a frame buffer of a graphics processing unit (GPU);
analyzing, in the frame buffer of the GPU, a frame representing a section of a stream of displayed data that is being displayed by a display device;
based on the analyzed frame, identifying a reference patch that includes an instruction to retrieve content;
generating an overlay comprising an augmentation layer, the augmentation layer including the content;
superimposing the overlay onto the displayed data to create a composite comprising the augmentation layer and a base layer, such that the content is viewable while a portion of the base layer is obscured from view;
detecting a user input;
determining a location of the user input in the augmentation layer;
associating the location of the user input in the augmentation layer with a target location in the base layer; and
associating, within memory, the target location with an operation corresponding to the augmentation layer and the base layer such that the user input in the augmentation layer activates an input in the base layer.

8. The method of claim 7, wherein determining the location of the user input in the augmentation layer is performed by
detecting, based on the analyzed frame, an input marker in the displayed data; and
determining a location of the input marker in the augmentation layer.

9. The method of claim 8, wherein the input marker comprises an image of the user captured by a camera and displayed in the augmentation layer.

10. The method of claim 7, wherein the input is obtained via at least one of a mouse, keyboard, and microphone.

11. The method of claim 7, wherein the input is obtained via a gesture, the gesture performed by a user and captured by a camera.

12. The method of claim 7, wherein the location of the user input in the augmentation layer includes an augmentation layer position on the display device which is different from a base layer position on the display device of the target location in the base layer.

13. A non-transitory computer-readable storage medium storing computer-readable instructions that, when executed by a computer, cause the computer to perform a method, the method comprising:

accessing a frame buffer of a graphics processing unit (GPU);

analyzing, in the frame buffer of the GPU, a frame representing a section of a stream of displayed data that is being displayed by a display device;

based on the analyzed frame, identifying a reference patch that includes an instruction to retrieve content;

generating an overlay comprising an augmentation layer, the augmentation layer including the content;

superimposing the overlay onto the displayed data to create a composite comprising the augmentation layer and a base layer, such that the content is viewable while a portion of the base layer is obscured from view;

detecting a user input;

determining a location of the user input in the augmentation layer;

associating the location of the user input in the augmentation layer with a target location in the base layer; and associating, within memory, the target location with an operation corresponding to the augmentation layer and the base layer such that the user input in the augmentation layer activates an input in the base layer.

14. The non-transitory computer-readable storage medium of claim 13, wherein determining the location of the user input in the augmentation layer is performed by detecting, based on the analyzed frame, an input marker in the displayed data; and determining a location of the input marker in the augmentation layer.

15. The non-transitory computer-readable storage medium of claim 14, wherein the input marker comprises an image of the user captured by a camera and displayed in the augmentation layer.

16. The non-transitory computer-readable storage medium of claim 13, wherein the input is obtained via at least one of a mouse, keyboard, and microphone.

17. The non-transitory computer-readable storage medium of claim 13, wherein the input is obtained via a gesture, the gesture performed by a user and captured by a camera.

18. The non-transitory computer-readable storage medium of claim 13, wherein the location of the user input in the augmentation layer includes an augmentation layer position on the display device which is different from a base layer position on the display device of the target location in the base layer.

\* \* \* \* \*